United States Patent [19]

Numata et al.

[11] Patent Number: 5,617,122

[45] Date of Patent: Apr. 1, 1997

[54] RECORDING APPARATUS AND METHOD FOR CONTROLLING RECORDING HEAD DRIVING TIMING

[75] Inventors: Yasuhiro Numata, Kawasaki; Yoshiaki Takayanagi; Akira Katayama, both of Yokohama; Nobuyuki Kuwabara; Isao Ebisawa, both of Kawasaki; Tsuyoshi Ohtani, Machida, all of Japan

[73] Assignee: Canon Kabushiki Kaisha, Tokyo, Japan

[21] Appl. No.: 163,770

[22] Filed: Dec. 9, 1993

[30] Foreign Application Priority Data

| Dec. 10, 1992 | [JP] | Japan | 4-330531 |
| Mar. 12, 1993 | [JP] | Japan | 5-052225 |
| Mar. 30, 1993 | [JP] | Japan | 5-071749 |
| Aug. 4, 1993 | [JP] | Japan | 5-193665 |

[51] Int. Cl.$^6$ ............ B41J 29/38; B41J 23/00; G05B 5/00
[52] U.S. Cl. .................. 347/14; 347/37; 318/466
[58] Field of Search .................. 347/37, 19, 7, 347/14; 400/279, 322, 323; 318/280–286, 466–470

[56] References Cited

U.S. PATENT DOCUMENTS

| 4,313,124 | 1/1982 | Hara | 346/140 |
| 4,345,262 | 8/1982 | Shirato et al. | 346/140 |
| 4,459,600 | 7/1984 | Sato et al. | 346/140 |
| 4,463,359 | 7/1984 | Ayata et al. | 346/140 |
| 4,558,333 | 12/1985 | Sugitani et al. | 346/140 |
| 4,608,577 | 8/1986 | Hori | 346/140 R |
| 4,723,129 | 2/1988 | Endo et al. | 346/1.1 |
| 4,740,796 | 4/1988 | Endo et al. | 346/1.1 |
| 4,818,129 | 4/1989 | Tanuma et al. | 400/323 |
| 5,132,711 | 7/1992 | Shinada et al. | 347/19 |

FOREIGN PATENT DOCUMENTS

| 54-56847 | 5/1979 | Japan . |
| 59-123670 | 7/1984 | Japan . |
| 59-138461 | 8/1984 | Japan . |
| 60-71260 | 4/1985 | Japan . |
| 5-147628 | 6/1993 | Japan | 347/37 |

Primary Examiner—Benjamin R. Fuller
Assistant Examiner—Craig A. Hallacher
Attorney, Agent, or Firm—Fitzpatrick, Cella, Harper & Scinto

[57] ABSTRACT

An ink jet recording apparatus modifies backlash correction data in accordance with changes in weight of a carriage, and reduces the printing disturbance due to the backlash by controlling the recording timing on the basis of the modified correction data. Also, a user is notified of the reduced ink remains in the ink jet recording apparatus by the reduced density of a printed image, and at the same time, the apparatus maximizes the number of sheets that can be recorded with the remaining ink in order to prevent any unrecorded data from being lost. Further, an ink jet recording apparatus according to the present invention makes it possible to curtail any ink consumption more than necessary by setting the amount of exhausted ink as required for the execution of a discharge recovery process by counting the number of dischargings at the time of recording a given amount. Also, when controlling power for a recording apparatus, the temperature rise is predicted from the number of drivings at the time of recording on a given area, and when the temperature rise is conspicuous, the driving frequency is reduced in order to suppress the heat generation of the apparatus.

26 Claims, 45 Drawing Sheets

FIG. 12
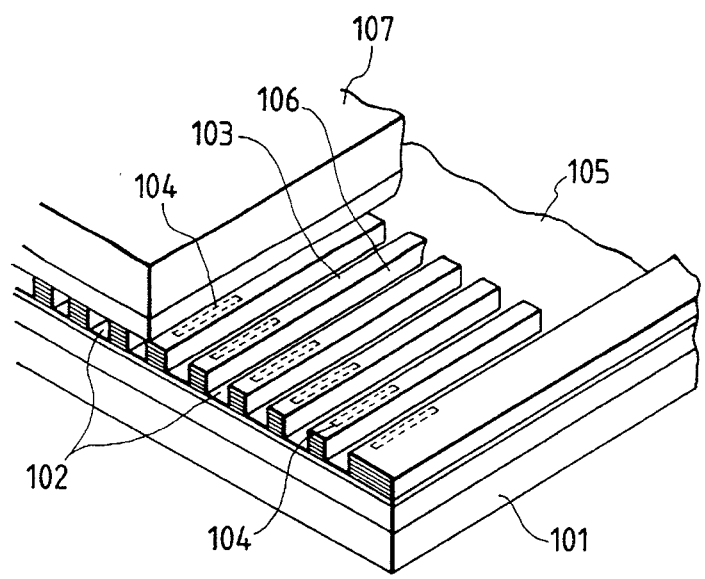
FIG. 13A  RECORD TIMING SIGNAL
FIG. 13B  DRIVE PULSE (NORMAL)
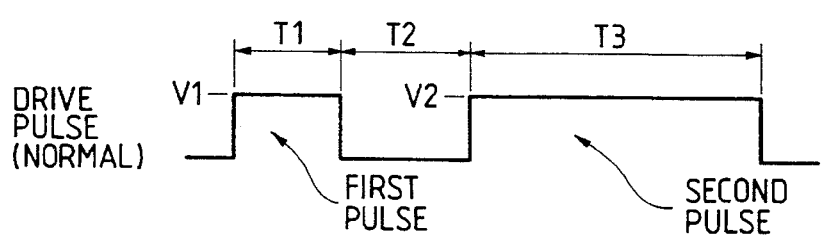
FIG. 13C  DRIVE PULSE (SMALL INK REMAIN)
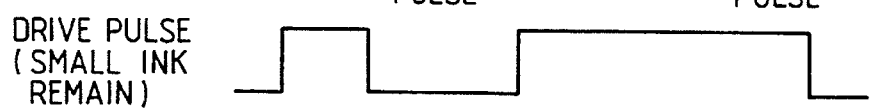
FIG. 13D  DRIVE PULSE (SMALLER INK REMAIN)

FIG. 20A
NORMAL PRINTING
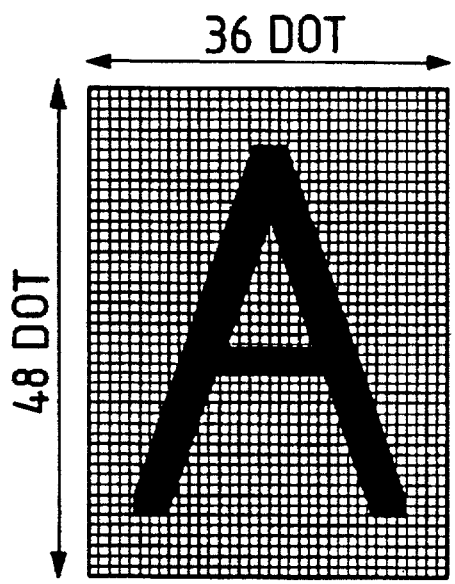
36 DOT, 48 DOT
FIG. 20B
AFTER DETECTION OF SMALL INK REMAIN
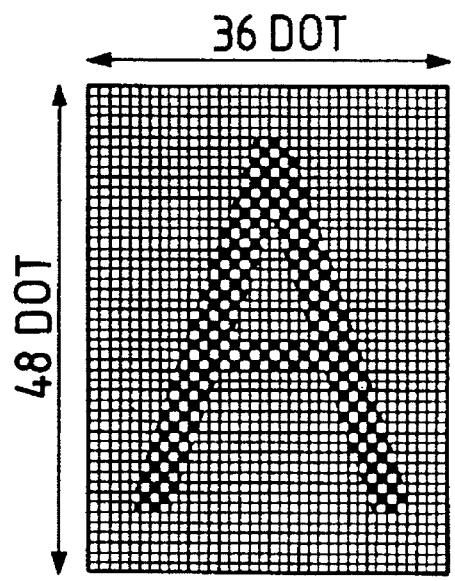
36 DOT, 48 DOT

FIG. 27A

CONVERSION TABLE OF DOT COUNTER FOR COLOR INK TO NUMBER OF PREDISCHARGE

| DOT COUNTER VALUE | NUMBER OF PREDISCHARGE |
|---|---|
| ~24999 | 200 |
| 25000~29999 | 180 |
| 30000~34999 | 160 |
| 35000~39999 | 140 |
| 40000~44999 | 120 |
| 45000~49999 | 100 |
| 50000~54999 | 80 |
| 55000~59999 | 60 |
| 60000~64999 | 40 |
| 65000~ | 20 |

FIG. 27B

CONVERSION TABLE OF DOT COUNTER FOR BLACK INK TO NUMBER OF PREDISCHARGE

| DOT COUNTER VALUE | NUMBER OF PREDISCHARGE |
|---|---|
| ~19999 | 200 |
| 20000~39999 | 180 |
| 40000~59999 | 160 |
| 60000~79999 | 140 |
| 80000~99999 | 120 |
| 100000~119999 | 100 |
| 120000~139999 | 80 |
| 140000~159999 | 60 |
| 160000~179999 | 40 |
| 180000~ | 20 |

FIG. 27C

CONVERSION TABLE OF DOT COUNTER BY DISCHARGE PORT TO NUMBER OF PREDISCHARGE

| DOT COUNTER VALUE | NUMBER OF PREDISCHARGE |
|---|---|
| ~1199 | 200 |
| 1200~1399 | 180 |
| 1400~1599 | 160 |
| 1600~1799 | 140 |
| 1800~1999 | 120 |
| 2000~2199 | 100 |
| 2200~2399 | 80 |
| 2400~2599 | 60 |
| 2600~2799 | 40 |
| 2800~ | 20 |

FIG. 33

| STANDBY TIME | NUMBER OF PREDISCHARGE | STANDBY TIME | NUMBER OF PREDISCHARGE |
|---|---|---|---|
| T<5 SECONDS | 0 | 10 HOURS≦T<24 HOURS | 35 |
| 5 SECONDS≦T<30 SECONDS | 3 | 1 DAY≦T<2 DAYS | 40 |
| 30 SECONDS≦T<1 MINUTE | 5 | 2 DAYS≦T<3 DAYS | 50 |
| 1 MINUTE≦T<10 MINUTES | 10 | 3 DAYS≦T<5 DAYS | 60 |
| 10 MINUTES≦T<30 MINUTES | 15 | 5 DAYS≦T<7 DAYS | 70 |
| 30 MINUTES≦T<1 HOUR | 20 | 7 DAYS≦T<10 DAYS | 100 |
| 1 HOUR≦T<5 HOURS | 25 | 10 DAYS≦T | 150 |
| 5 HOURS≦T<10 HOURS | 30 | | |

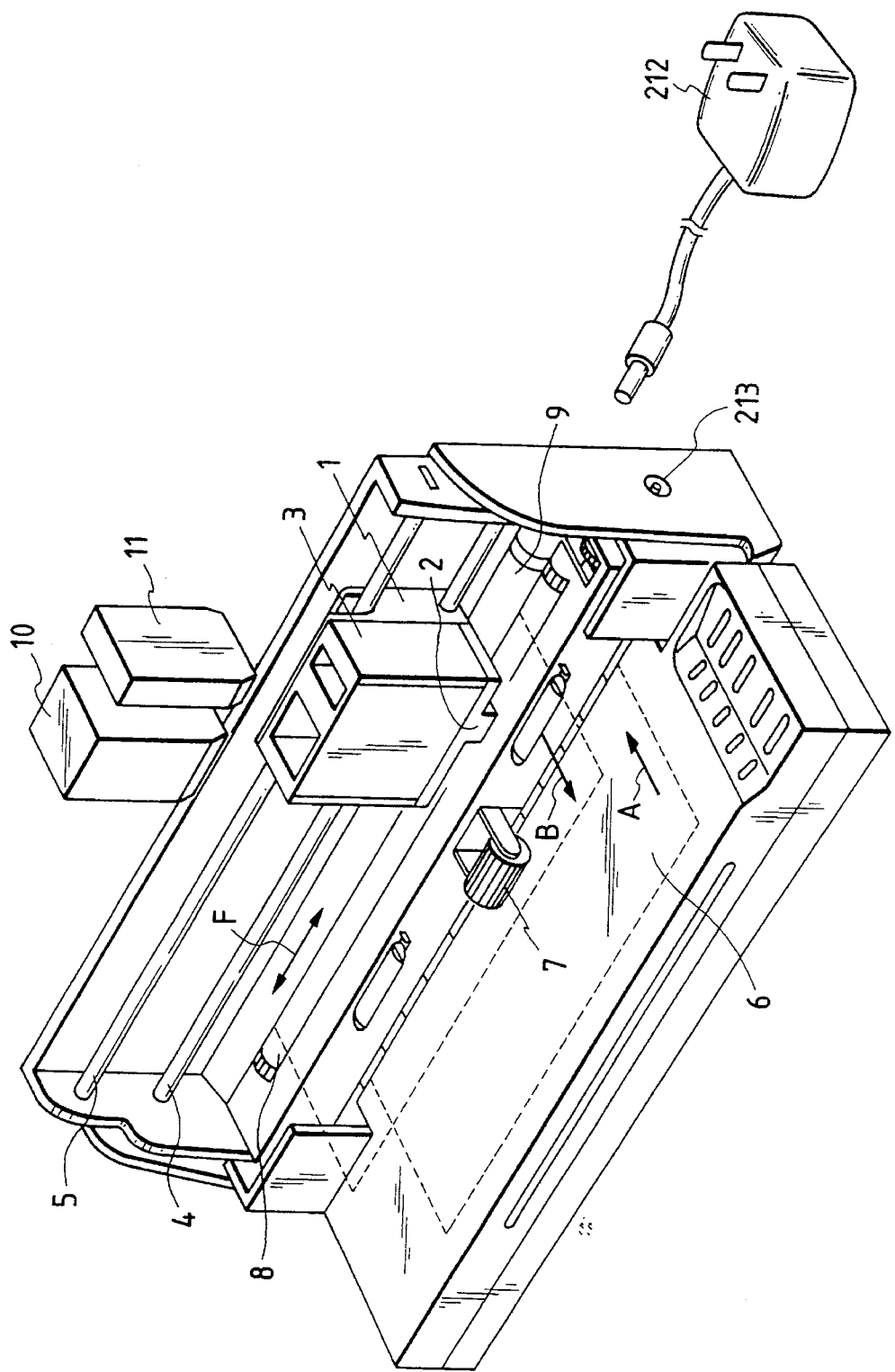

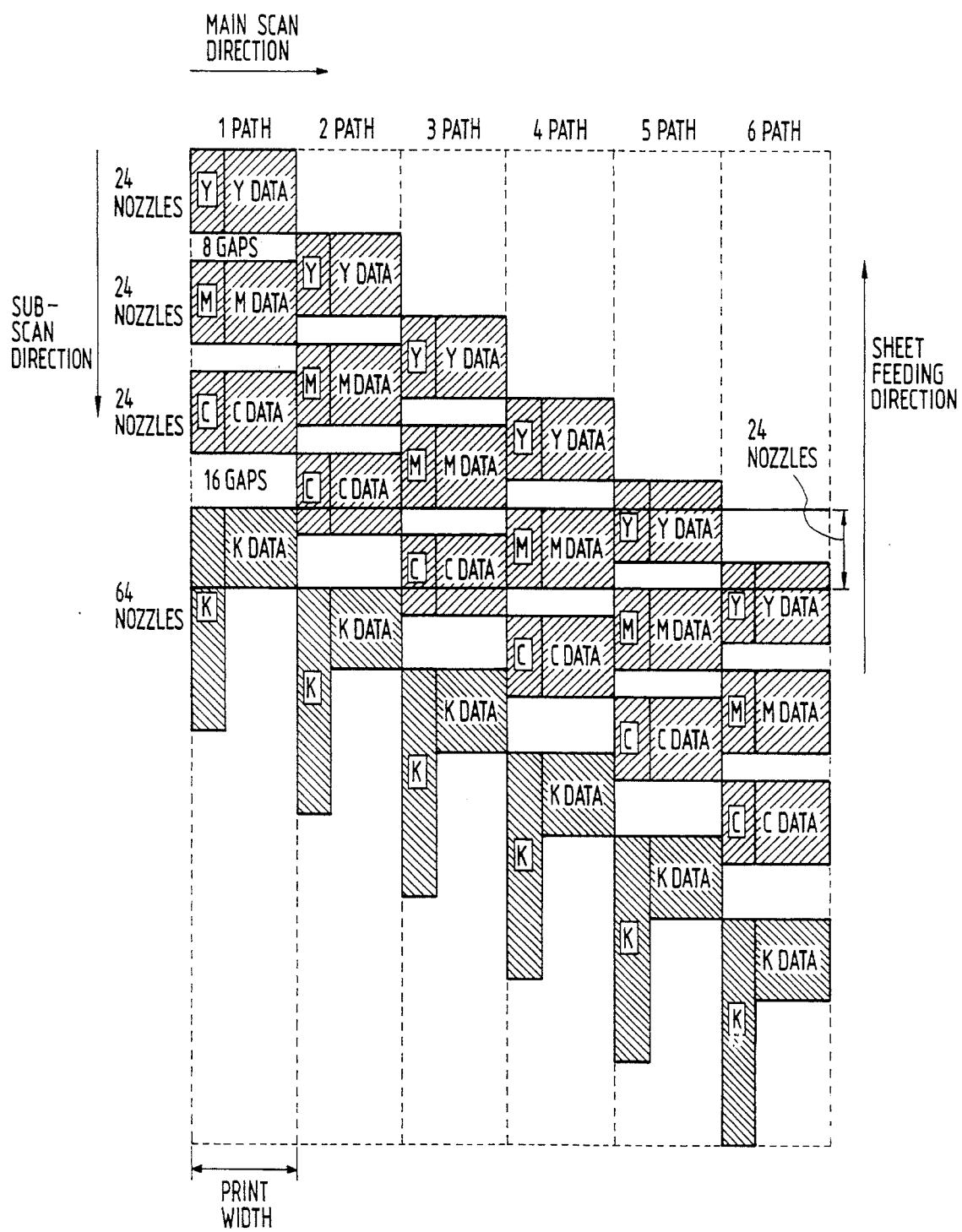

HEAD MOVEMENT AT MONOCHROME PRINTING

64 NOZZLES

Y M C K

RECORDING APPARATUS AND METHOD FOR CONTROLLING RECORDING HEAD DRIVING TIMING

BACKGROUND OF THE INVENTION

1. Field of the Invention

The present invention relates to a recording apparatus. More particularly, the invention relates to an ink jet recording apparatus capable of reciprocating a carriage having a recording head mounted on it for scanning and recording; to a process to be executed when the ink remains in such a recording apparatus are reduced; and to a discharge recovery process for the recording head to be used by such an apparatus.

Also, the present invention relates to a power control method for a recording apparatus.

2. Related Background Art

In the so-called serial type recording apparatus which records by the reciprocation of a carriage having a recording head mounted on it for correlatively scanning a recording medium, there is a problem that the recording position is displaced due to the backlash of the driving system which takes place as the carriage reciprocates. In consideration of a backlash of the kind, it has been a practice to make a correction in order to provide a delayed timing for a recording operation of the recording head (hereinafter referred to as a "backlash correction"). The data for this backlash correction are set in a back up memory and others when the apparatus is assembled at a factory, for example. Then, some systems are made available after that in order to allow a user to modify the backlash data appropriately by use of dip switches and others.

However, it is extremely troublesome for the user to modify the backlash data by the switches and others for the adjustment of the required timing of a recording operation. Furthermore, it is difficult for the user to optimize such an adjustment.

As an apparatus for recording characters and images on a recording medium such as a sheet, there has been a recording technique on an impact type recording thereby to press an ink ribbon which retains ink to a recording medium for recording. In a recording apparatus using such a technique, a user recognizes the life of the ink ribbon when the density of a recorded image is reduced due to the lessened amount of ink retained in the ink ribbon after a number of recording sheets have been recorded.

On the other hand, in an ink jet recording apparatus which records characters and images on a recording medium such as a sheet by discharging fine ink droplets onto it, there are many advantages as follows as compared with the other recording apparatuses:

(1) A high-speed recording is possible.

(2) The use of colors is easy.

(3) An ordinary paper is usable for recording.

(4) The noises are small.

(5) The quality of the recorded images is excellent.

In an ink jet recording apparatus such as this, the structure is made by the provisions of a recording head which is generally used for recording, and an exchangeable ink cartridge which contains ink to be supplied to the recording head.

In the foregoing ink jet recording apparatus, too, the ink remains in the ink cartridge are reduced as a number of sheets are recorded, and then, it becomes impossible to record eventually due to the short supply of ink. Therefore, it is a general practice that the ink remains in the ink cartridge are always monitored, and when the content of ink becomes less than a specific amount, a lamp is illuminated or a message is displayed so that the user is informed of the insufficient ink remains.

Here, in the conventional ink jet recording apparatus, the ink remains in the ink cartridge are monitored, and the user is prompted to replace the ink cartridges or to procure a new cartridge when the ink remains become less than a specific amount. However, in such an ink jet recording apparatus, the recording is suddenly disabled when the ink remains become less than a threshold value set for the recordable amount of the ink remains. As a result, a problem tends to be encountered that the data still to be recorded lost or the medium still on recording is wasted.

Also, in general, an ink jet recording apparatus comprises a recording head on which a plurality of nozzles are provided in array with the ink discharging ports arranged at its leading ends at pitches of $\frac{1}{180}$ inch, $\frac{1}{240}$ inch, or the like. In such a recording head, the solvent of the recording liquid (hereinafter referred to as ink) at the discharging ports is evaporated when the head is out of recording, that is, on standby for recording, for example, hence making the ink over viscous, which may bring about the reduction of the amount of dischargeable ink, the deviation of the direction in which the ink is discharged, or some other defective discharges. Thus, the dot missing, the displacement of impacted positions of ink droplets on a recording medium, or other defects are invited to create a problem that the quality of the recorded image and others is spoiled.

This problem may also take place in the same manner at the time of a recording operation. In other words, when recording, the ink is selectively discharged from among a plurality of discharging ports to form an image. Therefore, in terms of the individual nozzles, there is a possibility that some of them remain in a state where its leading ends are exposed to the atmosphere as they are without being accompanied by any ink discharging. In such particular nozzles, therefore, the viscosity of ink is increased as described above.

For the problems such as these, a discharge recovery process has been taken as a countermeasure as described below. In other words, when the apparatus is out of recording operation, a cap which is usually made of a flexible rubber or the like abuts upon the surface where the discharging ports of the recording head are arranged (hereinafter referred to as discharge surface) in order to suppress the evaporation of the ink solvent from the discharging ports or to execute an ink discharging which is not related to recording in a given location for the purpose of removing the ink which has already become overly viscous (hereinafter referred to as preliminary discharge), hence preventing any defective discharge from occurring.

Further, for the recovery process for the nozzles which are not in use when recording, a technique is adopted so that the preliminary discharge is repeated at intervals of a specific period during the recording operation.

Also, for the purpose of removing the ink which has advanced the degree of its viscosity, the ink may be sucked from the discharging ports through the cap or a process may be given to pressurize the ink from the ink supply system for the recording head (hereinafter referred to as suction or pressurized recovery process accordingly).

However, there are still problems encountered in executing the conventional recovery processes in some cases.

In other words, the evaporation of the ink solvent from the discharging ports advances as the time elapses, and when starting a recording, the length of such an elapsed time differs greatly depending on the conditions in which the apparatus has been used until then. Therefore, the discharging number of the preliminary discharges must be set in preparation to cope with any the situation that may be brought about by the increased viscosity of ink which should become comparatively great after the evaporation has advanced and reached its saturation to a certain extent. The same is applicable to the preliminary discharge which will also be executed during the recording operation.

In this respect, when the cap abuts upon the discharge surface for the suppression of the evaporation, it may be difficult to anticipate completely preventing the ink solvent from being evaporated from the discharging ports. Therefore, in this case, too, the setting of the discharging number of the preliminary discharges should be considered in the same manner as above. Also, when the evaporation has further advanced, it may be necessary to apply the foregoing suction or pressurized recovery process, and in some cases, it is still conceivable that simply applying the preliminary discharges alone is not good enough, and a defective discharge may ensue.

Further, for the recovery process for the nozzles which are not in use during a recording operation, it is necessary to execute the preliminary discharge for covering the maximum increase of the viscosity rather than the frequency of use per nozzle in order to stabilize the discharging of all the nozzles. As a result, the probability is that the preliminary discharging may be executed in an amount which is more than necessary for some of the nozzles.

When the discharging number is set for the preliminary discharges such as above, there is also a case that the preliminary discharges are executed more than necessary depending on the condition of use of a recording apparatus: for example, its out-of-recording time is comparatively short or the discharging ports which execute a small number of discharges are scarcely present. Then, in such a case, the amount of used ink for the operation other than recording becomes great, inevitably leading to an increased running cost. Still more, in case of a cartridge type where a recording head and an ink tank are integrally formed, both the tank and recording head must be replaced when the ink is exhausted. This replacement of the cartridge affects the running cost, hence any unwanted use of the recording liquid should be suppressed as much as possible. The amount of ink to be used for the discharge recovery process such as the abovementioned preliminary discharges must be reduced in attaining a more effective use of the ink retained in the ink tank.

Also, recently, among the note type personal computers, word processors, and the like, those having a printer integrally arranged for them have gained popularity. An equipment of the kind is driven by its built-in cell or the power supplied through an AC adapter in addition to the AC power-supply. Therefore, it is desirable to enable the printer used for such an equipment to be driven by a low power dissipation. Along the enhancement of the computer performance, a higher speed of a printer has also become one of the significant factors to determine the product value.

For a portable printer of the kind, a direct current voltage is supplied from an externally equipped AC adapter, or from cells and the like. This voltage is increased or decreased by a DC-DC converter, a regulator IC, or the like to generate the required direct current voltage in the apparatus. In order to increase the printing (or image printing) speed in this type of a printer, it is necessary to increase the frequency of the ink discharges if the printer is of an ink jet type. Also, in a case of a serial printer, the scanning speed of a head carriage must be increased.

However, as described earlier, if the printing speed of the printer should be increased, the power required to drive the ink jet head or the carriage motor is increased almost in proportion to the intended speed. Consequently, the size of the cells, the AC adapter or the like should become larger or the AC-DC converter should be made greater. This inevitably brings about a disadvantage that the cost will be increased significantly for such an equipment as a whole.

SUMMARY OF THE INVENTION

With a view to solving the above-mentioned problems, the present invention is designed. It is an object of the invention to provide an ink jet recording apparatus capable of automatically modifying the amount of correction exactly for the delayed timing of the recording operation of a recording head, which is required in consideration of the backlash of the driving system in reciprocating the carriage having the recording head mounted on it.

An ink jet recording apparatus according to the present invention, which is capable of executing a reciprocation recording by reciprocating the carriage which mounts a carriage on it, comprises a first measuring means to measure the backlash amount of the carriage driving system; storage means to store the backlash amount measured by the first measuring means as backlash correction data; a second measuring means to measure changes in the weight of the carriage; modification means to modify the backlash correction data in accordance with the changes in the weight measured by the second measuring means; and means to adjust the timing of the recording operation of the recording head in accordance with the backlash correction data which are modified by the modification means.

In response to the changes in the weight of the carriage, the ink jet recording apparatus of the present invention automatically modifies at any time the backlash correction data used for the delayed timing of the recording operation in accordance with the backlash amount of the carriage driving system.

Thus, it is not imposed upon the user to exercise any troublesome modification of the backlash correction data himself. At the same time, it becomes possible to reduce the number of parts to an extent where the switches and others are no longer needed for such a modification, and implement the simplification of the apparatus configuration as well, hence leading to the reduction of the cost of the apparatus.

It is another object of the present invention to provide an ink let recording apparatus capable of informing the user of the reduced ink remains, and of increasing the number of recordable sheets after such an information, and at the same time, avoiding the loss of data on recording as much as possible.

To solve the foregoing problems, one aspect of the present invention is to provide an ink jet recording apparatus for recording on a recording medium by use of a recording head which discharges ink, comprising the driving control means which enables the ink consumption to be reduced by the recording head per unit time in accordance with the detection signals of the reduced ink remains transmitted from the ink remain detecting means which detects the reduced ink remains in the ink container conductively connected to the recording head.

Also, one aspect of the present invention is to provide an ink jet recording method for forming images on a recording medium by use of a recording head which discharges ink, comprising a step of detecting the reduced ink remains in an ink container conductively connected to the recording head for the reduction of the ink consumption by the recording head per unit time.

Also, one aspect of the present invention is to provide an ink jet recording method for forming images on a recording medium by use of a recording head which discharges ink, comprising a step of detecting the reduced ink remains in an ink container conductively connected to the recording head for the reduction of the density of the images recorded by the recording head.

With the foregoing structures, it is possible to increase the number of recording sheets even when the ink remains in an ink container is reduced, and at the same time, inform the user of the reduction of the ink remains reliably before the recorded data are lost.

The present invention is designed with attention to the above-mentioned problems, and is aimed at providing an ink jet recording apparatus capable of reducing any unwanted consumption of ink due to the preliminary discharges for a more effective use of ink.

To achieve this object, one aspect of the present invention is to provide an ink jet recording apparatus using a recording head provided with discharging ports to discharge ink for recording on a recording medium by discharging ink from the recording head onto the recording medium, comprising the discharge performance maintaining and recovering means which maintains a given discharge performance of the recording head by exhausting ink from the recording head; the counting means which counts the number of discharges from the discharging ports of the recording head in a given period; the setting means which defines the amount of exhausted ink by the discharge performance maintaining means in accordance with the number of discharges counted by the counting means.

Also, one aspect of the present invention is to provide an ink jet recording apparatus using a recording head to discharge ink for recording on a recording medium by discharging ink from the recording head onto the recording medium, comprising the discharge performance maintaining means which maintains a given discharge performance of the recording head by exhausting ink from the recording head; the measuring means which measures a time when the recording head is in a state of non-discharging; a table containing the amount of exhausted ink by the discharge performance maintaining means corresponding to the time during which the recording head is in the non-discharging state, in which the time and the amount of exhausted ink are in such a relationship that as the foregoing time takes more, the foregoing amount of the exhausted ink gradually approaches a given amount; and the setting means which defines the amount of exhausted ink by the discharge performance maintaining means after obtaining the corresponding amount of the exhausted ink by reference to the foregoing table in accordance with the time to be measured by the foregoing measuring means.

With the above-mentioned structures, it is possible to appropriately define the amount of the exhausted ink for the discharge recovery process on the basis of the number of discharges counted by the counting means and the standby time for recording as well. Therefore, the amount of exhausted ink can be made smaller when the counted number of discharges is greater and the recording standby time is shorter, hence enabling the unwanted ink consumption to be reduced in the discharge recovery process.

The present invention is designed in consideration of the above-mentioned prior art, and is aimed at providing a recording apparatus for which its power source is miniaturized while maintaining its high-speed printing performance, and a power control method for such an apparatus as well.

It is another object of the present invention to provide a recording apparatus capable of suppressing the heat generation of the apparatus, and a power control method for such an apparatus.

In order to achieve the above-mentioned objects, a recording apparatus according to the present invention is structured as described below. In other words, a recording apparatus which records images on a recording medium by driving a recording head comprises the counting means which counts the numbers of driving the recording head which records on a given region of the foregoing recording medium; the predicting means which predicts the temperature rise of a power source in accordance with the counted driving numbers by the foregoing counting means; and the controlling means which reduces the driving numbers of the recording head per unit time, that is, a driving frequency, for example, when the predicted value by the foregoing predicting means exceeds a given value.

In order to achieve the above-mentioned objects, a power control method for a recording apparatus according to the present invention comprises the steps described below. In other words, a method for controlling power for a recording apparatus which records images on a recording medium by driving a recording head comprises the steps of counting the driving numbers of the foregoing recording head which records on a given region of the foregoing recording medium; predicting the temperature rise of a power source at least in accordance with the counted driving numbers; and reducing the driving numbers of the foregoing recording head per unit time, that is, a driving frequency, for example, when the predicted value exceeds a given value.

With the above-mentioned structure, it is possible to count the driving numbers of the recording head which records on a given region of a recording medium, and predict the temperature rise of a power source at least in accordance with the counted driving numbers, hence preventing the temperature from exceeding a regulated temperature by reducing the driving numbers of the recording head per unit time when the predicted value exceeds a given value.

BRIEF DESCRIPTION OF THE DRAWINGS

FIG. 12 is a view schematically showing the structure of an ink jet recording head.

FIGS. 13A to 13D are timing charts showing the driving pulses of an ink jet recording head.

FIGS. 20A and 20B are views illustrating draft printing modes.

FIGS. 27A to 27C are views schematically showing conversion tables for preliminary discharging numbers on the basis of the values of a dot counter.

FIG. 33 is a view schematically showing a table on the basis of the above-mentioned relationship.

FIG. 36 is a perspective view showing the external appearance of the principal structure of an ink jet printer according to the present embodiment.

FIG. 38 is a view showing the head operation when color images are printed.

DETAILED DESCRIPTION OF THE PREFERRED EMBODIMENTS

Hereinafter with reference to the accompanying drawings, the detailed description will be made of the embodiments according to the present invention.

At first, the description will be made of an ink jet recording apparatus capable of automatically and exactly modifying the correction amount for the delayed timing of recording by a recording head in consideration of the backlash of a driving system which takes place when reciprocating a carriage.

(First Embodiment)

Figure 8:
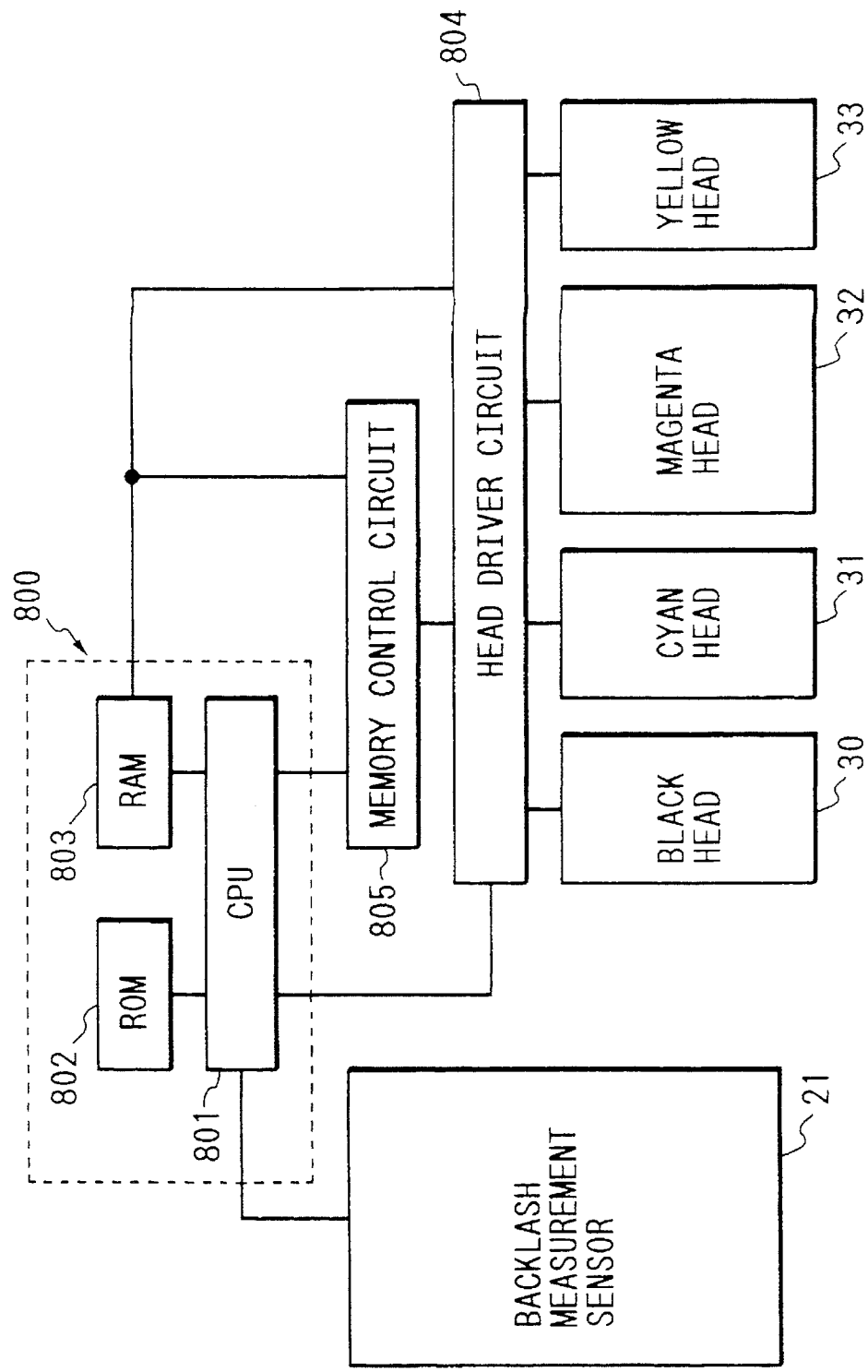
FIG. 8 is a view illustrating the control system in the apparatus shown in FIG. 1.

The principal structure of the present embodiment is shown in FIG. 8, in which using a backlash measurement sensor 21, the amount of a backlash is measured for the driving system of a carriage; the data on such measurement are stored in a RAM 803 as backlash correction data; the number of discharges of ink droplets from the recording head is counted by an ink discharge counter in a head driver circuit 804; the backlash correction data stored in the RAM 803 are modified in accordance with such counted number; and the record operation timing of the recording heads 30, 31, 32, and 33 are adjusted in accordance with the modified backlash correction data.

Figure 1:
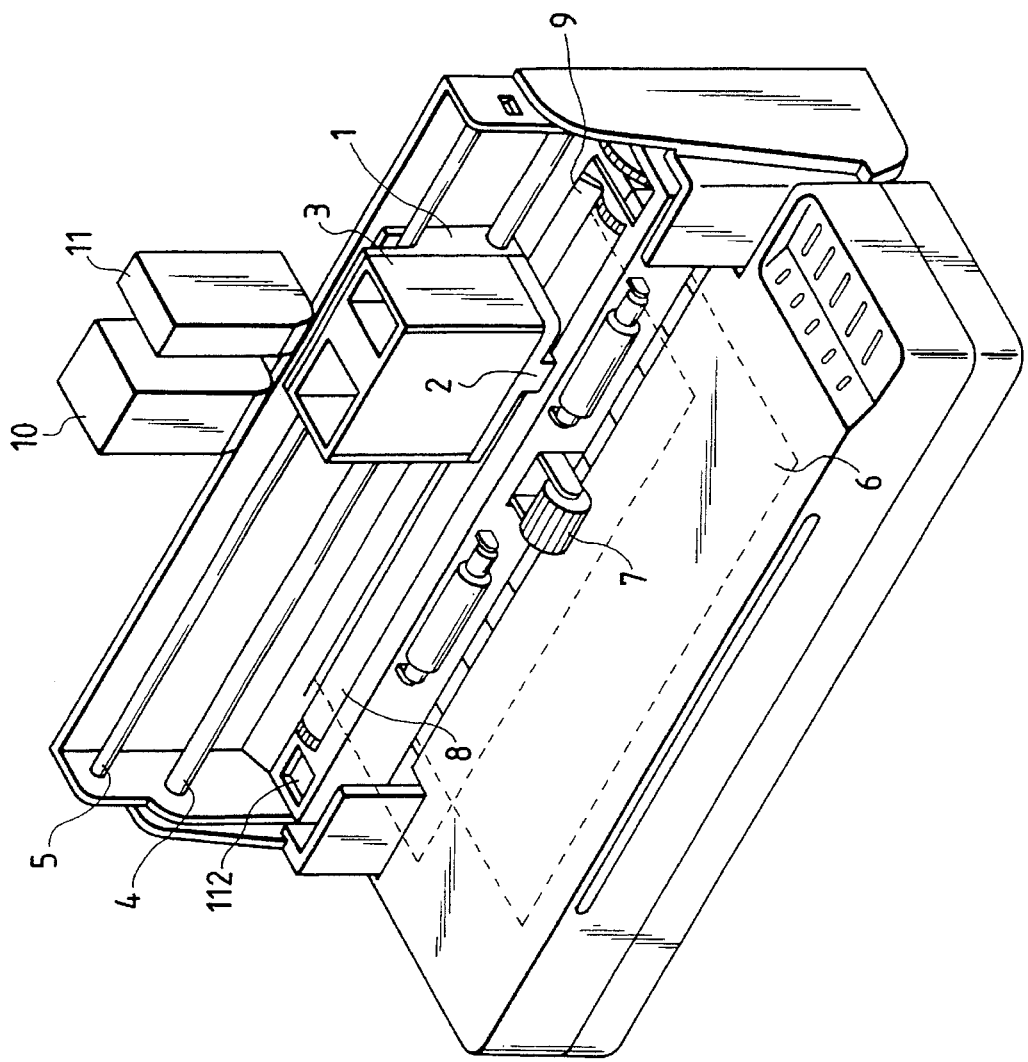
FIG. 1 is a perspective view showing the entire body of an apparatus according to an embodiment of the present invention.

FIG. 1 is a perspective view showing an ink jet recording apparatus according to the present invention. A carriage 1 on which a printing head 2 and a cartridge guide 3 are mounted is able to scan along guide shafts 4 and 5. The driving mechanism of the carriage 1 is not shown in FIG. 1. A recording sheet 6 is fed into the interior of the apparatus main body by means of a feed roller 7, and then, being pinched by a feed roller 8, pinch roller (not shown), and a sheet pressure board 9, the sheet is conveyed to the front end of the printing head 2 for printing. A color cartridge 10 containing three kinds of color ink, yellow, magenta, and cyan, and a black cartridge 11 containing black ink are inserted into the cartridge guide 3 separately, and are conductively connected to the printing head 2.

Figure 2A:
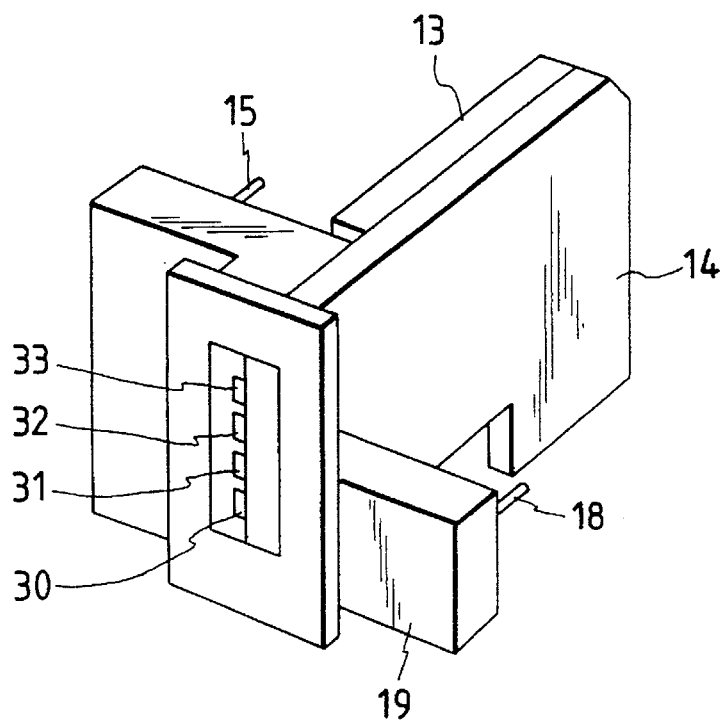
FIG. 2A is a perspective view of the recording head shown in FIG. 1, which is observed from its front side.
Figure 2B:
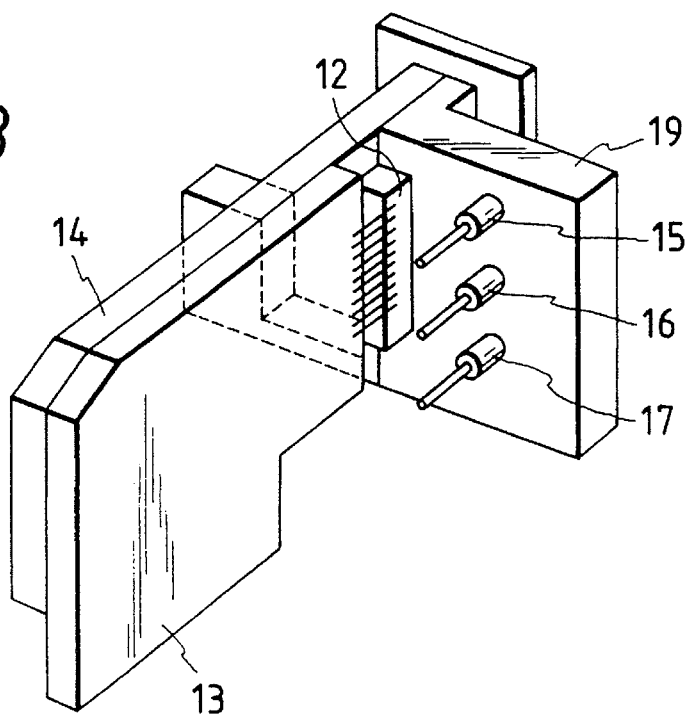
FIG. 2B is a perspective view of the recording head observed from its rear side.

Now, in conjunction with FIGS. 2A and 2B, the printing head 2 will be described in detail. On the front end of the printing head 2, the ink discharging port groups for yellow, magenta, cyan, and black are arranged on a straight line. The discharging group for the colors of yellow, magenta, and cyan has 24 discharging ports each. Also, the discharging port group for black has 64 discharging ports. Between the discharging port groups for each color, there are the intervals which are wider than the nozzle pitches. For each of these discharging ports, the ink liquid passages which are conductively connected to the discharging ports are arranged. Behind these ink liquid passages, common liquid chambers (not shown) are provided to supply ink to the liquid passages. In each of the ink passages to the discharging ports, there are arranged an electrothermal transducer generating the heat energy which is utilized for discharging ink droplets from the discharging port, and an electrode wiring to supply power to the transducer as well. These electrothermal transducers and electrode wirings are formed by a film formation technique on a base board 12 made of silicon and others. Further, on the base board 12, the partitions, a ceiling board, and others made of resin and glass material are laminated, hence constituting the above-mentioned discharging ports, ink passages, and common liquid chambers. Behind the base board 12, the driving circuit which drives the electrothermal transducers in accordance with recording signals is arranged in the mode of a printed-circuit board 13. These boards 12 and 13 are fixed to the same aluminum plate 14. The ink cartridges 10 and 11 (see FIG. 1) are inserted into the cartridge guide 3 (see FIG. 1) substantially along the aluminum plate 14, and then, connected to pipes 15 to 18 extruded along the aluminum plate 14. The pipes 15 is for yellow; 16, magenta; 17, cyan; and 18, black color, respectively. These pipes 15 to 18 are extruded from a plastic member (which may also be called "distributor") 19. Each of the pipes 15 to 18 is conductively connected to the common chamber of the corresponding discharging port group (yellow, magenta, cyan, and black) through the respective liquid passages in the plastic member 19.

Figure 3:
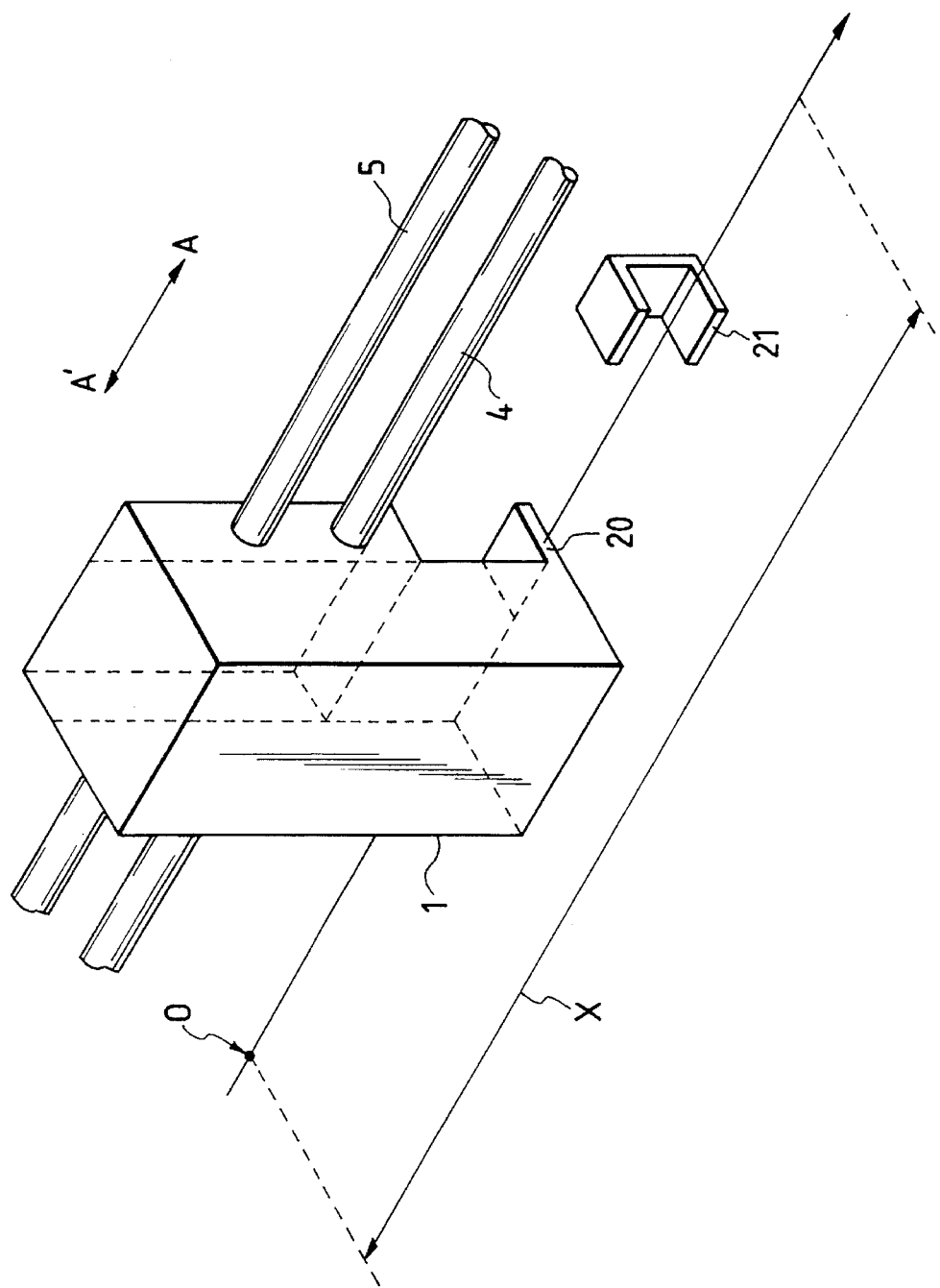
FIG. 3 is a perspective view schematically showing a backlash measuring mechanism provided for the apparatus shown in FIG. 1.

FIG. 3 is an illustration showing the measurement of a backlash.

In FIG. 3, reference numerals 4 and 5 designate the foregoing guide shafts; 20, a sensor flag provided for the carriage 1; and 21, a backlash measurement sensor. The carriage 1 travels in the main scanning directions as indicated by arrows A and A. Along the traveling of the carriage, the sensor flag 20 transverses the interior of the measurement sensor 21 thereby to enable the measurement sensor 21 to operate.

Figures 4A, 4B:
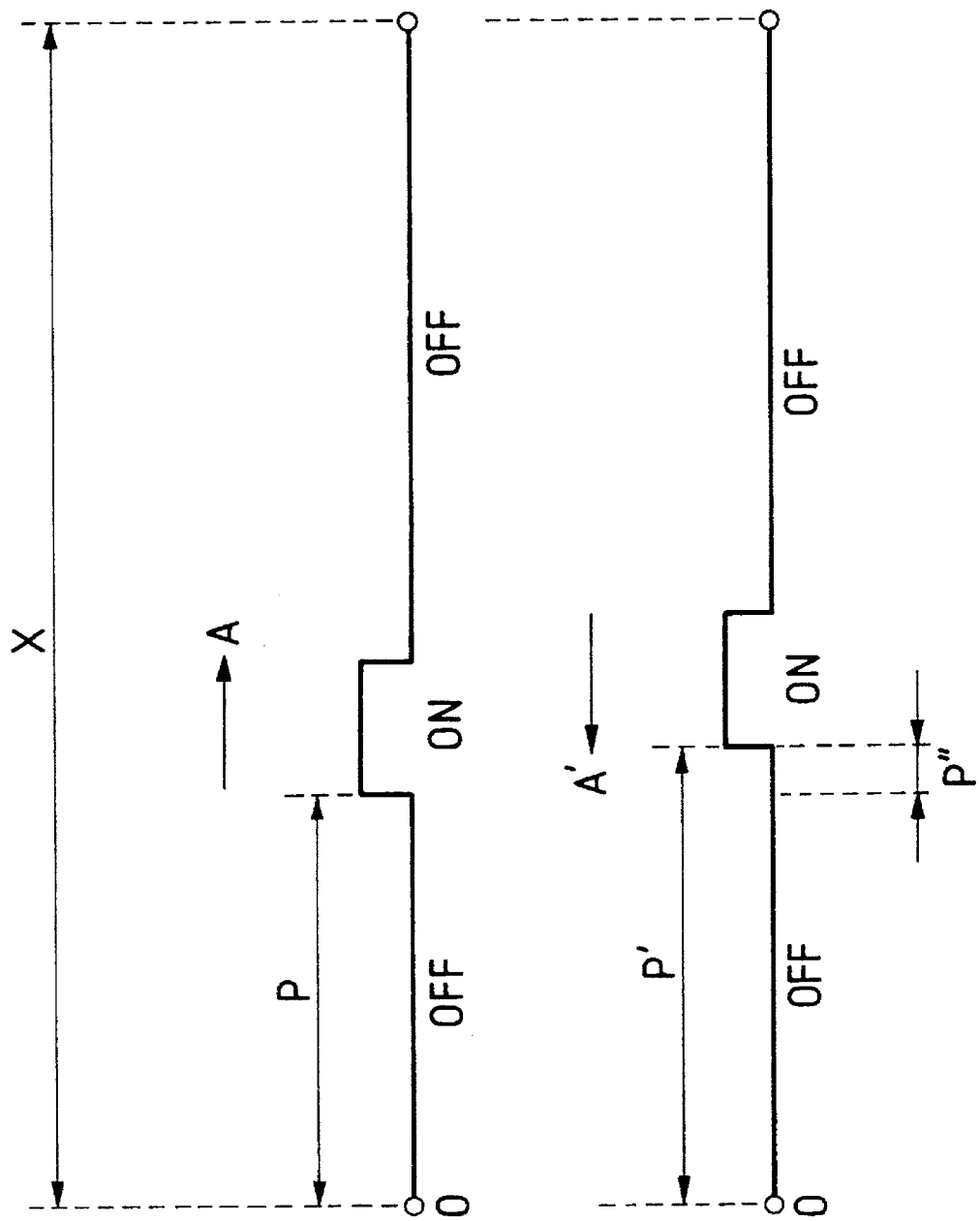
FIGS. 4A and 4B are views illustrating the operations of the sensor shown in FIG. 3.

FIGS. 4A and 4B are views illustrating the operational state of the sensor 21 when the carriage 1 travels in the directions as indicated by arrows A and A'. FIG. 4A shows the state when the carriage 1 travels in the direction indicated by the arrow A. FIG. 4B shows the state when the carriage 1 travels in the direction indicated by the arrow A'.

When the flag 20 of the carriage 1 transverses the sensor 21, the sensor 21 is turned on (in the ON state). The axes of abscissa in FIGS. 4A and 4B represent the traveled positions of the carriage. Now, with the left-side end in FIGS. 4A and 4B as fiducial point 0, the carriage 1 reciprocates to travel by a predetermined amount. Such a traveling amount is given as X. When the carriage 1 travels in the direction indicated by the arrow A, the traveling distance from the fiducial point 0 to the position where the sensor 21 is turned ON (corresponding to the traveling time between them) is given as distance P as shown in FIG. 4A. On the other hand, when the carriage 1 travels in the direction indicated by the arrow A', the traveling distance from the position where the sensor 21 is turned OFF to the fiducial point 0 (corresponding to the traveling time between them) is given as distance P' as shown in FIG. 4B. Thus the backlash amount (backlash correction amount) in the main scanning direction is P" (=P–P'). The clock to be used for the measurement of this backlash amount P" is a frequency ten times the ink discharging frequency, for example.

Figure 5:
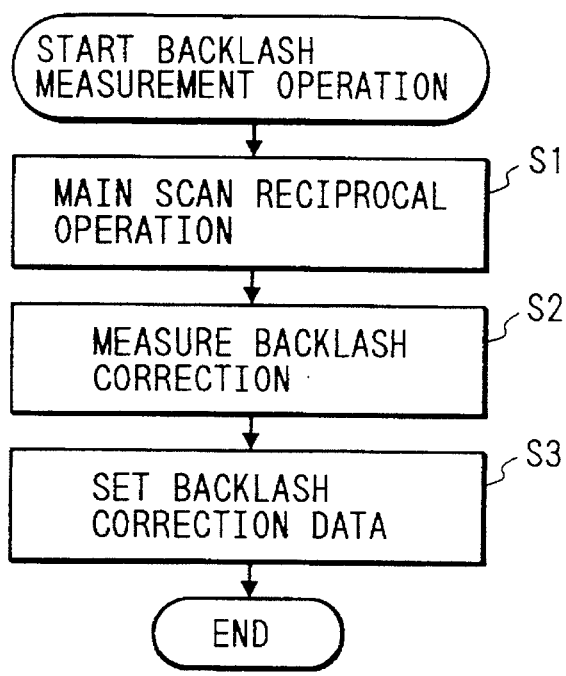
FIG. 5 is a flowchart describing the backlash measurement operation in the apparatus shown in FIG. 1.

FIG. 5 is a flowchart illustrating the operation (backlash measurement operation) for setting the backlash correction data in the main scanning directions (directions indicated by the arrows A and A') after having obtained such data.

At first, in step S1, the carriage 1 reciprocates in the main scanning directions. In the present embodiment, the carriage 1 reciprocates to travel in the directions indicated by the arrows A and A' in the distance X from the fiducial point 0 in FIG. 3 and FIGS. 4A and 4B as described earlier.

In the next step S2, the backlash correction amount is measured. In the present embodiment, the backlash amount P" is measured from the distances P and P' from the fiducial point 0 to the position where the sensor 21 is turned on or off as described earlier. This measured amount is defined as the backlash correction data.

In the next step S3, the backlash correction data are set in a non-volatile memory as the initial data for a recording apparatus.

A control of the kind is made at the time of printing test on the manufacture line for the apparatus, at the service location in the market site, or the like. In this respect, as an initial data, zero is set in the step 3 for the ink discharge counter which will be described later.

Figure 6:
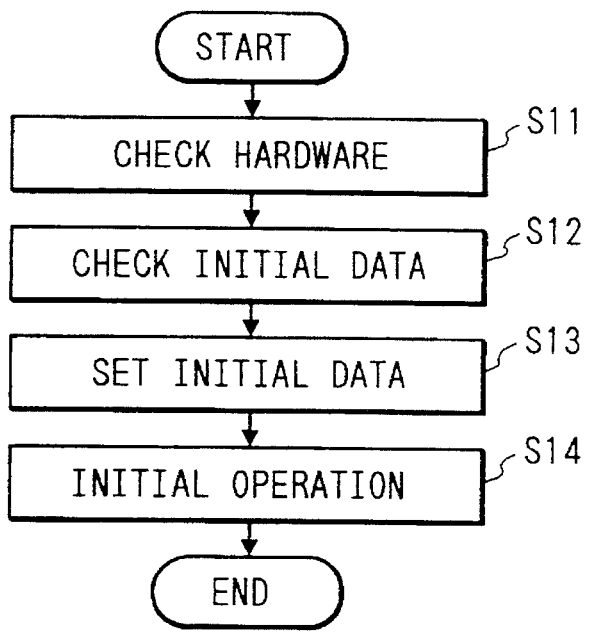
FIG. 6 is a flowchart describing the start control in the apparatus shown in FIG. 1.

FIG. 6 is a flowchart illustrating the start control at the time of turning on the power-supply for the apparatus of the present invention.

At first, in step S11, the hardware check is executed. For example, the controller in the apparatus (CPU, RAM, ROM, and other memories), actuators, and various sensors are checked. In step S12, the initial data are checked. In step S13, the initial data are set including the data on the modification of the backlash correction data as described later. In step S14, the initial operation is executed.

Figure 7:
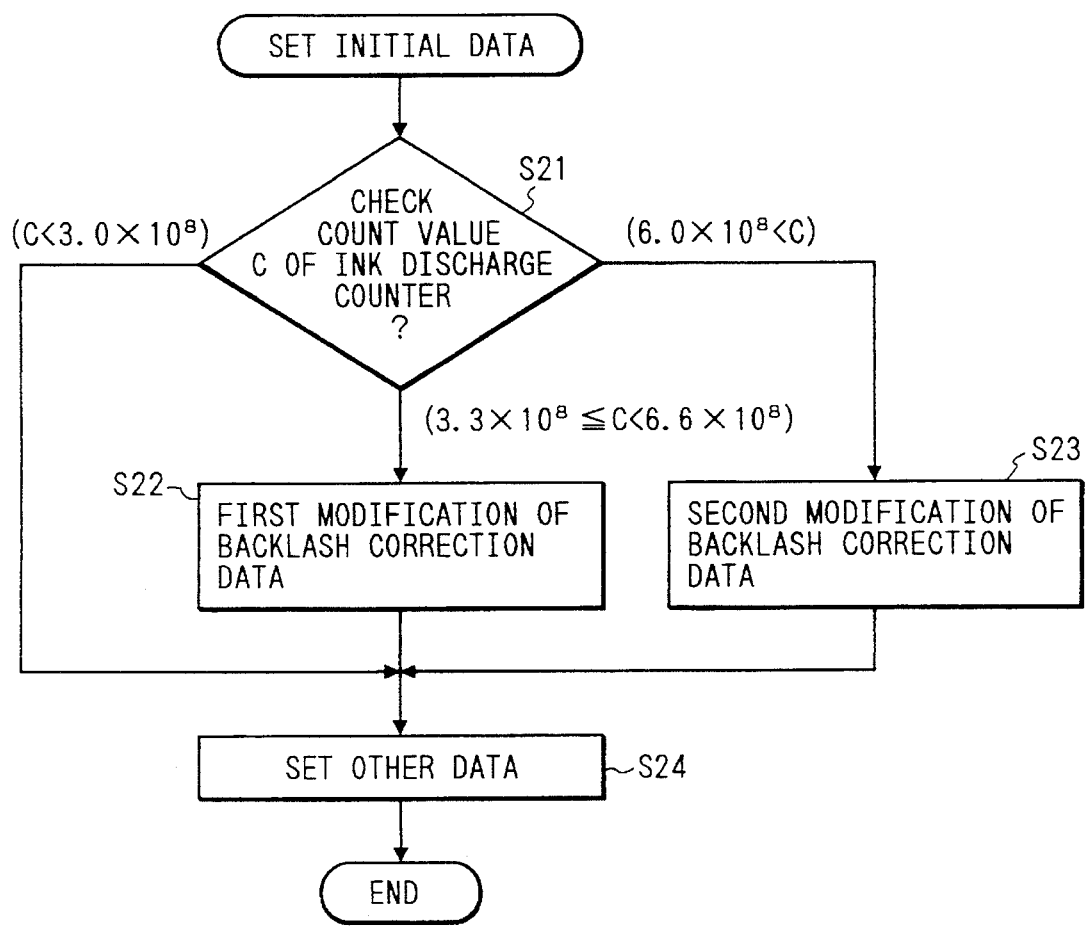
FIG. 7 is a flowchart describing the operation in step S13 shown in FIG. 6.

FIG. 7 is a flowchart illustrating the initial data set operation in the step S13 shown in FIG. 6.

At first, in step S21, the ink discharge counter is checked. The ink discharge counter counts the number of discharging ink droplets in the past. Two counters are provided: one for color use (yellow, magenta, and cyan) and the other for black. For the present embodiment, it is assumed that one cartridge (either color and black) is able to discharge up to $1.0 \times 10^9$ shots.

In the step S21, the sum of discharging numbers of ink droplets which is equivalent to the ink consumption of the two cartridges each for color use and black use, that is, the sum C of the counted values of the foregoing two ink discharge counters, is checked. Then, if the sum C is less than $3.0 \times 10^8$ shots, the process will proceed to step S24. If the sum is $3.3 \times 10^8$ or more and less than $6.6 \times 10^8$, the backlash correction data is "first modified" in step S22 as described later, and then, the process will proceed to the step S24. Also, if the sum C is $6.0 \times 10^8$ or more, the backlash correction data is "second modified" in step S23 as described later, and then, the process will proceed to the step S24. In the step S24, the other data required for the recording operation are set. For such data, the driving data for the recording head can be named, for example.

In this way, the backlash correction data can be modified in three steps in total, namely, "no modification", "first modification", and "second modification". The first and second modifications are such that the backlash correction data are modified to make its value smaller in consideration of the changes in the weight of the carriage following the ink consumption as described later. The amount of modification for the second modification is greater than that of the first one.

Now, the description will be made of the relationship between the counted value of the ink discharge counter and the modified amount of the backlash correction data.

As the counted value of the ink discharge counter becomes greater to indicate more ink consumption, the ink in the ink tank is reduced, thus making the weight of the carriage 1 lighter as a whole. As the weight of the carriage 1 becomes smaller, the driving load of the carriage 1 also changes. Hence, the backlash amount P" becomes increasingly smaller when a reciprocating record operation is executed for the reciprocal printing and others. Therefore, it becomes impossible to implement a recording in a good printing condition by the application of the backlash correction data which are set for the ink tank full of ink at the time of assembling the apparatus at a factory. Since the backlash amount P" becomes smaller as the weight of the ink tank becomes lighter, the backlash correction data should be modified accordingly in this respect.

In the present embodiment, the weight of ink per one dot is assumed to be $35 \times 10^{-9}$ g, and in the step S21 in FIG. 7, if the ink is consumed for an amount of approximately 10.5 g ($35 \times 10^{-8}$ g $\times 3.0 \times 10^{-8}$ shots=10.5 g) or more, the process will proceed to the step S22 or step S23 where the backlash correction data are modified. The amount of modification in the step S22 is "1", and in the step S23, the amount of modification is "2". The unit of the modified amount is an amount which enables the backlash correction amount to be reduced so that the delayed time is shortened by a ½ pixel for the recording operation timing of the recording head which will be described later. Therefore, each time the ink is consumed for an amount of approximately 10.5 g, the backlash correction amount is modified per unit. Here, the backlash amount for the reciprocal printing is approximately two pixels or three pixels for each dot unit, for example.

FIG. 8 shows the structure of the control system of the apparatus of the present invention.

In FIG. 8, a reference numeral 800 designates a control unit which comprises a CPU 801 executing the steps shown in FIG. 5, FIG. 6, and FIG. 7, a ROM 802 storing the fixed data such as a program for the processing procedures, and a RAM 803 holding the operational data and the backlash correction data; 21, the aforesaid backlash measurement sensor; 804, the head driver circuit which is arranged to discharge ink; and 805, a memory control circuit. In this respect, the aforesaid ink discharge counter is included in the head driver circuit 804, and its counted value is held in the RAM 803 each at intervals of a given period. Reference numerals 30 to 33 designate a black head, cyan head, magenta head, and yellow head, respectively.

Now, with reference to FIGS. 9 through 10D, the description will be made of the relationship between the modified amount of backlash correction data and the recording operation timing.

Figure 9:
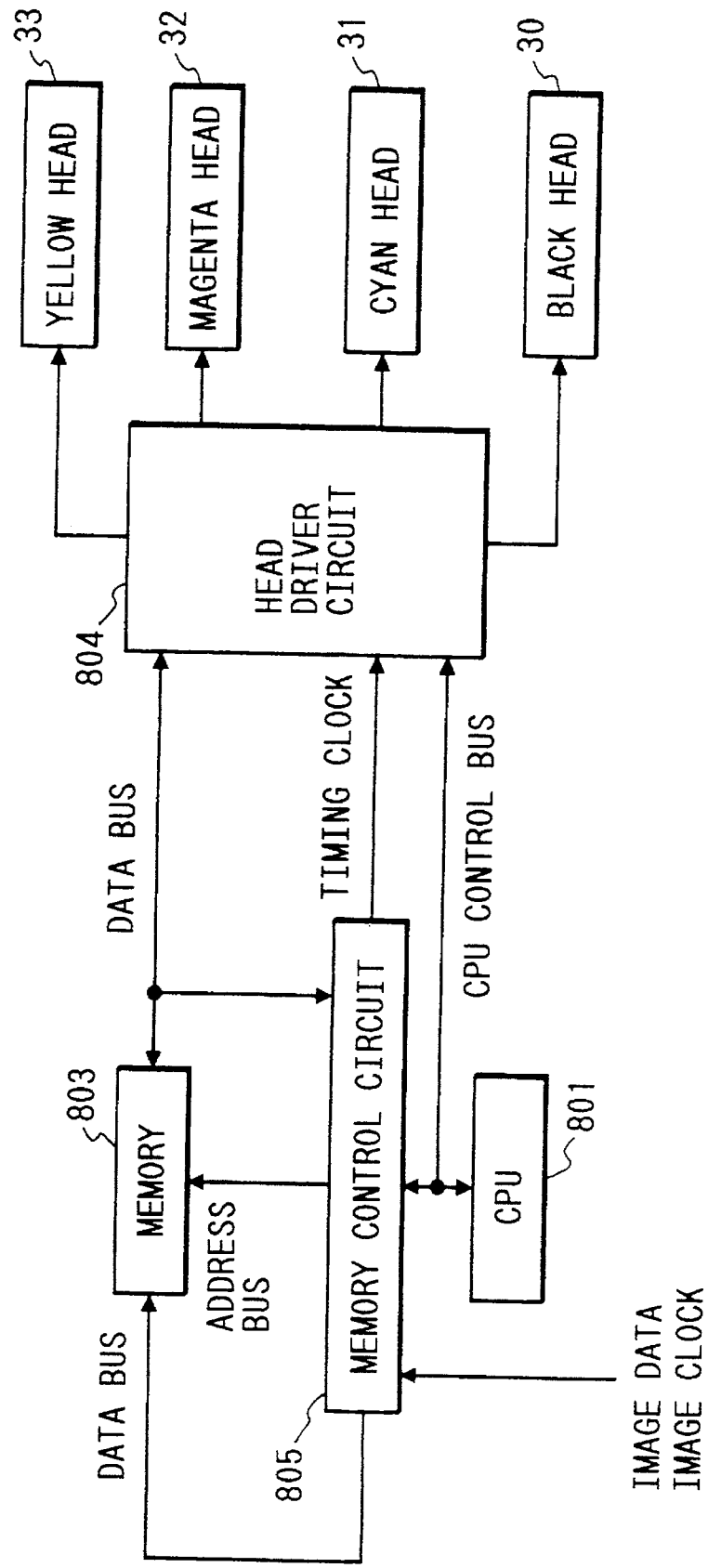
FIG. 9 is a structural block diagram illustrating the flow of image data in the apparatus shown in FIG. 1.
Figure 10:
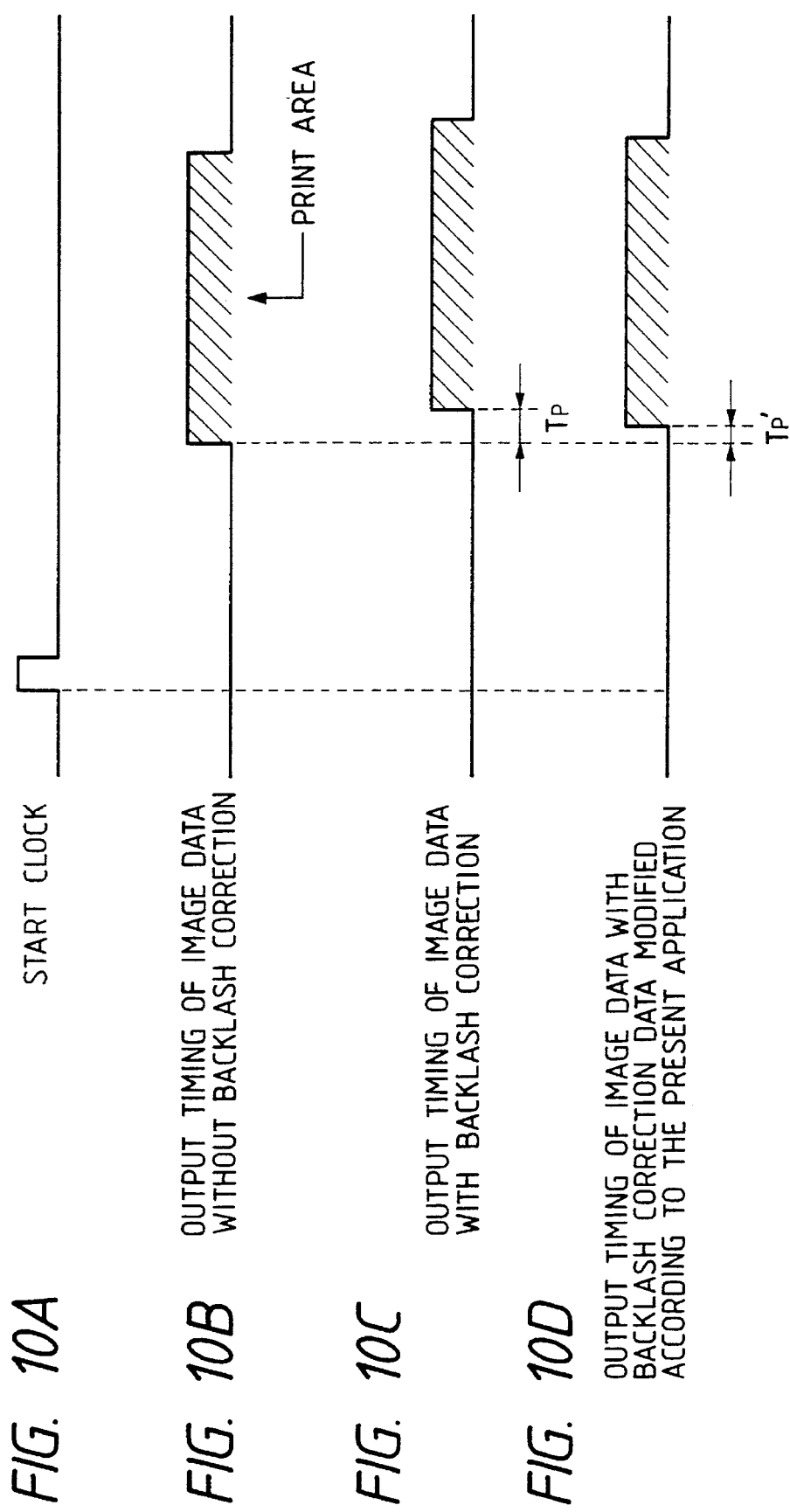
FIGS. 10A to 10D are views illustrating the printing start timings at the time of back printing.

FIG. 9 illustrates the flow of the image data in and out of the control unit. FIGS. 10A to 10D illustrate the corrections of printing timings. FIG. 10A shows the starting clock. On the basis of this clock, the image data are transferred to the head driver circuit 804 shown in FIG. 9. FIGS. 10B, 10C, and 10D show the output timings of the image data at the time of the back printing operation when a reciprocal printing is executed. FIG. 10B shows the state when no backlash is taken into account, that is, the output timing of the image data when no backlash is corrected. FIG. 10C shows the state when a backlash is considered, This represents the case where the output timing of the image data are delayed by the carriage traveling time $T_P$ which corresponds to the measured backlash amount P" in accordance with the aforesaid backlash correction data. Also, FIG. 10D shows the output timing of the image data when the backlash correction data are modified according to the present invention so that the above-mentioned delayed time $T_P$ is adjusted in accordance with the counted value of the ink discharge counter. A time $T_P'$ after this adjustment becomes shorter than the above-mentioned delayed time $T_P$. As a result, the timing of the printing operation is quickened in consideration of the fact that the amount of the backlash is reduced to the extent that the carriage 1 becomes lighter as the ink is consumed.

In this respect, the image data are transferred to the heads 30 to 33 through the memory control circuit 805, memory 803, and head driver circuit 804 in FIG. 9. From the memory control circuit 805, the control signals are output to control the output timings of the image data as shown in FIGS. 10A to 10D.

With the structure as described above, it is possible to automatically and exactly modify the backlash correction data without imposing upon the user any troublesome modification of the correction data.

In the present embodiment, the changes in the weight of the ink tank is predicted from the discharging numbers of the ink droplets. In addition, it may be possible to predict the weight changes of the ink tank from the number of the ink suction operations. If, for example, suction means is provided to execute the head discharge recovery by forcibly sucking the ink from the nozzle unit of the head, the number of such suction operations is counted. Then, the weight changes of the ink tank are predicted in accordance with the counted value of the operational numbers of the suction, and the counted value of the discharging numbers of the ink droplets as well. In this case, it may be possible to predict the weight changes of the ink tank in terms of the ink discharging shot numbers obtainable by converting the amount of sucked ink per suction into 5,000 shots each, for example.

In this respect, if there is any means available to count the image data, it may be possible to predict the weight changes of the ink tank from a counted value obtainable by counting the effective image data (that is, the image data equivalent to the actual amount of discharged ink).

Also, in the present embodiment, the backlash data are modified in the three steps in total (no modification, first modification, and second modification), but it will be possible to attain the higher quality of a recorded image and others by modifying them more precisely in a multiple-stepping arrangement.

In this respect, in the foregoing embodiment, the ink discharge counters are prepared for the two kinds, one for black ink, the other for color ink, but if the gravities of black, yellow, cyan, and magenta ink differ greatly from each other, it may be possible to provide an individual ink discharge counter for each of them. Also, it may be possible to change the weighting of the counted value of each ink discharge counter.

Also, in the embodiment, it has been described that the backlash measurement operation is executed in a factory when an apparatus is assembled or in a service site in the market, it may be possible to provide the operational keys and switches so that the user is able to execute the backlash measurement freely.

Figure 11:
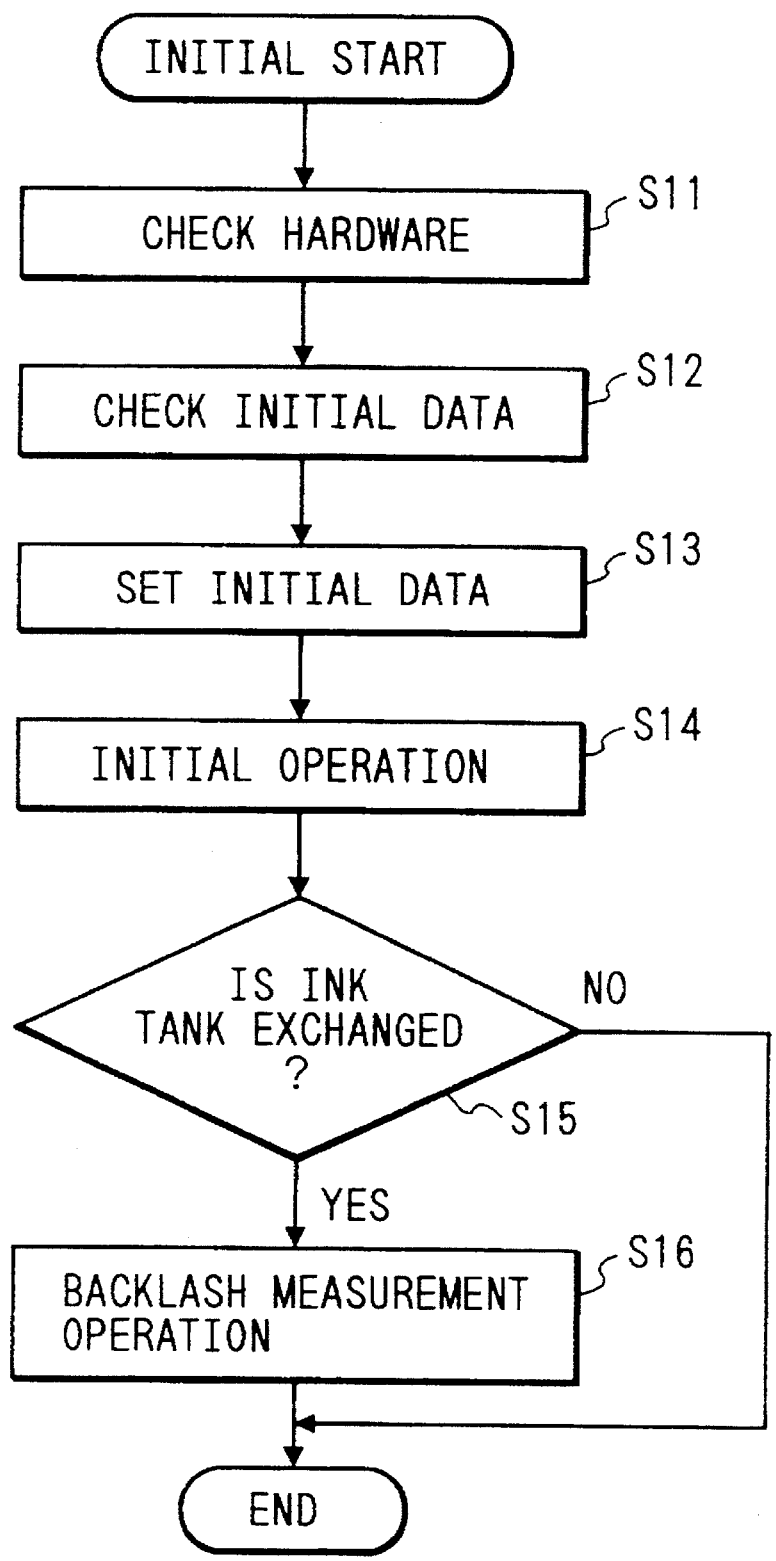
FIG. 11 is the same view as FIG. 6 but for an apparatus according to another embodiment of the present invention.

In this respect, when ink tanks are replaced, the replaced one may be a new ink tank or the one which has already been in use. In this case, too, it may be possible to arrange the automatic operation of the backlash measurement. The control flow in such a case is shown in FIG. 11. In FIG. 11, the step S11 to step S14 are the same as those shown in FIG. 6. In the subsequent step S15, the replacement of the ink tanks is checked. Then, on condition that the ink tank has been replaced, a backlash measurement operation will be executed in step S16.

As described above, since the structure of an ink jet recording apparatus according to the present invention is such that in response to the weight changes of its carriage, the apparatus is able to automatically modify the backlash correction data used for the delayed timing of a recording operation in accordance with the backlash amount of the carriage driving system at any time, it is possible to demonstrate the conspicuous effects as given below.

1. There is no need for the user to execute any troublesome modification of the backlash correction data by use of switches and others at any time.
2. The switches and others are no longer needed for such modification, making it possible to reduce the number of parts and simplify the apparatus configuration, leading to the implementation of the cost down for the apparatus.

Now, in accordance with a second embodiment to a fifth embodiment, the description will be made of an ink jet recording apparatus capable of informing the use of the reduced ink remains, and of increasing the number of the recordable sheets.

Figure 15:
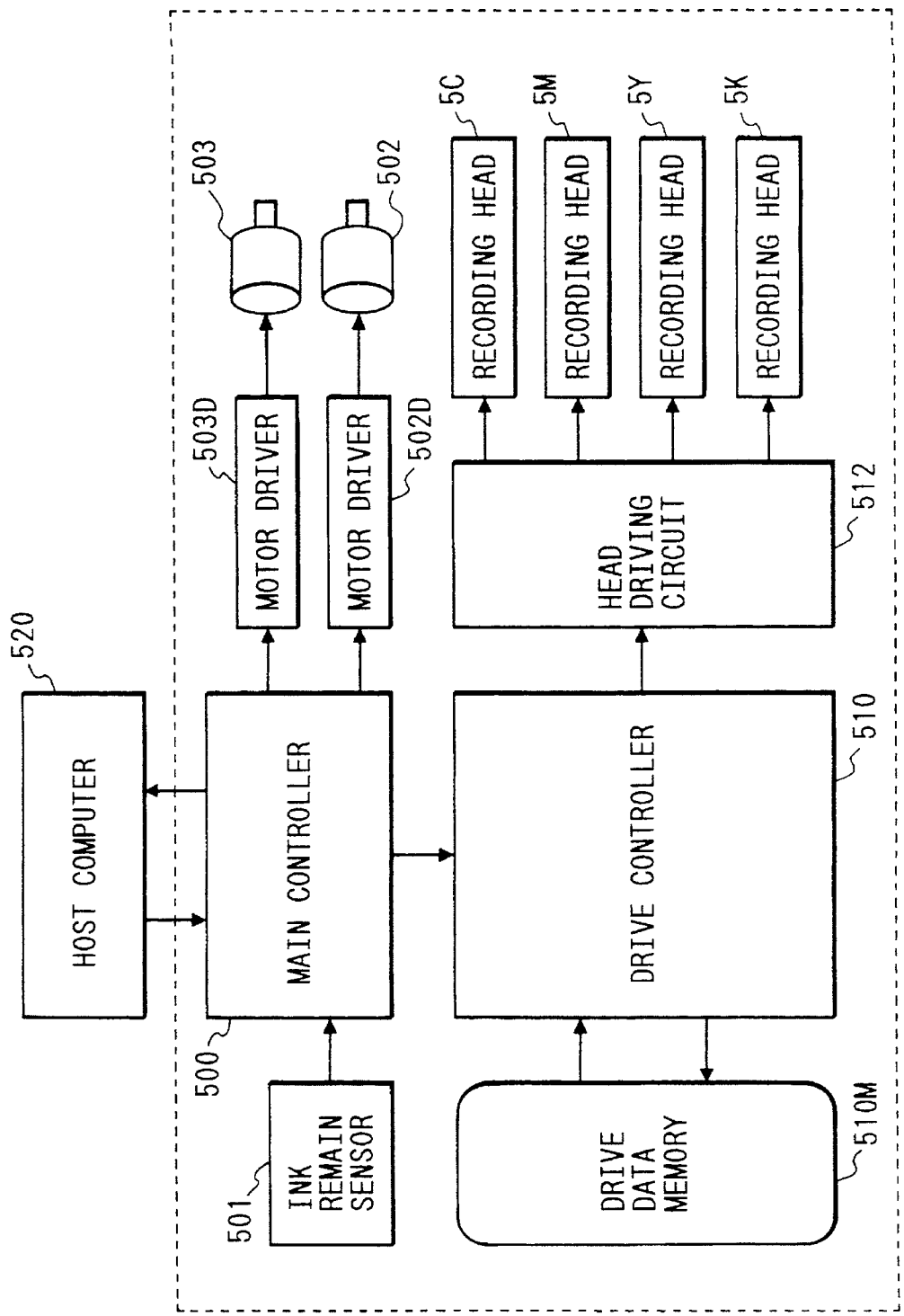
FIG. 15 is a block diagram showing the electrical structure of an ink jet recording apparatus according to an embodiment.

FIG. 15 shows the principal structure of such an ink jet recording apparatus, which is characterized in that using an ink remain sensor 501, the reduced amount of the ink remains in an ink cartridge is detected, and then, the ink consumption by the recording head per unit time is reduced, and that the density of images to be recorded by the recording head is reduced, thus informing the user of the reduced amount of ink remains, and increasing the number of recordable sheets.

(Second Embodiment)

An ink jet recording apparatus according to the present embodiment is the same as the recording apparatus shown in FIG. 1 for the foregoing embodiment. Therefore, the description thereof will be omitted.

FIG. 12 is a schematic view illustrating the structure of the ink jet recording head used for the present embodiment.

For each of the nozzles 106, a heat generating element (heater) 104 is provided corresponding thereto. When applying a given energy by a head driving circuit to the heater 104, the change of state due to the film boiling in ink, namely, a foaming phenomenon, is created so that the ink droplet is discharged from each discharging port 102.

Here, the heater 104 is formed on the silicon substrate 101 by the same technique used in the semiconductor fabrication process. A reference numeral 103 designates the nozzle partitions constituting each of the nozzles 106; 105, a common liquid chamber to supply ink to each of the nozzles 106; and 107, a ceiling plate.

Now, in conjunction with FIGS. 13A to 13D, the driving pulses of the recording head will be described in detail. To the head driving circuit, the record timing signal (FIG. 13A) and the recording data corresponding to the recording density are inputted. At first, by the record timing signals (FIG. 13A), a first pulse (prepulse) of a rectangular wave having a width T1 is applied to the heater 104 at a voltage V1 in FIG. 13B. At this time, any generation of bubbles which contributes to discharging ink droplets does not take place in the vicinity of the heater 104 in the nozzle 106. In other words, no ink discharge occurs. The first pulse heats the ink in the nozzle 106. It works particularly in order to reduce the viscosity of the ink. In continuation, after the time T2 has elapsed at the voltage 0, a rectangular second pulse having a width T3 is applied to the heater 104 at a voltage V2. Here, the voltages of the first and second pulses are the same, that is, V1=V2. The width of the second pulse is longer than that of the first pulse, that is, T1<T3. The second pulse has the voltage and width which are good enough to allow its applied electrical energy to create bubbles in the nozzle 106 so that the ink is discharged from the discharging port 102.

Figure 14A:
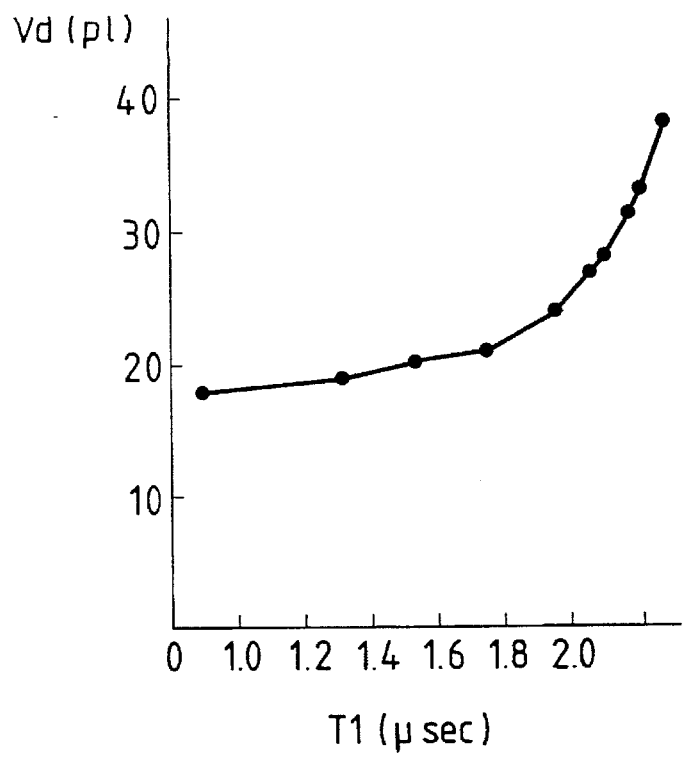
FIGS. 14A and 14B are a characteristic graph showing the prepulses T1 of a recording head driving, and a characteristic graph showing the volume of discharged ink and the densities of a recording image formed on a recording medium, respectively.

FIG. 14A is a graph in which the characteristics of the pulse width of the prepulse T1 and the volume Vd of discharged ink are plotted. It is understandable from FIG. 14A that the volume of discharged ink changes corresponding to the pulse width of the prepulse T1. In the present embodiment, this characteristic property is utilized. When the ink remains in the ink cartridge become less than a specific amount and then the remains are regarded as small, the pulse width of the prepulse T1 is made smaller than the usual width in order to reduce the volume of ink to be discharged.

Figure 14B:
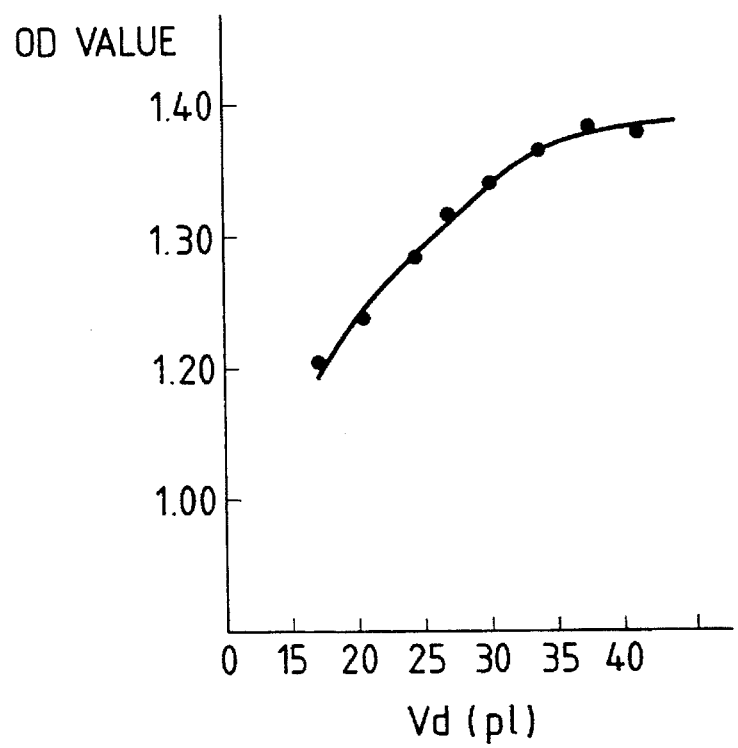

FIG. 14B is a graph in which the characteristics of the volume Vd of the discharged ink and the optical reflection density (OD value) of the recorded image are plotted.

It is understandable from the FIG. 14A and FIG. 14B that the density of the recorded image changes corresponding to the variation of the pulse width of the prepulse T1.

FIG. 15 is a block diagram showing the electrical structure of the ink jet recording apparatus according to the present embodiment.

In FIG. 15, the main controller 500 which controls the apparatus as a whole comprises a CPU executing the process procedures in the mode of a microprocessor, and a ROM storing a program providing the process procedures among others, and connected to the host computer 520, an ink remain sensor 501, a motor driver 503D, a motor driver 502D, and the driver controller 510 which manages recording image data. A reference numeral 5C designates a recording head which discharges cyan ink; 5M, a recording head which discharges magenta ink; 5Y, a recording head which discharges yellow ink; and 5K, a recording head which discharges black ink. Being controlled by the main controller 500, the motor driver 502D drives a carriage motor 502 which in turn drives the carriage 1. The motor driver 503D drives a feed motor 503 which conveys a recording medium.

Here, when the ink remain sensor 501 detects the reduced ink amount, the main controller 500 controls and drives the driver controller 510 with a recognition that the ink remains become less than a first threshold value, and then, through the head driving circuit 512 which transfers the driving signals and recording data to the recording heads, the controller provides the recording heads 5C, 5M, 5Y, and 5K with the driving pulse having the pulse width of prepulse T1 which is made shorter than usual as shown in FIG. 13C on the basis of the data in the driving data memory 510M temporarily holding the recording image data.

In this way, the density of the recorded image becomes lower than usual. Also, the driving is controlled when the main controller 500 determines on the basis of the detection signal from the ink remain sensor 501 that the ink remains become lower than the second threshold value which is smaller than the value of the first threshold value. Hence, the driving pulse having the pulse width of the prepulse T1 which is made shorter still is output to the recording heads as shown in FIG. 13D. In this way, the density of the recorded image is reduced furthermore. As the method for detecting ink remains by the ink remain sensor 501, there are various known methods, such as a method to detect the reduced ink remains in the ink container with the magnitude of a current running across two electrodes through the ink; a method to detect them by the variation of pressure in the ink liquid passage which connects an ink container and recording head; or a method to estimate the amount of used ink by counting the number of recorded dots; a method to detect them by the variation of ink liquid level according to the transmitting condition of the combined light emitting element and photo detecting element. Here, any one of them is applicable.

As described above, along the reduction of the ink remains, the pulse width of the driving pulse applied to the heat 104 is controlled, thus reducing the density of the recorded image in order to inform the user of the reduced ink remains. Also, it is possible to increase the number of recorded sheets subsequent to such an arrangement to inform the user of the reduced ink remains.

(Third Embodiment)

In a third embodiment, the fundamental structure of an ink jet recording apparatus is the same as that of the first embodiment. Therefore, the description thereof will be omitted.

Figure 16A:
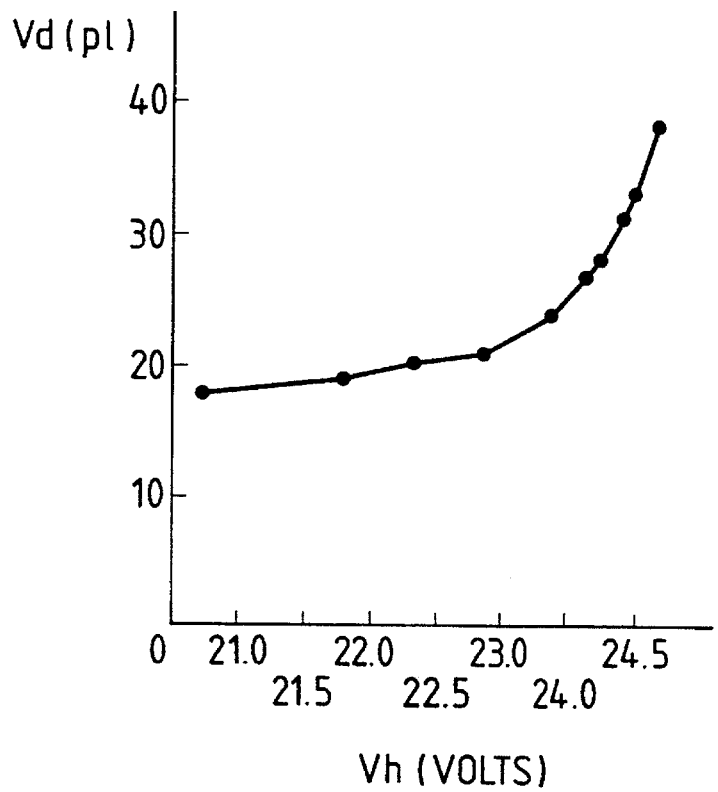
FIGS. 16A and 16B are a characteristic graph showing the recording head driving voltages Vh and the volume of discharged ink, and a characteristic graph showing the volume of discharged ink and the densities of a recording image formed on a recording medium, respectively.

FIG. 16A is a graph in which the characteristics of the heat driving voltage Vh and the volume Vd of discharged ink are plotted. It is understandable from FIG. 16A that the volume of discharge ink changes corresponding to the heater driving voltage Vh. In the present embodiment, this characteristic property is utilized. When the ink remains in the ink cartridge become less than a specific amount, and the remains become small, the head driving voltage Vh is made smaller than the usual head driving voltage Vh to make the volume of discharged ink smaller.

Figure 16B:
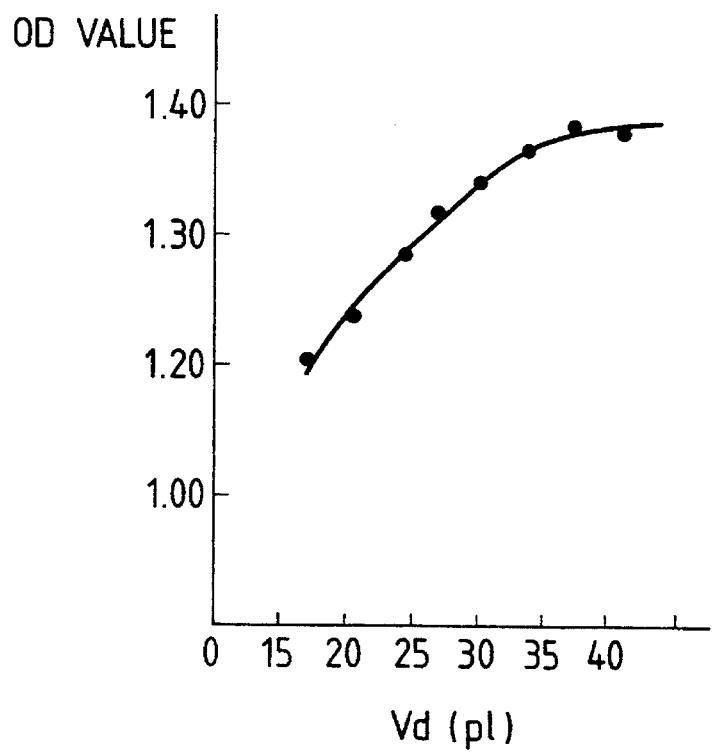

FIG. 16B is a graph in which the characteristics of the volume Vd of discharged ink and the optical reflection density (OD value) of the recorded image are plotted.

From FIG. 16A and FIG. 16B, it is understandable that the density of recorded image changed corresponding to the variation of the head driving voltage Vh.

Figure 17:
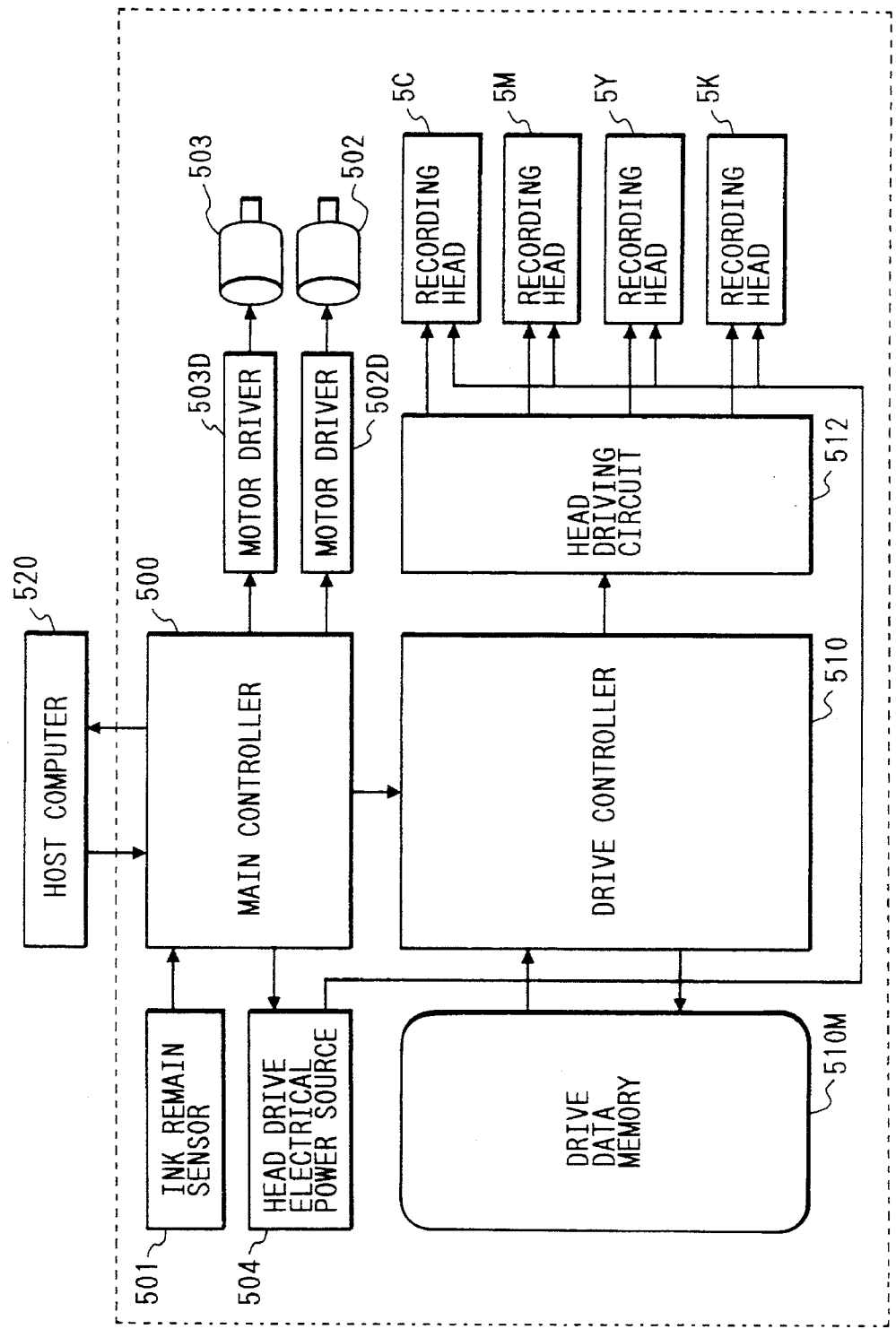
FIG. 17 is a block diagram showing the electrical structure of an ink jet recording apparatus according to an embodiment.

FIG. 17 is a block diagram showing the electrical structure of an ink jet recording apparatus according to the present embodiment. Receiving the detection signal from the ink remain sensor 501, the main controller 500 controls the head driving voltage Vh of the head driving power-supply 504 to the recording heads 5C, 5M, 5Y, and 5K. When the ink remains become less than a given threshold value, the controller makes the magnitude of the head driving voltage Vh smaller than usual in order to reduce the density of the recorded image.

As described above, with the reduced density of the recorded image by controlling the head driving voltage Vh applied to the heater 104, it is possible to inform the user of the reduction of the ink remains, and then, to increase the number of recordable sheets after such event to inform the user of the reduced ink remains, hence preventing the data on recording from being lost.

(Fourth Embodiment)

In a fourth embodiment, the fundamental structure of an ink jet recording apparatus is the same as that of the first embodiment. Therefore, the description thereof will be omitted.

Also, the ink jet recording apparatus shown in the present embodiment is provided with the temperature detecting means arranged for the recording head to detect its temperature, and heating means for keeping the head temperature at a certain constant level for the purpose of stabilizing the provision of the recorded images when the temperature is low.

Figure 18A:
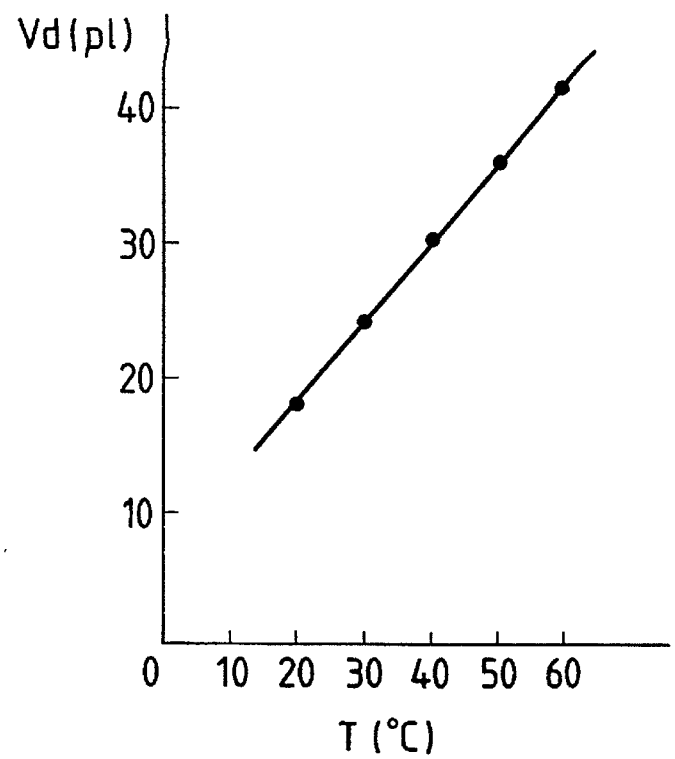
FIGS. 18A and 18B are a characteristic graph showing the recording head controlled temperatures and the volume of discharged ink, and a characteristic graph showing the volume of discharged ink and the densities of a recording image formed on a recording medium, respectively.

FIG. 18A is a graph in which the characteristics of the controlled temperature of the ink jet recording head and the volume of discharged ink are plotted. From FIG. 18A it is understandable that the volume of discharged ink changes corresponding to the controlled temperature of the recording head. In the present embodiment, this characteristic property is utilized. When the ink remains in the ink cartridge become less than a specific amount and the remains become small, the controlled temperature of the recording head is made lower than the usually controlled temperature of the recording head in order to make the volume of discharged ink smaller.

Figure 18B:
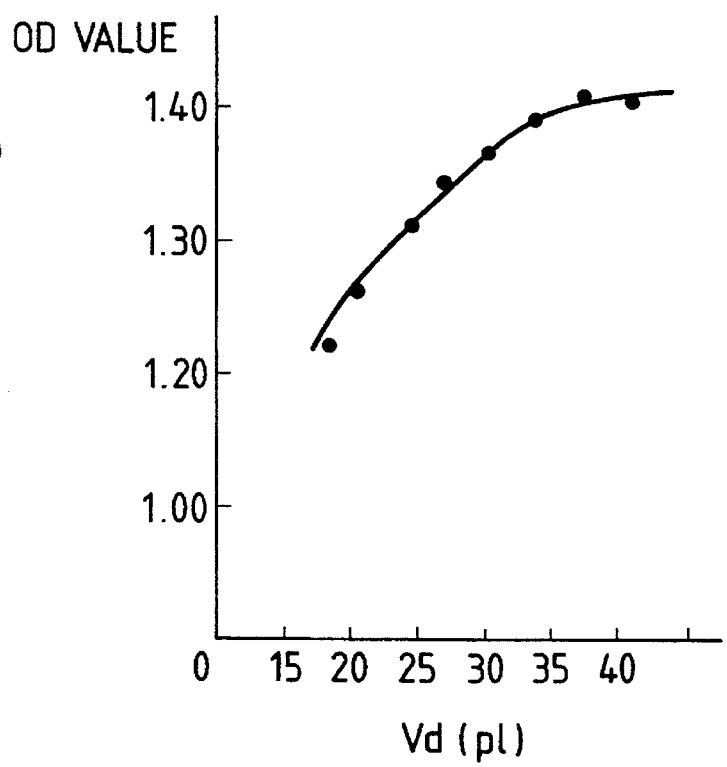

FIG. 18B is a graph in which the volume Vd of discharged ink and the optical reflection density (OD value) of the recorded image are plotted.

From the graphs shown in FIG. 18A and FIG. 18B, it is understandable that the density of the recorded image changes corresponding to the variation of the controlled temperature of the recording head.

Figure 19:
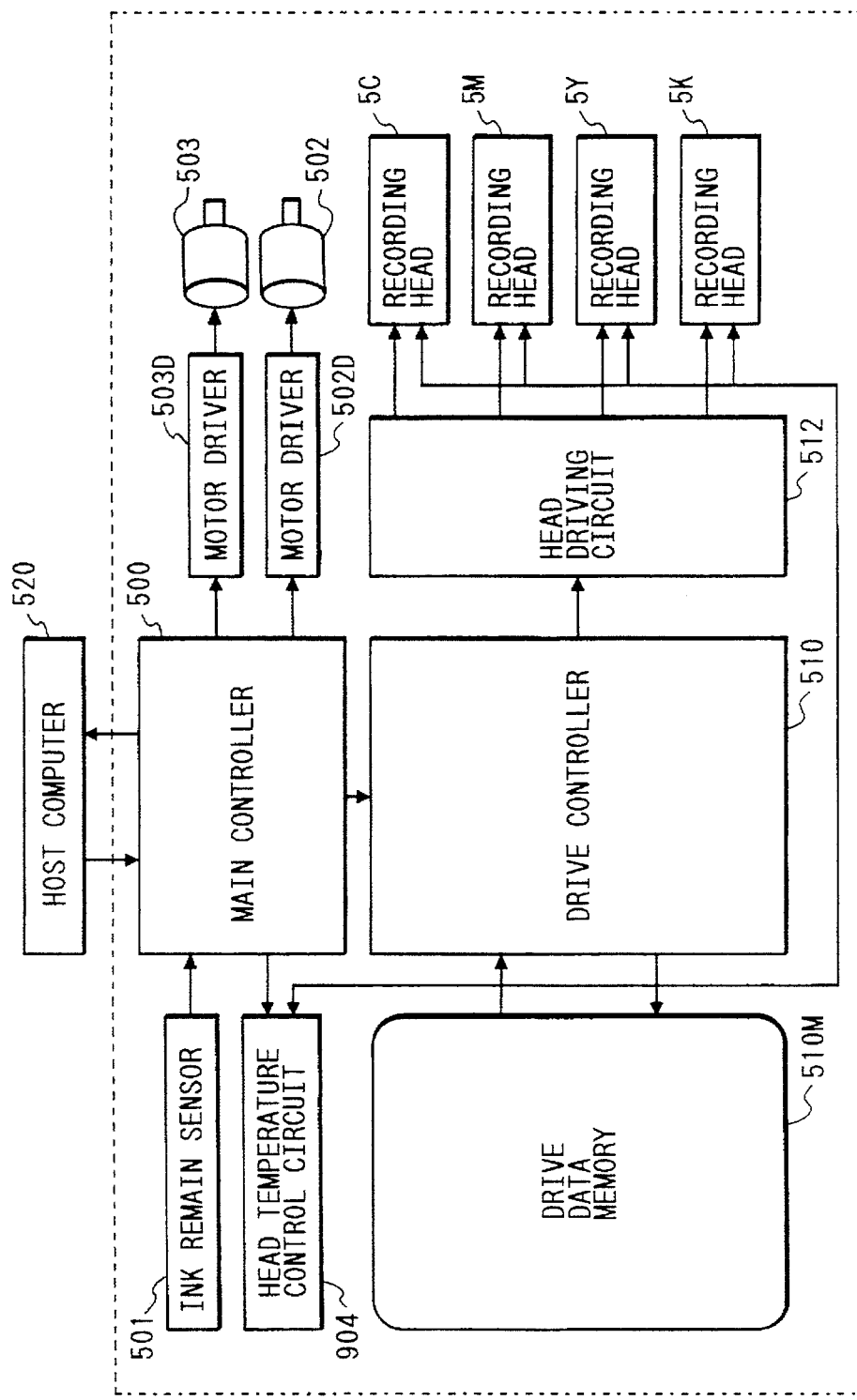
FIG. 19 is a block diagram showing the electrical structure of an ink let recording apparatus according to an embodiment.

FIG. 19 is a block diagram showing the electrical structure of an ink jet recording apparatus according to the present embodiment. In the present embodiment, the temperature detecting means and heating means which are not shown are provided for each of the recording heads. Receiving the detection signal from the ink remain sensor 501, the main controller 500 drives a heat temperature control circuit 904 for controlling the heating means provided for the recording head on the basis of the temperature detection signal detected by the temperature detection means. Hence, when the ink remains become less than a given threshold value, the controller makes the controlled temperature of the recording head lower than the usual controlled-temperature in order to reduced the density of the recorded image.

As described above, by controlling the controlled temperature of the ink jet recording head, the density of the recorded image is reduced so that the user is informed of the reduced ink remains. It is also possible to increase the sheet numbers which are still recordable by use of such reduced ink remains, hence preventing the data on recording from being lost as much as possible.

(Fifth Embodiment)

In a fifth embodiment, the fundamental structure of an ink jet recording apparatus is the same as that of the first embodiment. Therefore, the description thereof will be omitted.

In general, for a printer which records on a recording medium by receiving the recording data from the host computer, there is prepared a printing mode in accordance with recording methods depending on the purpose of printing.

FIGS. 20A and 20B show an example of draft printing modes. In FIGS. 20A and 20B, the mode will be described by exemplifying the letter A of the alphabet. FIG. 20A represents the structure of recording data at the time of a normal printing. FIG. 20B represents a case where the data on the recording pixels are not recorded by every pixel, but the number of recording pixels is thinned approximately by a half. In this way, this mode is able to make the recording speed almost double. Also, since the recording pixels are reduced by a half at that time, the ink consumption by the ink jet recording apparatus will be reduced almost by a half. However, as the density of the recorded image is reduced, the user should select a draft printing mode by operating switches and others as required.

In the present embodiment, the foregoing draft printing mode is utilized. In the ink jet recording apparatus, there is provided the means which enables the apparatus to shift itself automatically to the draft printing mode or a mode to make the number of the recording pixels small when the ink remains in the ink cartridge become smaller than a specific value.

Figure 21:
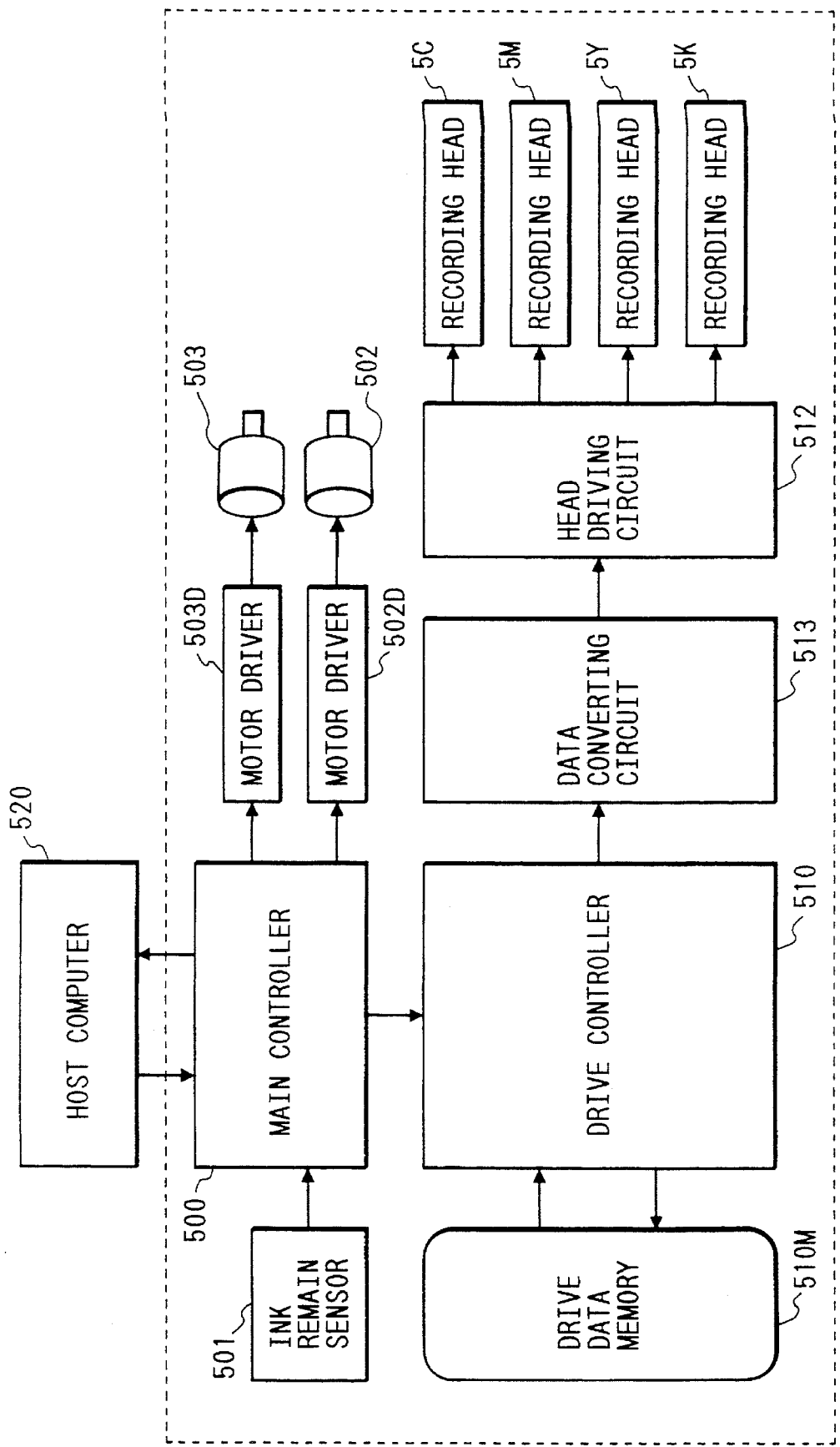
FIG. 21 is a block diagram showing the electrical structure of an ink jet recording apparatus according to an embodiment.

FIG. 21 is a block diagram showing the electrical structure of an ink jet recording apparatus according to the present embodiment. In FIG. 21, a reference numeral 513 designates a data converting circuit which processes or converts the recording data in accordance with the command from the main controller 500. If the main controller determines that the ink remains become less than a given threshold value when receiving the detection signal from the ink remain sensor 501, the controller drives the data converting circuit 513 for controlling, thus driving the recording head in the foregoing draft printing mode or the mode to automatically make the number of recording pixels smaller through the head driving circuit 512 in order to reduce the density of the recorded image.

As described above, by the ink let recording apparatus, it is possible to inform the user of the reduced ink remains by reducing the recording pixel numbers of the recording data so that the density of recorded image can be reduced, and further, to increase the number of recordable sheets after that event.

Each of the aforesaid second to fifth embodiments can be exclusively executed independent of others, but plural embodiments are executable in combination. For example, after the second embodiment is executed according to the condition of the reduced ink remains, the fifth embodiment will be executed when the ink remains are further reduced.

Also, for the foregoing embodiments, the description has been made of an ink jet recording technique which utilizes the film boiling to be created in ink as an example. However, it may be possible to apply some other ink jet recording techniques including the one using the piezoelectric method.

Here, in each of the above-mentioned embodiments, the ink remain sensor can be installed for each color or each ink cartridge. Then, when the density of recorded image is reduced after the detection of the reduced ink remains, there are still such cases where the color recording heads are used; the density is reduced for all of the four colors, yellow, magenta, cyan, and black; the density is reduced only for a specific color; and the density is reduced only for the color ink the ink remains of which have become small. Also, for a full-color image recording, it is effectively adoptable to arrange a structure so that the density is reduced for all the colors in order to keep balance in densities.

As described above, by an ink jet recording apparatus according to the present invention, it is possible to reliably inform the user of the reduced ink remains by monitoring the ink remains in the ink container; controlling the energy which is given to the recording head when the ink remains become less than a specific amount; controlling the controlled temperature of the recording head; or reducing the density of the recorded image by making the recording pixel numbers of the recording data small. Also, it is possible to increase the recordable amount after the ink remains in the ink container have become small because the arrangement is made then to reduce the ink consumption. Further, along the remarkable popularization of personal computers in recent years, there are demands on compact and inexpensive recording apparatuses in this field of industry, too. In this respect, according to the present invention, there is no longer any need for the special arrangement of the lamp and display device which are integral parts of the conventional ink jet recording apparatus to inform the user of the reduced ink remains, yet it is possible to reliably inform the user of the reduced ink remains; hence enabling the provision of an inexpensive recording apparatus.

Figure 26:
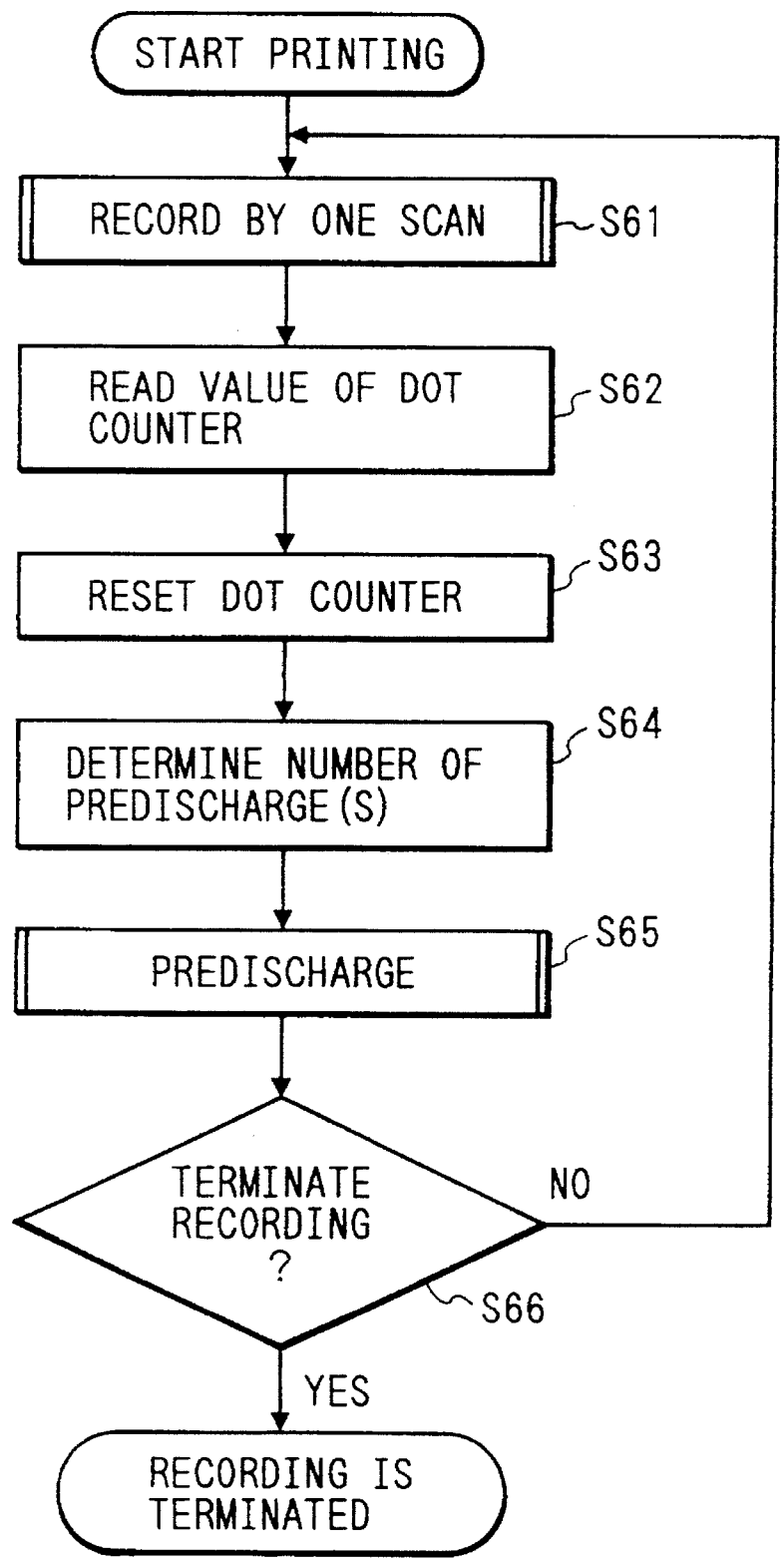
FIG. 26 is a flowchart showing the procedures of a preliminary discharge control according to the abovementioned embodiment.

Now, in accordance with a sixth to tenth embodiments, the description will be made of an ink jet recording apparatus capable of curtailing the consumption of the ink remains by the discharge recovery process to attain the effective use of ink, and of implementing the reduction of the running cost as well. The principal structure is shown in FIG. 26. The apparatus is characterized in that the discharging number of the recording head is counted for the recording per scan, and then, the preliminary discharge based on the discharging numbers is arranged in such a manner that the discharging numbers of the preliminary discharge are made smaller if the discharging number per scan is greater.

In the present embodiment, the fundamental structure of the ink jet recording apparatus is the same as that of the first embodiment. Therefore, the description thereof will be omitted.

(Sixth Embodiment)

Figure 25:
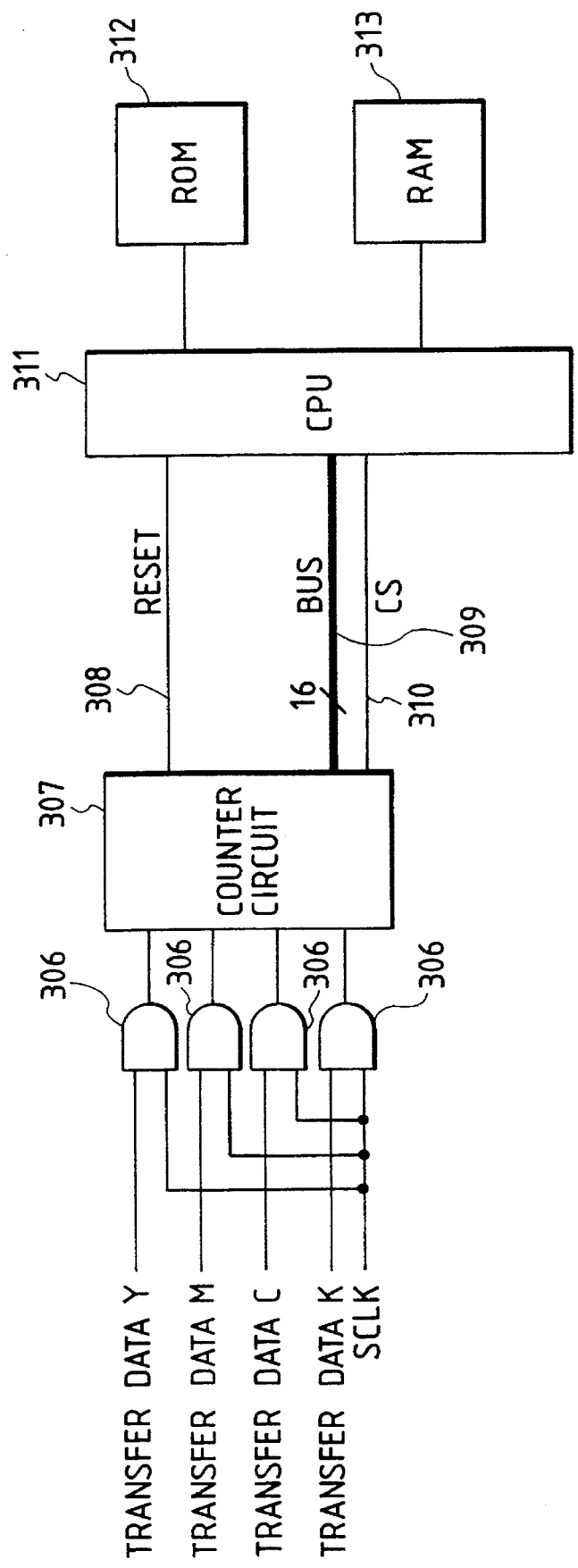
FIG. 25 is a block diagram showing the structure whereby to count the discharging numbers according to an embodiment of the present invention.

FIG. 25 is a block diagram showing the counter circuit which counts the dot numbers of discharging data, which is installed in the controller in the above-mentioned ink jet recording apparatus.

The transfer data Y, M, C, and K which are the discharging signals for yellow, magenta, cyan, and black, respectively, are synchronized by the data transfer clock SCLK and the output of the AND gate 306 thereby to enable the counter circuit 307 to count the discharging numbers per color. A reference numeral 308 designates a reset signal line for resetting the counter in the counter circuit 307; and 309, a 16-bit bus to transfer the data counted by the counter circuit 307. These reset and data signals are allowed to correspond to each color by the chip select signal CS of the signal line 310. A reference numeral 311 designates a CPU which controls each of the signals; 312, a ROM which stores a program for such controls as well as the tables shown in FIGS. 27A and 27B; and 313, a RAM for working area.

FIG. 26 is a flowchart showing the preliminary discharge control according to the present embodiment.

In step S61, whether or not one scan is completed is checked. If one scan is over, the dot counter value for each color is read in step S62 to store each value in the RAM 313 shown in FIG. 25. In the next step S63, the value of the dot counter is cleared by the reset signal of the counter circuit 307. In step S64, the preliminary discharging numbers are determined in accordance with the stored discharging numbers as above by referring to the dot counter value preliminary discharging number conversion table shown in FIG. 27A if the color head is used, or by referring to the dot counter value preliminary discharging number conversion table shown in FIG. 27B if the black head is used. In step S65, the preliminary discharge operation is executed on the basis of the discharging number thus determined. This preliminary discharge operation is executed by allowing the carriage which mounts the color and black cartridges on it to travel to the position where the carriage receives the preliminary discharge (see 112 in FIG. 1).

In step S66, if the recording is determined yet to be completed, the process will return to the step S61. If the recording is completed, the current process will be terminated.

Now, if the recording is executed by discharging from the entire discharging ports in the mode using only the black head according to the present embodiment, for example, a preliminary discharge of 200 shots should have been executed irrespective of the discharging numbers according to the conventional control, but actually, the discharging numbers are 184,320, which correspond to more than 180, 000 at the bottom stage in FIG. 27B in the present embodiment. Therefore, the preliminary discharging numbers become 20 shots. In this way, compared to the conventional control, a preliminary discharge can be executed with a small ink consumption according to the present embodiment.

In this respect, the counting of the discharging numbers is executed for the entire head in the present embodiment, but it is preferable to execute the counting of the discharging numbers per given block in the nozzles in the head rather than for the entire head or further preferable to execute it per nozzle. If the preliminary discharging numbers can also be changed in response to such counting, the controlling effects will be further enhanced. Then, it becomes possible to execute the preliminary discharges appropriately for the nozzles having many discharging numbers and those having small discharging numbers as well. Such an example will be described in the next embodiment.

(Seventh Embodiment)

In the sixth embodiment as described above, the discharging numbers are counted by use of the dot counter circuits for the four colors, yellow, magenta, cyan, and black; and then, the discharging numbers of the preliminary discharge are changed per color unit. However, according to the present embodiment, an example is shown in which the dot counter circuit is provided to count the discharging numbers further per discharge port unit so that the discharging numbers of the preliminary discharge are changed for each unit of the discharging ports.

Figure 28:
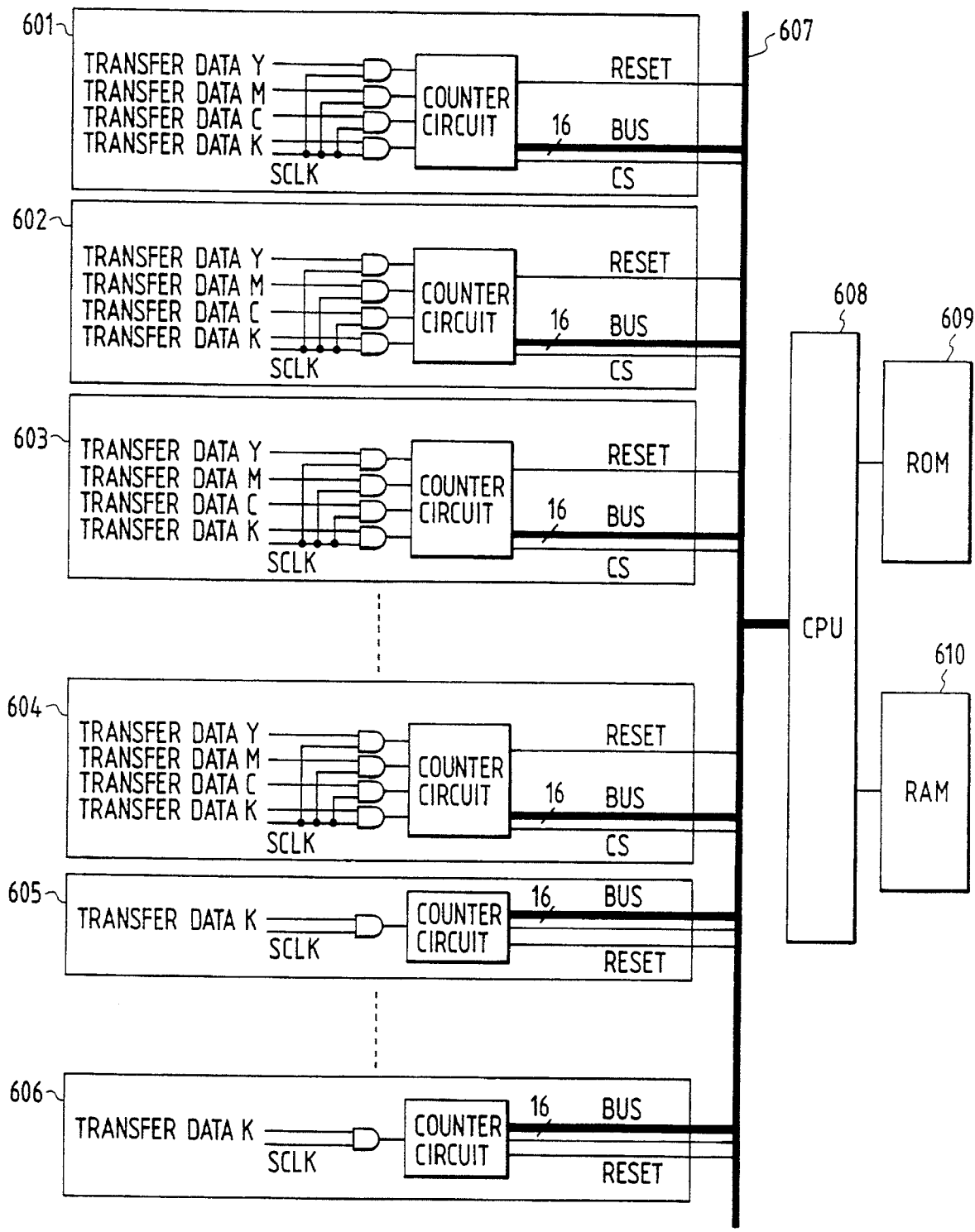
FIG. 28 is a block diagram showing the structure whereby to count the discharging numbers per unit of discharging ports according to an embodiment of the present invention.

In FIG. 28, a reference numeral 601 designates the dot counter circuit for counting the discharging numbers from a first discharging port of each of the heads for yellow, magenta, cyan, and black; 602, and 603, also dot counter circuits for counting the discharging numbers from a second discharging port and a third discharging port. 24 circuits exist for each nozzle, and the counter circuit for discharging numbers at the 24th discharging port is designated by a reference numeral 604. The three color heads, yellow, magenta, and cyan, have 24 discharging ports each. Accordingly, the counter circuits are also 24 as described above. However, the head for black has 64 discharging ports, and counter circuit for the discharging numbers are designated by reference numerals 605 to 606 for counting the discharging numbers of the 25th to 64th discharging ports. A reference numeral 606 designates the counter circuit for counting the discharging numbers of the 64th discharging port.

A reference numeral 607 designates a bus for transferring the control signals and data signals from each of the above-mentioned circuits; 608, a CPU which controls each signal; 609, a ROM which stores the program for such controls and the table shown in FIG. 27C; and 610, a RAM for working area.

With the circuit structure as above, the discharging numbers are calculated, and referring to the preliminary discharging number conversion table per discharging port unit shown in FIG. 27C, the CPU controls the systems as in the first embodiment so that the preliminary discharge can be controlled exactly per discharging port unit.

(Eighth Embodiment)

Figure 29:
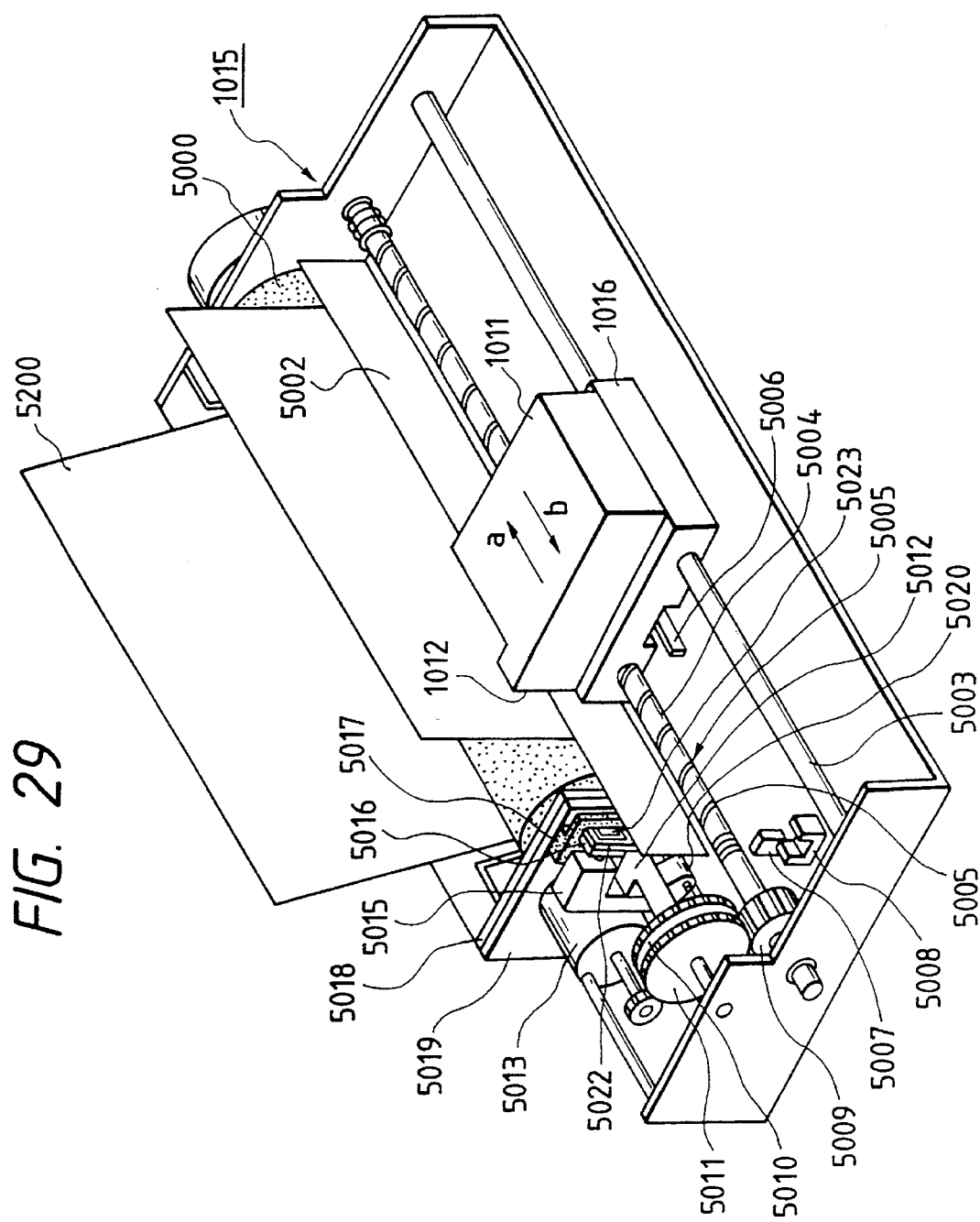
FIG. 29 is a perspective view showing an ink jet recording apparatus according to an embodiment of the present invention.

FIG. 29 is a perspective view showing the brief appearance of an ink jet recording apparatus according to an eighth embodiment.

Here, an ink cartridge 1011 is the one having an ink jet recording head and an ink tank containing ink which are integrally formed on it, and is installed on a carriage 1016 to form images. Hereinafter, with reference to FIG. 29, its operation will be described.

A lead screw 5005 on which a spiral groove 5004 is engraved is interlocked with the regular and reverse rotations of the driving motor 5013 and rotationally driven through power transmission gears 5011 and 5009. The carriage 1016 is coupled to the spiral groove 5004 through a pin (not shown) on a part of the carriage, and further slidably guided by a guide rail 5003 to travel in the directions indicated by an arrow a or b in FIG. 29. A sheet pressure board 5002 presses a recording medium 5200 to a platen roller 5000 over the traveling direction of the carriage 1016. Photo-couplers 5007 and 5008 constitute home position detecting means to confirm the presence of the lever 5006 of the carriage 1016 in that region thereby to execute the reverse rotation of the driving motor 5013 and others. A capping member 5022 which covers the front end of the ink jet head 1012 is supported by a supporting member 5016 and provided with suction means 5015 for the execution of suction recovery of the ink jet head 1012 through the aperture 5023 in the cap. On the main body supporting board 5018, a supporting board 5019 is mounted. The cleaning blade 5017 which is slidably supported by this supporting board 5019 is installed to be able to advance by driving means (not shown) to or retract from the position where the blade abuts upon the discharging surface of the recording head. The mode of the cleaning blade 5017 is not limited to the configuration shown in FIG. 29. Any one of the known types is of course applicable to the present embodiment. The lever 5012 is to initiate the suction recovery operation, which travels along the operation of the cam 5020 which is in contact with the carriage 1016 in order to control the movement of the suction recovery mechanism by the driving force which is transmitted from the driving motor 5013 through a gear 5010 and known switching means such as clutch.

Each of the capping, cleaning, and suction recovery processes is executed by the function of the lead screw 5005 in the positions where each of them faces the carriage 1016, respectively, when the carriage arrives at the home position. In this respect, any one of the structures capable of executing the desired operation by the known timing may be applicable to the present embodiment.

Now, the detailed description will be made of the recording operation of this ink jet recording apparatus.

Figure 30:
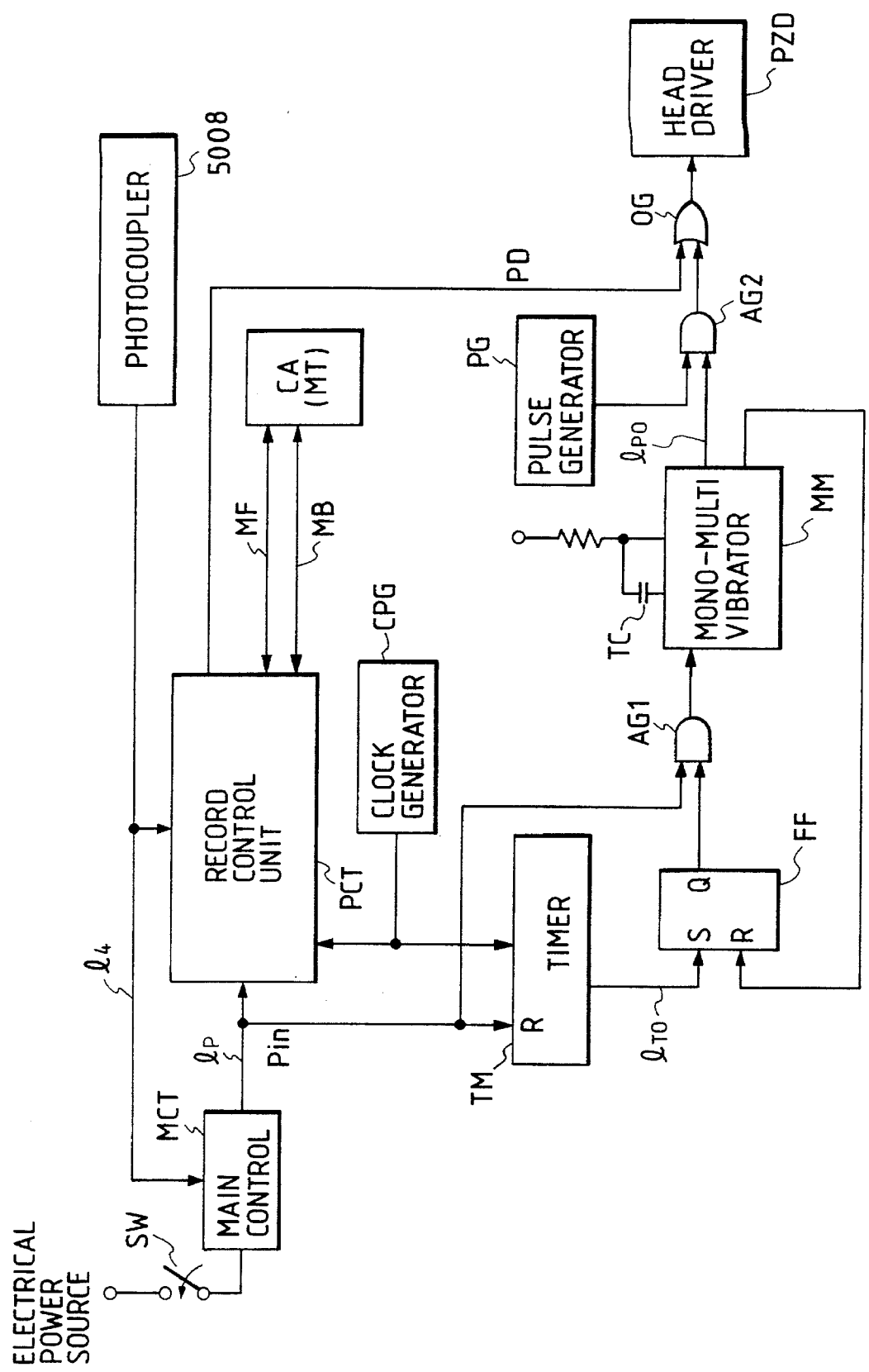
FIG. 30 is a block diagram showing a structure of control according to an embodiment of the present invention.
Figure 31:
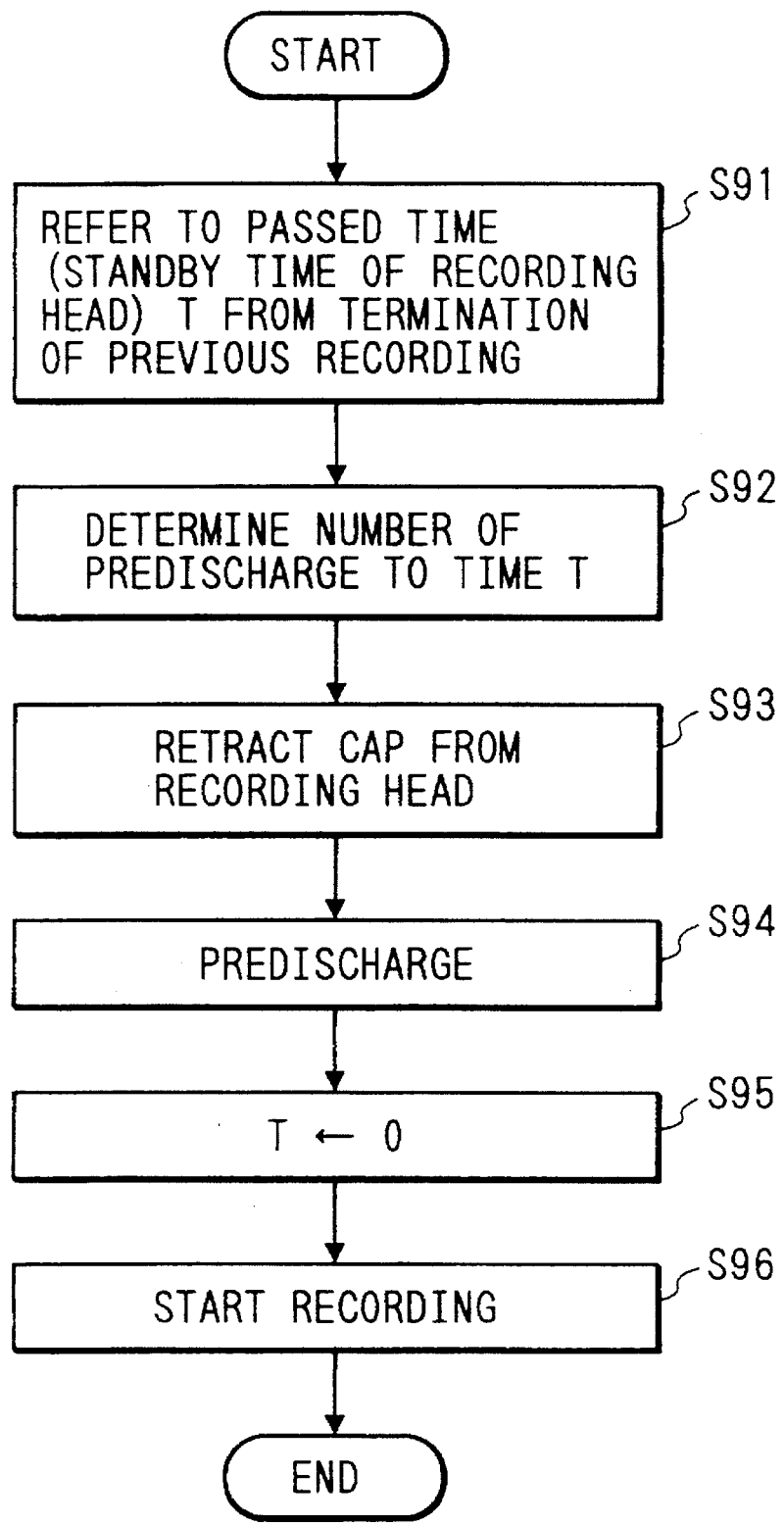
FIG. 31 is a flowchart showing the procedures of a preliminary discharge process according to an embodiment.

FIG. 30 and FIG. 31 are a block diagram and a flowchart illustrating the recording operation according to the present embodiment, respectively.

In FIG. 30, when the power-supply is turned on by a switch SW, a recording controller PCT sets the driving signals MF and MB for the regular direction and the reverse direction of the motor (for carriage driving) at "0" and "1", respectively, and then, drives the carriage 1016 in the reverse direction; thus fixing the carriage 1016 by lowering the motor driving voltage when the home position is detected.

With the above-mentioned operation, the preparation is completed for initiating the recording operation. Subsequently, the description will be made of the preliminary discharge when the recording is started at the recording standby state.

When an image signal Pin is inputted by the key input or the like into the recording controller of the recording apparatus, the time data T (an elapsed time from the completion of the last recording to the input of Pin, namely, the standby time of the recording head) which is stored in the timer TM is fetched. Then, referring to a table shown in FIG. 33, the number of preliminary discharges is determined corresponding to the aforesaid time data T. After that, a mono/multiple vibrator (hereinafter referred to as monomulti) MM is actuated through the AND gate AG1. When the monomulti MM operates, its output signal $1p_0$ outputs "1" over the period corresponding to the preliminary discharging numbers determined with respect to the aforesaid time data T.

When the output "1" is obtained from the monomulti output signal line $1p_0$, the flip-flop FF is reset by such signal. Also, the AND gate AG2 is opened so that the output of the pulse generator PG is inputted into the head driver PZD through the OR gate OG in the same manner as above. In this way, the ink droplets are being discharged as far as the monomulti MM is at "1". When the output of the monomulti MM becomes "0", the AND gate AG2 is closed, the output of the pulse generator PG is no longer transmitted to the head driver PZD. Then, the head driving control and the ink droplet discharge are executed by the usual recording output signal $P_D$.

In this respect, as the preliminary discharge starting at the recording standby state is still on standby, the discharge is executed toward the interior of the aperture 5023 of the cap 5022 located in the home position.

Now, with reference to a flowchart shown in FIG. 31, the description will be made of the setting of the discharging numbers for the preliminary discharge starting at the aforesaid recording standby state. At first, when an image signal Pin is inputted, a process shown in FIG. 31 is interrupted. Then, in step S91, the time which has elapsed from the completion of the last recording to the input of the current Pin, that is, the recording head standby time T, is fetched from the timer TM. The process will proceed to step S92. In the step S92, the preliminary discharging numbers are determined corresponding to T by referring to the table of preliminary discharging numbers with respect to the standby time as shown in FIG. 11. After that, proceeding to step S93, the cap which has abutted on the discharging surface of the ink jet recording head is retracted, and then, in step S94, the preliminary discharges are executed for the numbers determined in the step S92. In step S95, the time T of the timer TM is resent to zero. The process will proceed to step S96 where the recording operation is executed.

In this respect, at the completion of the recording operation, the time is measured by the timer TM, thus holding the recording head standby time until the input of the next recording signal. Here, this standby time must be measured even during the period that the power-supply to the ink jet recording apparatus is suspended, it is necessary to keep a back up cell or use a non-volatile memory and others.

Subsequently, the description will be made of the table whereby to determine the preliminary discharging numbers in accordance with the recording standby time of the ink jet recording head.

Figure 32:
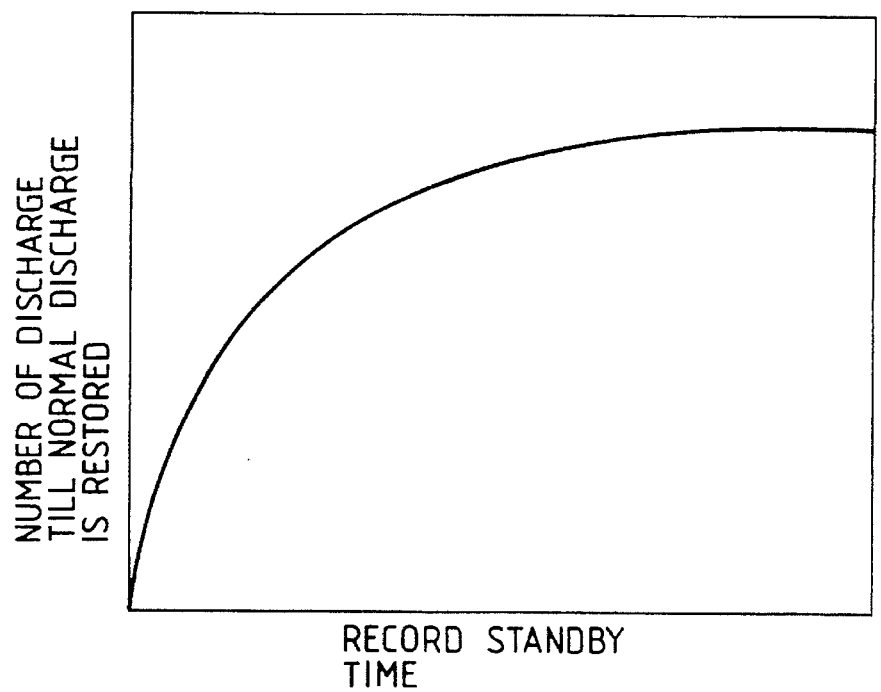
FIG. 32 is a line diagram showing the relationship between the standby time for recording and the preliminary discharging numbers.

FIG. 32 is a graph showing the relationship between the recording standby time and the discharging numbers required until the normal discharge is restored, that is, the minimum requirements of the preliminary discharging numbers, for the ink jet recording apparatus according to the present embodiment.

According to the study made by the inventors hereof, it is found that the evaporation of the ink solvent in the nozzles of the ink jet recording head advances from the discharging port side which is exposed to the atmosphere, and as the evaporation advances to the vicinity of the discharging ports, the evaporated condition is gradually developed into the interior of the nozzles, then it is further diffused in the nozzles. Therefore, while the recording standby time is short, the corresponding preliminary discharging numbers will increase as the time elapses. However, after the time has elapsed to a certain extent, the evaporation apparently reaches its saturation due to the progressed diffusion. Because of this, the rising rate of the preliminary discharging numbers becomes small and settled in a certain number of preliminary discharges. A table shown in FIG. 33 is the one which is prepared to enable the required process to be executed in an ink let recording apparatus on the basis of the variation of the preliminary discharging numbers as shown in FIG. 32.

With the structure as above, it is possible to define the amount of exhausted ink reliably by the discharge recovery process, hence curtailing the unwanted consumption of ink.

(Ninth Embodiment)

Figure 34:
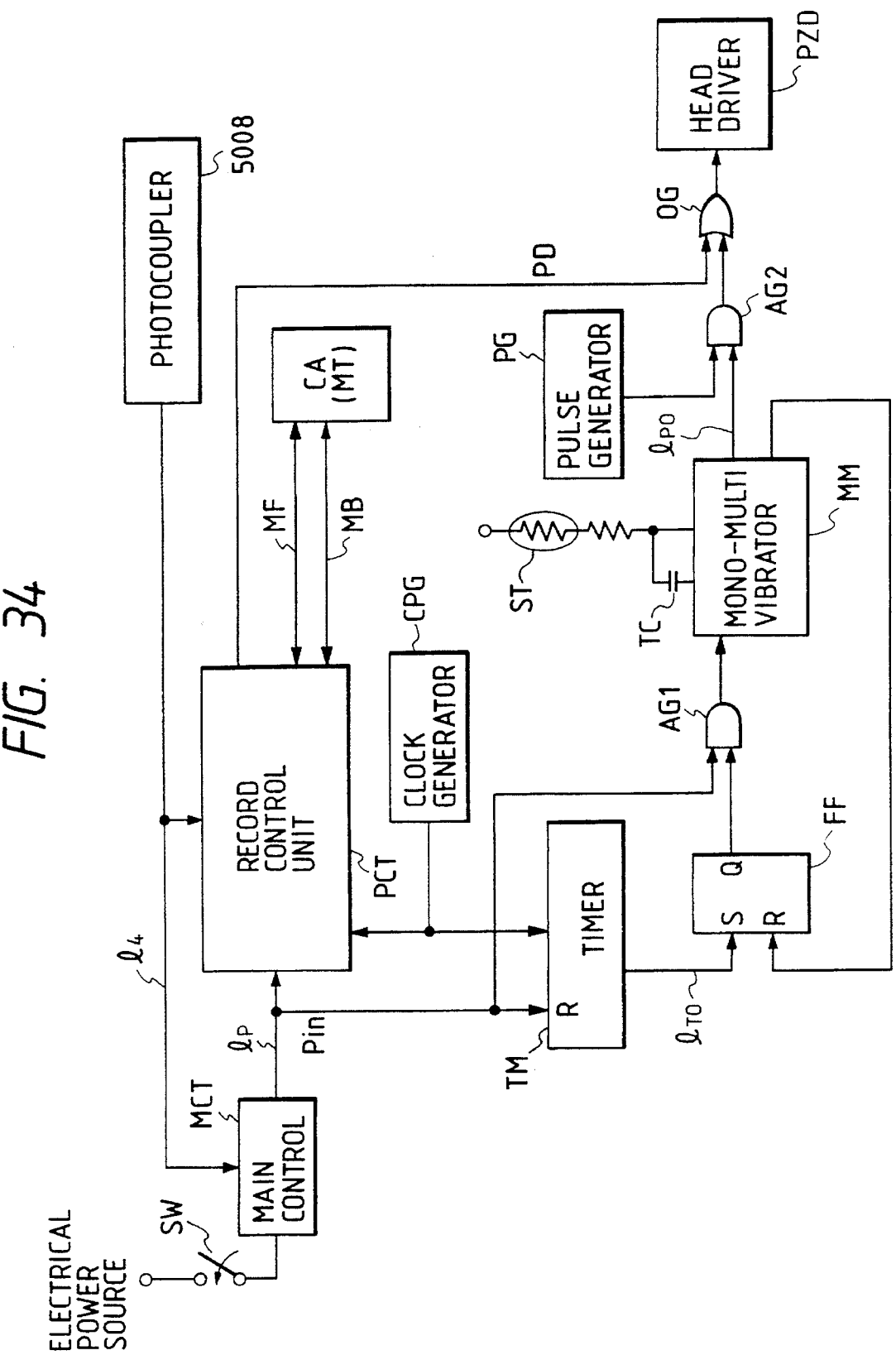
FIG. 34 is a block diagram showing the structure of control according to an embodiment of the present invention.

FIG. 34 is a block diagram showing a structure of control according to another embodiment of the present invention.

FIG. 34 shows the structure in which a temperature sensor ST is connected in series to the time constant circuit TC which is provided for the circuit structure shown in FIG. 30. This temperature sensor ST is to detect the circumferential temperature of the recording head when executing the preliminary discharges. By the output of this detection, the preliminary discharging numbers determined by referring to the table shown in FIG. 32 are increased or decreased in a further consideration of the temperature at the time of executing the preliminary discharge. In other words, this measure is taken in consideration of the fact that the material of ink is easily affected by temperature, and that even when the same energy is given to the discharges, the ease with which to discharge ink tends to vary. Particularly, when the temperature is lowered, such an effect appears as an increased viscosity of ink, and makes the discharge difficult. In order to avoid this, the preliminary discharging numbers at the low temperature is further increased. In order to make such an increase appropriate, the temperature characteristic of the temperature sensor ST and the constant of the time constant circuit TC are adjusted.

Also, the temperature sensor ST can be mounted in any arbitrary position if only such a position enables the sensor to measure the environmental temperature in the circumference of the recording head when starting its preliminary discharge in the recording apparatus shown in FIG. 29. Such a position can be determined arbitrarily according to the size of a recording apparatus or the available space in it: in the vicinity of the carriage 1016 or capping member 5022, or in the vicinity of the platen roller 5000, for example. Further, as the temperature sensor, it may be possible to use without any particular problem any sensor which is widely used for the purpose. For such a temperature sensor as this, there are a thermistor, a resistance thermometer element, a thermocouple, among others.

With the structure as above, it is possible to define the amount of exhausted ink more reliably, hence curtailing the ink consumption.

(Tenth Embodiment)

Figure 35:
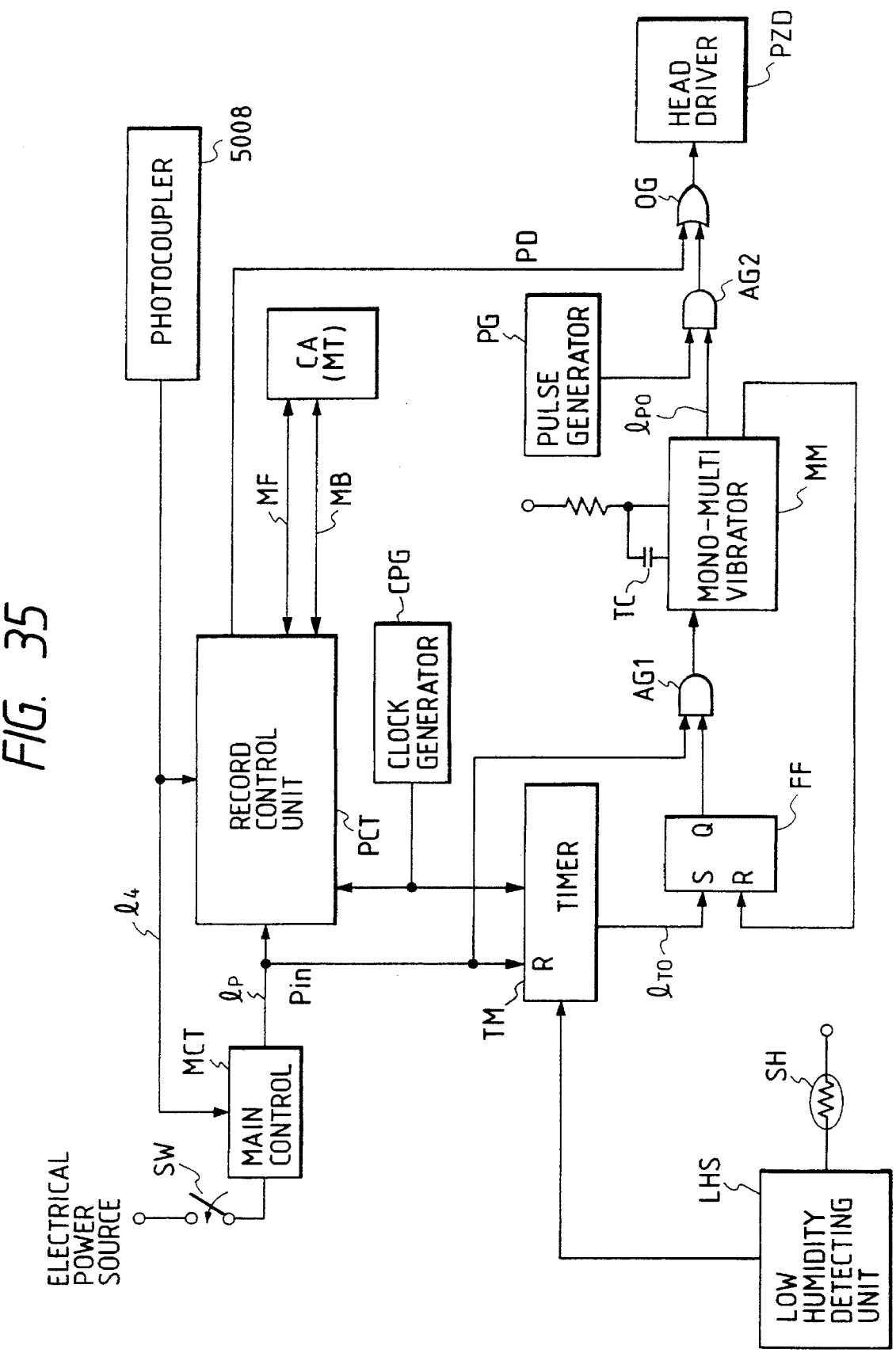
FIG. 35 is a block diagram showing the structure of control according to an embodiment of the present invention.

FIG. 35 is a block diagram showing the structure of control according to still another embodiment of the present invention.

FIG. 35 is a view showing a structure in which a humidity sensor SH and a low humidity detecting unit LHS are added to the circuit structure shown in FIG. 30. The circumferential humidity is detected for a recording head at the recording standby time. When the humidity which is lower than a specific level is detected, the timer TM is interrupted so that the period of the recording standby time is apparently increased. This measure is taken in consideration of the fact that the evaporation of ink solvent at the recording standby time is further promoted if the surrounding environment has a low humidity at that time. Particularly, the humidity in the circumference of the recording head becomes 40% RH or less, the evaporation is further promoted. Therefore, a threshold value is set for the timer interruption at the point where the output of the humidity sensor SH indicates the 40% RH. When the humidity in the circumference of the recording head is higher than the 40% RH, there is no significant change in the progress of the ink solvent evaporation. Thus it may be unnecessary to execute the interruption of the timer TM.

Regarding the mounting position of the humidity sensor SH, the selection may be made in the same consideration as given to the temperature sensor described in the foregoing ninth embodiment when its mounting position is selected. Also, as a humidity sensor, there is no particular problem if the sensor is such as widely used in general. It may be possible to use a dew condensation sensor made of a polymer electrolyte, a thick tin dioxide film, a flame sprayed titanic acid barium film, and zirconia ceramics among others.

Further, regarding the increased standby time for recording executed by the interruption of the timer TM, it is possible to apparently increase the recording standby time by inserting a step of making the T double in the step S31 for the processing procedures shown in FIG. 9.

As still another embodiment according to the present invention, it may be possible to combine the temperature sensor used for the embodiment shown in FIG. 34 and the humidity detecting means used for the embodiment shown in FIG. 35. With such a mode as this, a more suitable value is obtainable for the preliminary discharging numbers. As a result, the unwanted consumption of ink for the preliminary discharge can be further curtailed effectively.

In this respect, according to each of the above-mentioned embodiments, the preliminary discharging numbers are determined on the basis of the discharging numbers counted in the recording executed in a given period or the recording standby time when the recording is out of operation, but the present invention is not limited only to those embodiments. It may be possible to define the amount of exhausted ink by suction or a pressurized recovery on the basis of the above-mentioned discharging numbers and standby time, for example. In such a case, a given period and standby time required for counting the above-mentioned discharging numbers will usually be longer than those in the case of the preliminary discharge.

As is clear from the description above, it is possible to define the amount of exhausted ink by the discharge recovery process on the basis of the discharging numbers counted by counting means according to the present invention. Therefore, when the counted number of discharges is great, it is possible to make the amount of exhausted ink small, thus curtailing the unwanted consumption of ink in the discharge recovery process.

As a result, the ink in the ink tank can be used efficiently, and at the same time, the running cost can be reduced.

(Eleventh Embodiment)

Subsequently, the description will be made of a recording apparatus for which the miniaturization of the power source is materialized while maintaining a high-speed printing function, and a power control method in such an apparatus as well.

Figure 41:
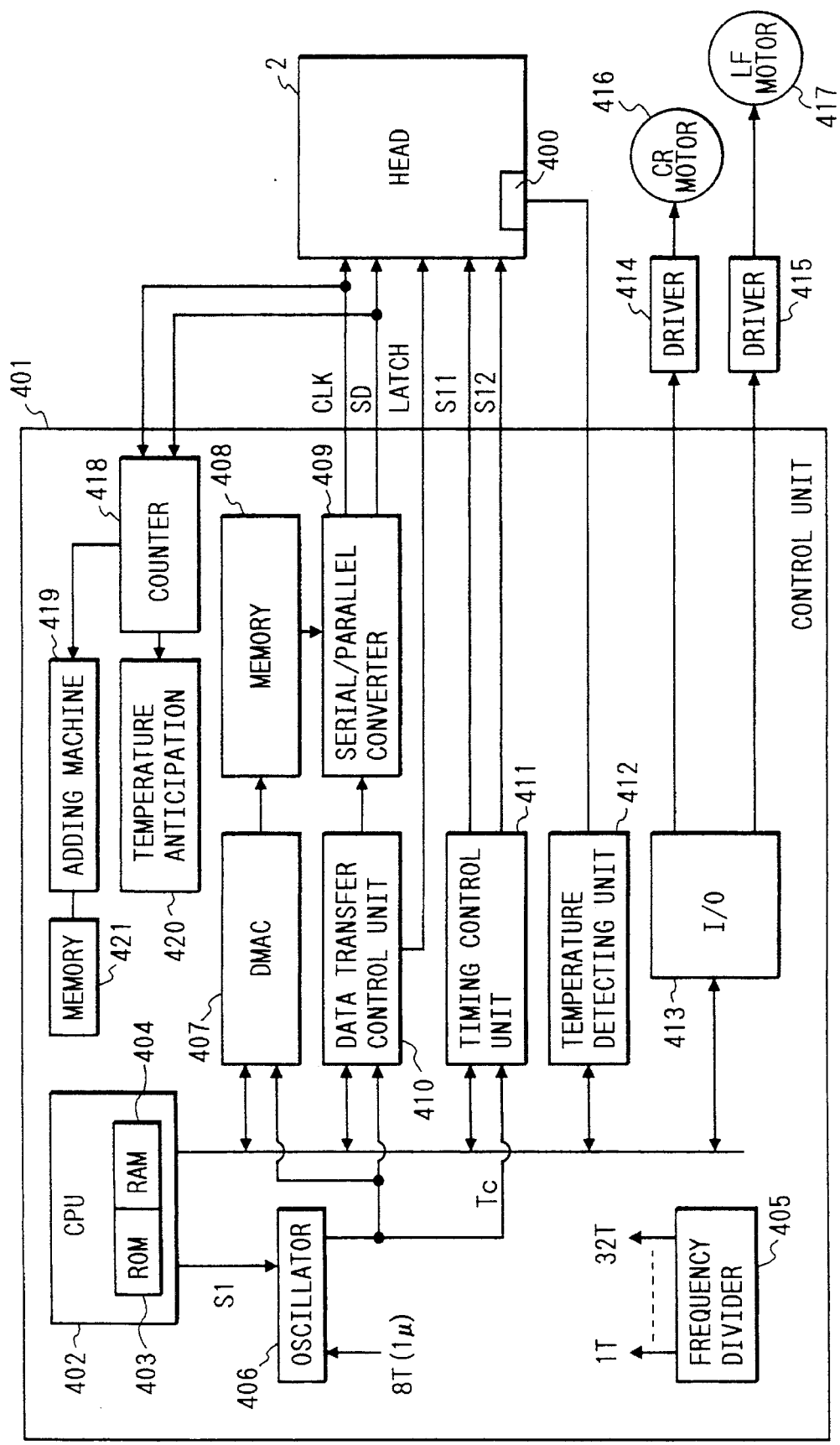
FIG. 41 is a block diagram schematically showing the structure of a printer according to the present embodiment.

FIG. 41 shows the characteristic structure which represents the outline of the present embodiment, in which the driving numbers of a recording head 2 which records on a given region on a recording sheet are counted by a counter 118 and an adder 119; and at least on the basis of such counted driving numbers, the temperature rise of an AC adapter is predicted by a temperature predicting unit 120, thus making it possible to execute recording at reduced driving numbers of the recording head 2 when the predicted value $T_n$ exceeds a given value.

FIG. 36 is a view showing the external appearance of the principal part of a printer according to the present embodiment. For the present embodiment, a color ink jet printer will be described. In this respect, the printing apparatus uses an AC adapter 212 as its power-supply, and is driven by receiving a direct current supplied by the adapter 212 through a terminal 213. The outline of the apparatus is the same as that of the ink jet recording apparatus described for the embodiment shown in FIG. 1. Therefore, the description thereof will be omitted.

A recording sheet 6 is fed by a feeding roller 7, and in continuation with the operation of a carriage 1, the sheet is conveyed by a feed roller 9 in the direction shown by an arrow A. The sheet is turned in the main body of the apparatus and exhausted in the direction indicated by an arrow B. Here, the recording sheet 6 is intermittently fed per given distance. This feeding operation is executed by a line-feed motor (hereinafter referred to as LF motor).

Figure 37:
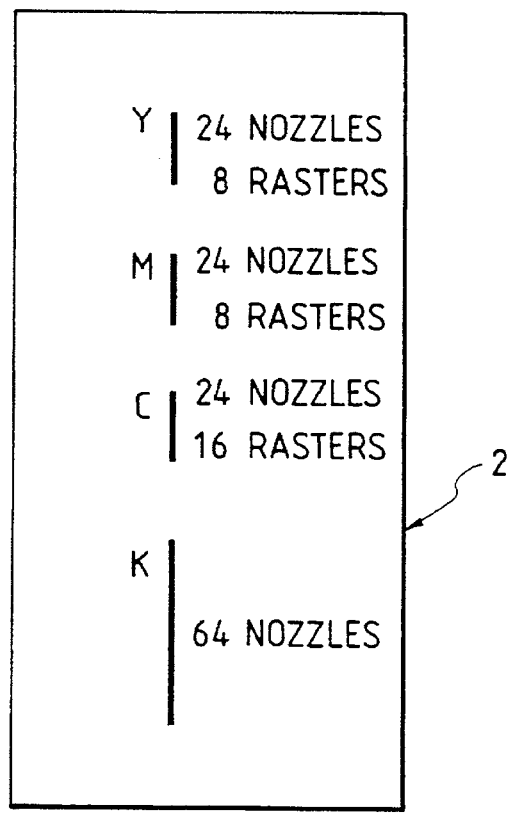
FIG. 37 is a view showing the arrangement of nozzles on the printer head according to the present embodiment.

As shown in FIG. 37, ink jet nozzles are arranged on the head 2. The structure is formed by 24 nozzles each for yellow (Y), magenta (M), and cyan (C), and 64 nozzles for black (BK). The nozzle pitches in the present embodiment are 360 DIP (dot/inch) all for the four colors. Therefore, the conveyance of the recording sheet 6 is an amount equivalent to 24 nozzles for a color image printing, that is, 0.067 inch (1.69 mm) each, and to 64 nozzles for a monochrome image printing, that is, 0.178 inch (4.52 mm) each.

FIG. 38 is a view schematically illustrating the method for printing color images by the head 2 according to the present embodiment.

In FIG. 38, 1 pass, 2 pass, . . . , 6 pass are represented by numbering the scans in the main scanning direction (indicated by an arrow F) of the head 2 with respect to the recording sheet 6 in FIG. 36. In this example, the recording sheet 6 is fed by a portion of 24 nozzles per pass, that is, per 0.067 inch according to the present embodiment. In this respect, as shown in FIG. 37, when a printing is executed by the head, only the first 24 nozzles of the BK head (64 nozzles) are used, and the latter half, 40 nozzles, are not used.

Figure 39:
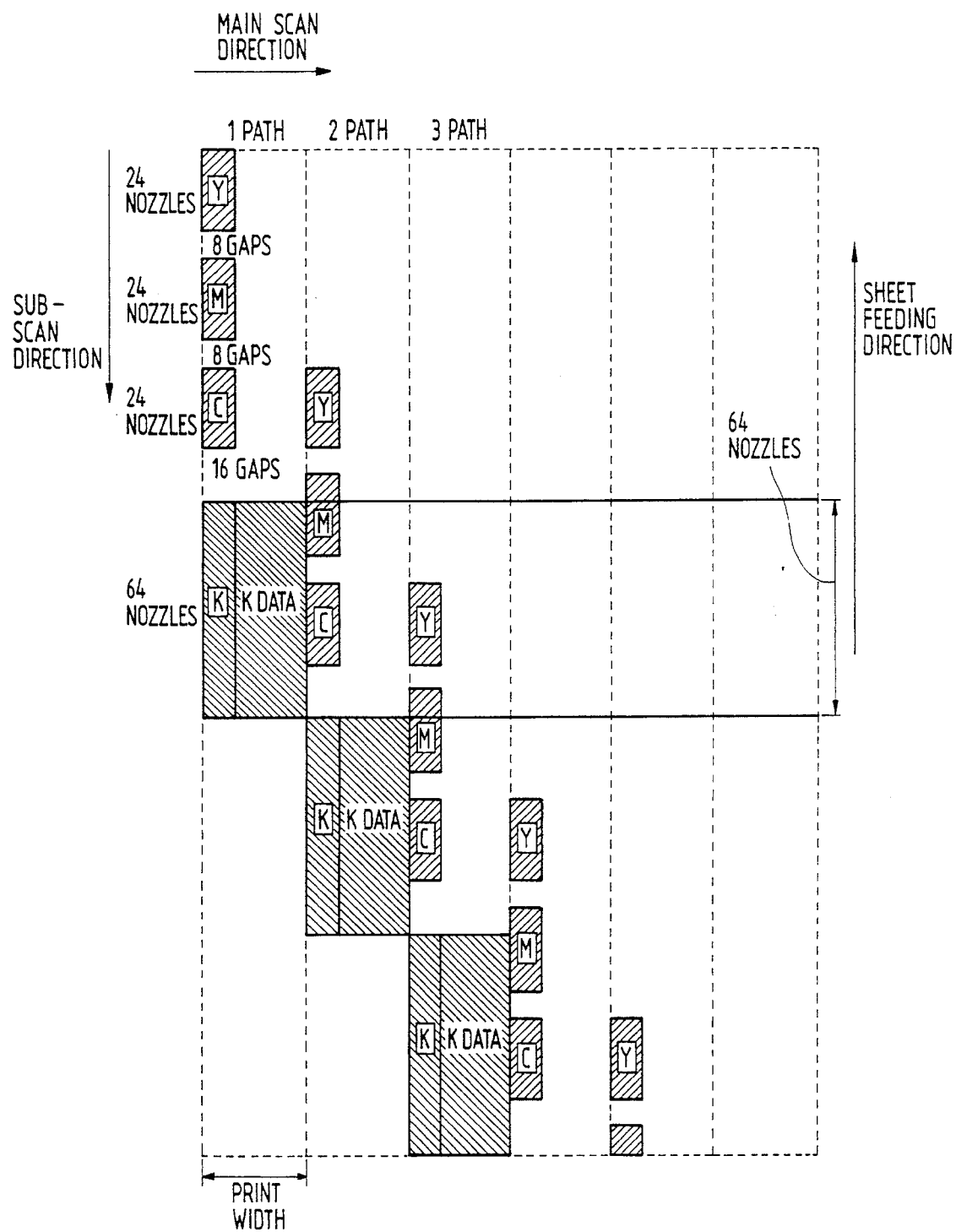
FIG. 39 is a view showing the head operation when monochrome images are printed.

On the other hand, FIG. 39 is a view schematically illustrating the printing method by use of only black ink as in a case of printing a text document and the like.

In this case, Y, M, and C ink heads are not used. Only the BK head is used for printing. As a result, a printing is executed for the portion of 64-nozzle width per pass. Accordingly, the recording sheet 6 is fed for the 64-nozzle portion, that is, 0.178 inch per pass. In this way, when the monochrome image is printed by a printer according to the present embodiment, the printing speed will be approximately 2.67 times (64/24) that of a color image printing.

Figure 40:
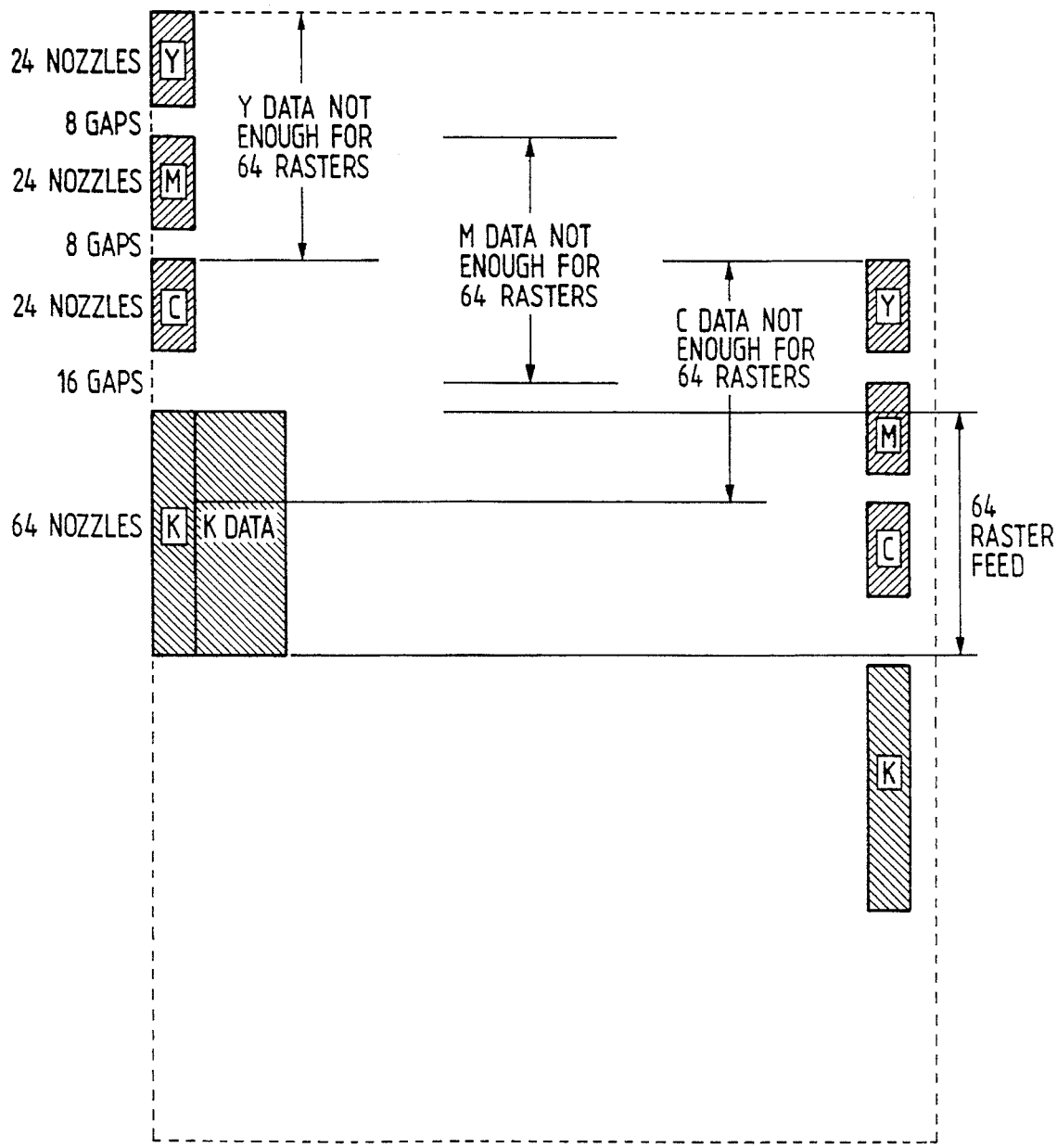
FIG. 40 is a view illustrating the printing operation by recognizing part of monochrome images at the time of a color printing.

Further, in the printer according to the present embodiment, a control is executed as shown in FIG. 40 when a monochrome image or a text is mixed with a color image. In other words, when no data exist for any one of the colors Y, M and C with respect to the data having a portion of 64 rasters which will be printed by the next scanning of the head 2, (that is, color data are completely "0"), all the 64 nozzles of the BK head are used to print for a one-scan portion. Then, the recording sheet is fed for a 64-nozzle portion corresponding to the print width. Thus, the printing speed will be the same as that of the monochrome image printing. In this way, it is possible to obtain a high-speed recording of the image in which color and monochrome images are mixed.

FIG. 41 is a block diagram schematically showing the structure of a printer according to the present embodiment.

In FIG. 41, a reference numeral 401 designates a control unit which controls the printer as a whole; 402, a CPU of a microprocessor or the like; 403, a ROM storing the control program (represented by a flowchart in FIG. 48) executed by the CPU 402, and various data; 404, a RAM which is used as a work area at the time of executing various processes by the CPU 402, and also stores various data temporarily; 405, a frequency divider having a clock source of 16 MHz to supply various clock signals 1T to 32T of cycles 125 ns to 4 μs to each unit. When the CPU 402 outputs a printing territorial signal $S_1$, an oscillator 406 outputs a timing signal to provide an ink discharging cycle in a period during which this signal $S_1$ is at a high level. In the present embodiment, since the discharging cycle of the head 2 is 185 μs (5.405 KHz), this oscillator 406 receives a clock 8T (1 μs cycle) from the frequency divider 405, and outputs a clock signal at 5.405 KHz during the period at which the signal $S_1$ is at a high level.

A reference numeral 407 designates a DMAC (DMA controller), and when demanded by the CPU 402 to actuate a DBA transfer, the controller reads the data from a memory (DRAM) 408 per 185 μs and outputs them to a serial-parallel converter 409. This serial-parallel converter 409 converts the parallel data which is DMA transferred from the memory 408 into the serial data and transfers them to a shift register in the head 2. A reference numeral 410 designates a data transfer control unit which outputs latch signal (LATCH) to a latch circuit in the head 2. Also, a timing control unit 411 provides the driving pulses for the head 2 and the block signal (3 bits) to be driven.

Also, a reference numeral 412 designates a temperature detecting circuit to detect changes in the resistance value of an aluminum sensor 400 which is arranged for detecting the temperature of the head 2, thus outputting to the CPU 402 the voltage value along the changes in the resistance value. Thus, the CPU 402 converts such voltage value into the digital value by use of an A/D converter (not shown) incorporated in it in order to obtain the current temperature of the head 2 by calculation; hence controlling the amount of discharged ink to be constant irrespective of the temperature changes by executing the pulse width demodulation of the driving pulse for the head 2. A reference numeral 413 designates the input/output port (I/O), each corresponding motor (CR motor 416 and LF motor 417) being driven for rotation by the drivers 414 and 415 through this port 413; further 418, a counter which counts the number of data (discharging numbers) output to the head 2; 419, an adder which adds the counted values from the counter 418 to provide its running sum; 420, a temperature predicting unit which predicts the temperature rise of the AC adapter 212 and the CR motor 416 in accordance with the counted value. Here, although not shown in FIG. 41, it may be possible to provide a warming heater or the like for the head 2 so that the temperature of the head 2 can be unified by supplying power to the heater.

Figure 42:
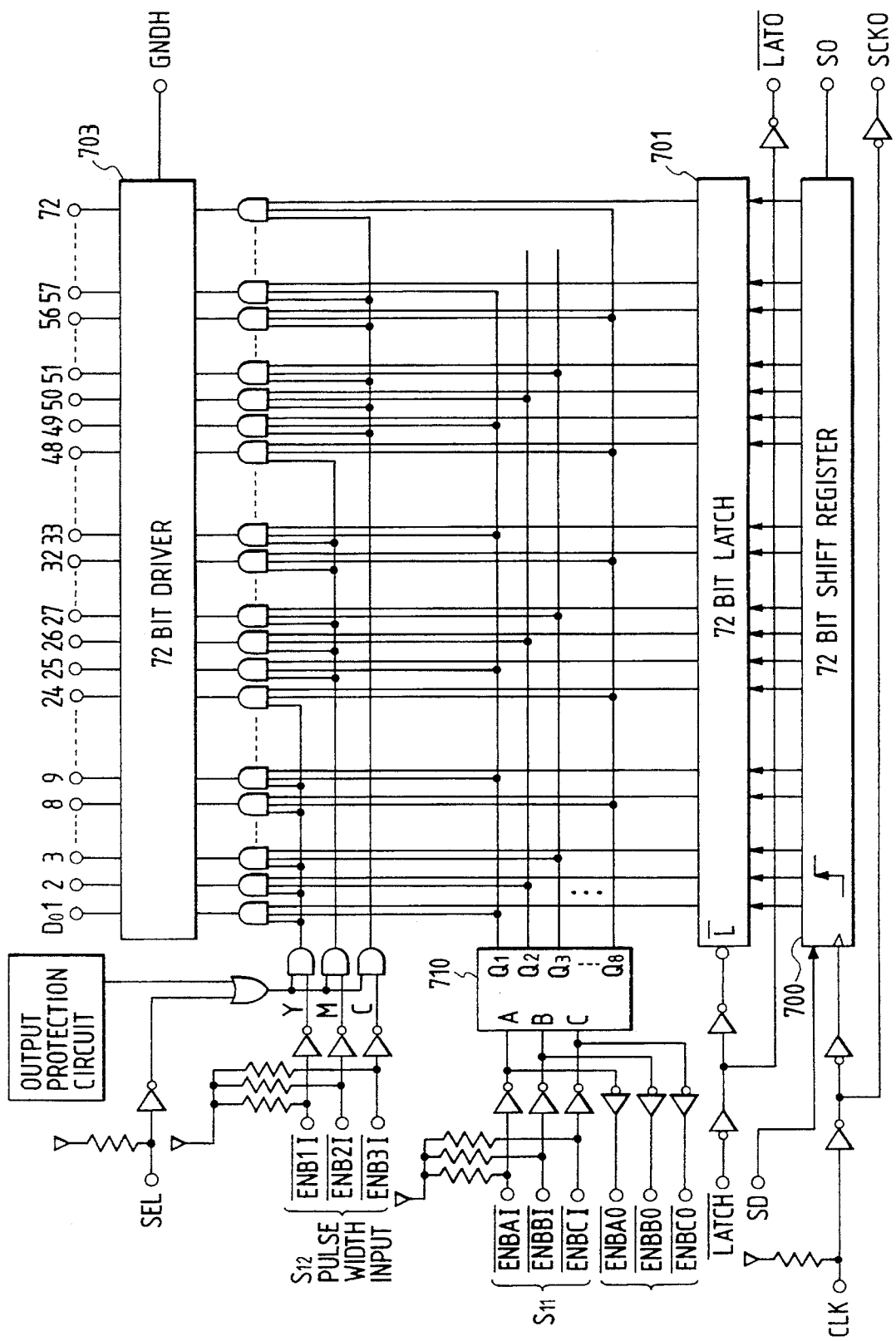
FIG. 42 is a view showing the inner structure of a printer head according to the present embodiment.

FIG. 42 is a block diagram showing the structure of the head 2.

A reference numeral 700 designates a 72-bit shift register which receives and stores the serial data (SD) being transferred in synchronism with the serial clock (CLK); 701, a latch circuit to latch the 72-bit data output from the shift register 700 by the latch signal (LATCH); 703, a driver to drive the nozzles of the 72 bit portions; 710, a decoder to receive the 3-bit signal $S_{11}$ from the timing control unit 111 and determine the blocks to be energized for driving in response to the 3-bit data.

Here, the head 2 is formed by eight blocks having the nozzles for three colors, that is, the 72 (24×3) nozzle portions, and nine nozzles are provided for each block. Now, when the signal $S_{11}$ is inputted into the decoder 710, the block to be energized is selected in accordance with such a value. Meanwhile, the driving pulse corresponding to each color is inputted as a signal $S_{12}$. In accordance with the pulse width of this signal $S_{12}$, the amount of ink discharge for each color is adjusted. In this respect, regarding the black ink, too, the structure of the head circuit is the same as the head shown in FIG. 42 with exception of the shift register which is modified from 72 bits to 64 bits.

Figure 43:
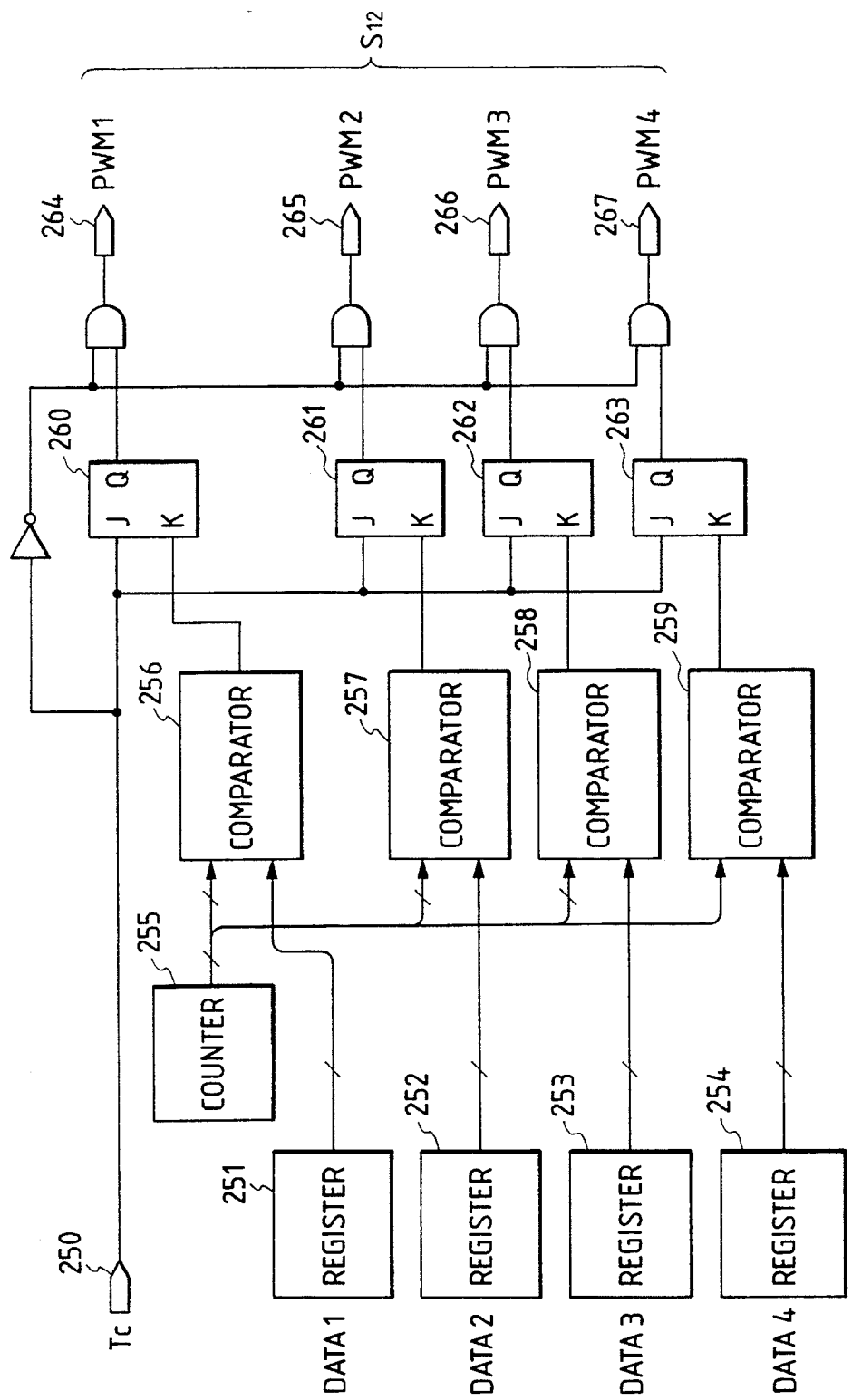
FIG. 43 is a block diagram showing the detailed circuit structure of a timing control unit of a printer according to the present embodiment.
Figure 44:
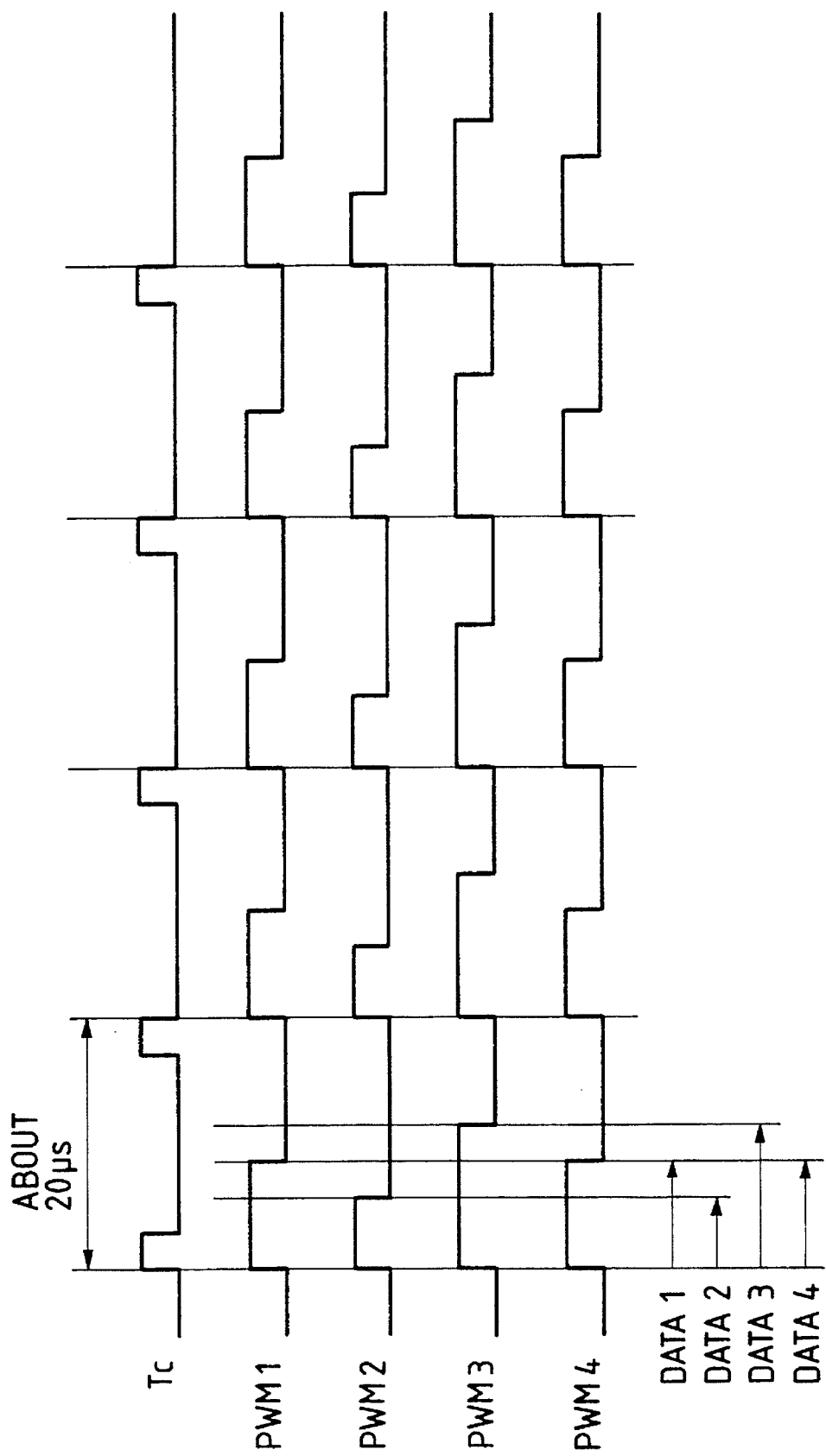
FIG. 44 is a view showing the timing relationship at each part shown in FIG. 43.

FIG. 43 is a block diagram showing the detailed circuit structure of the timing control unit 411. FIG. 44 is a view showing the timing relations at the respective units shown in FIG. 43.

When a TC signal 250 having a cycle of approximately 16 μs is inputted from the frequency divider 405 into an input terminal 250, the pulse signals which are PWM controlled in synchronism with this TC signal 250 are output to the terminals 264 to 266. These PWM pulses are generated by sharing a counter 255. In other words, each of the pulse signals is turned on when the TC signal 250 falls as shown in FIG. 44 (becomes a high level), and each fiducial value (each of the DATA1 to 3) which is stored in the respective registers (251 to 254) is compared with the counted value of the counter 255 by the corresponding comparator of the comparators 256 to 259. Thus, when the values are matched, the pulse signal is turned off (becomes a low level). Of these four PWM pulse signals, three signals are inputted into the color heads as the signals $S_{12}$, respectively. The remaining one is supplied to the head for black color, hence regulating the energizing time of the heat Generating elements corresponding to each of the nozzle Groups. In this respect, the cycle of the TC signal 250 is approximately 20 μs because in the present embodiment the driving cycle of the head 2 is 185 μs (5.405 KHz), and the eight nozzle blocks must be driven within this period of time as described above.

Figure 45:
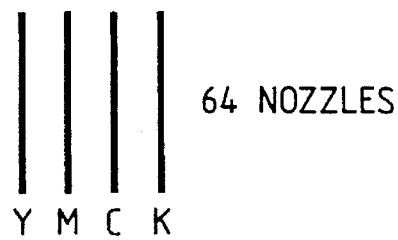
FIG. 45 is a view showing the registration adjustment in a conventional ink jet head.

As shown in FIG. 37, a nozzle array is arranged on a straight line for four colors on the head 2 according to the present embodiment. Therefore, as shown in FIG. 45, there is no need for the registration adjustment in the main scanning direction which is necessary for the nozzle arrangement hitherto adopted for the conventional apparatus in general. As a result, any adjustment process in a factory for an adjustment of the kind can be omitted. At the same time, the counter 255 for creating the driving pulses of the head 2 can be shared in use, hence making it possible to simplify the circuits.

Figure 46:
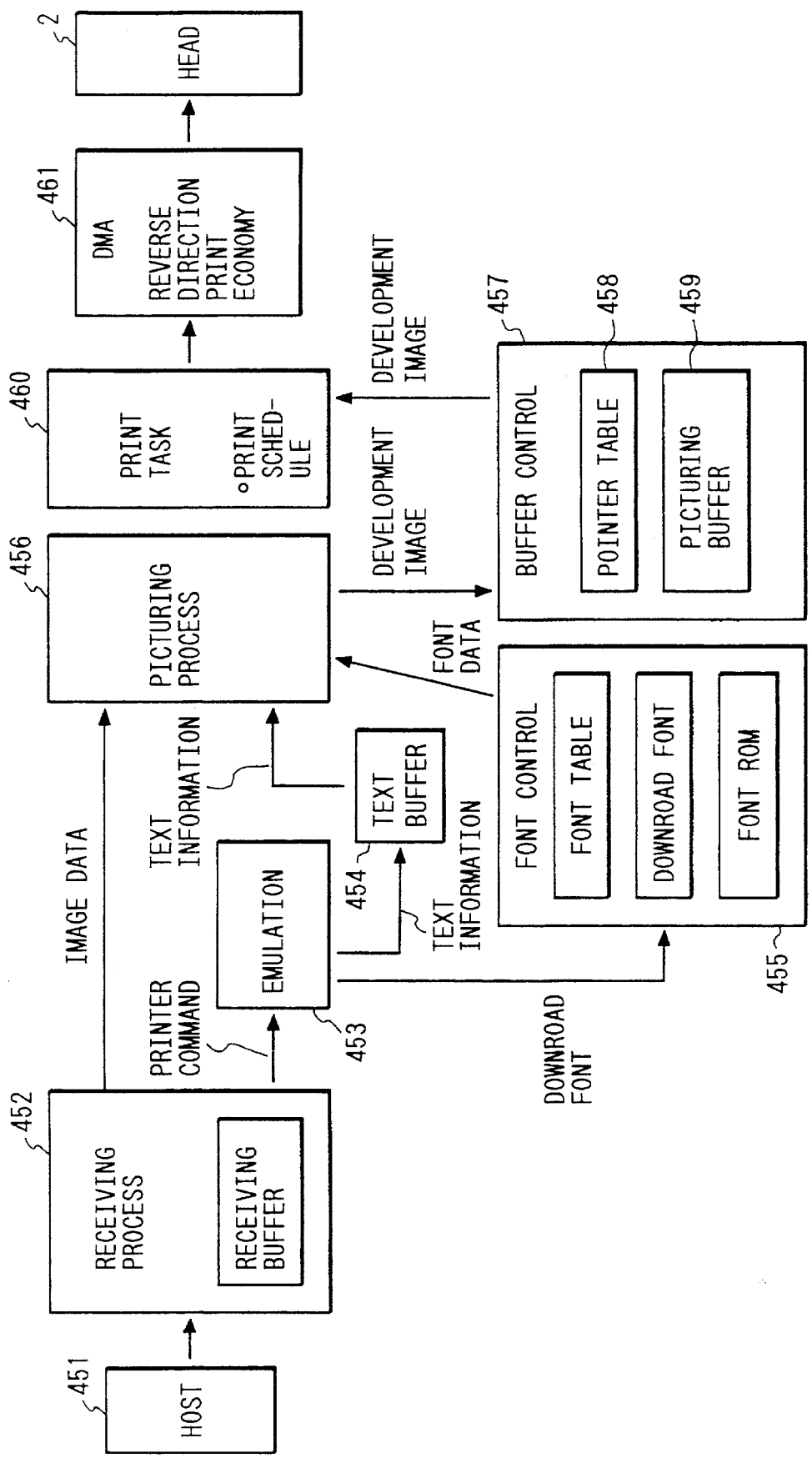
FIG. 46 is a view illustrating the flow of the processing tasks of the CPU for a printer according to the present embodiment.

FIG. 46 is a view illustrating the processing tasks to be executed by the printer CPU 402 according to the present embodiment.

Now, with reference to FIG. 41 and FIG. 46, the description will be made of the processing tasks to be executed by the CPU 402.

The CPU receives data transmitted from the host computer 451 through a centronics interface and others and temporarily stores the data in the reception buffer in the RAM 454. This process is executed by the reception processing task 452. Of the data stored in the reception buffer, the image data are directly transferred to the image representation processing task 456. On the other hand, of the data stored in the reception buffer, the text information is delivered to the image representation processing task 456 after its command is analyzed by the emulation processing task 453. Also, the font management task 455 delivers a character font, down load font, or the like to the image representation processing task 456.

Thus, the image representation processing task 456 receives the image, text, and font data, and develops them into the image representation buffer 459 under the buffer management task 457. The image representation buffer 459 is managed by a pointer table 458. The print task 460 receives the data to be represented from the image representation buffer 459 in synchronism with the movement of the carriage 1, and transfers the printing image data to the head 2 by the DMA transfer. The CPU 402 also controls the CR motor 416 and the LF motor 417. In this respect, the aforesaid text buffer 454, pointer table 458, image representation buffer 459, and down load font are provided for the memory area of the RAM 404 for storage. Also, the font ROM is stored in the ROM 403.

Now, the description will be made of the sequence control for a printer according to the present embodiment.

For the present embodiment, a stepping motor is employed for the CR motor 416. The traveling distance of the carriage 1 corresponding to one step angle of this motor is six pixels, that is, 1/60 inch. As described above, the printing frequency of the printer according to the present embodiment is 5.405 KHz for the normal operation. Therefore, the driving frequency of the CR motor 416 is 901 pps (pulse/second).

In FIG. 41, the counter 418 counts and monitors the ink discharging numbers for each color per main scan. The information of the counted numbers is delivered to the temperature predicting unit 429 where the temperature rise of the AC adapter and CR motor 416 is predicted. Also, the information of the counted numbers is inputted into an accumulating adder 419 where the total amount of the discharged ink in the ink tanks 10 and 11 in FIG. 36 is obtained. The result is stored in the non-volatile memory 421. The stored value in this memory is updated per printing.

The capacity of the ink tanks 10 and 11 of the present embodiment shown in FIG. 36 is 12 cc for the black ink, and 5 cc for each of the color inks, respectively. This arrangement is made in anticipation of the monochrome printing whose frequency is higher than that of the color graphics or color image printing. In this way, the ink remains in the cartridge are calculated per printing, and when the predicted amount of ink remains becomes less than a given value which is predetermined, the user will be notified of this reduction through a message display, a warning, or the like accordingly.

Now, the description will be made of a method for predicting the temperature rise of the AC adapter used as a power source, which constitutes the feature of the present embodiment.

Figure 48:
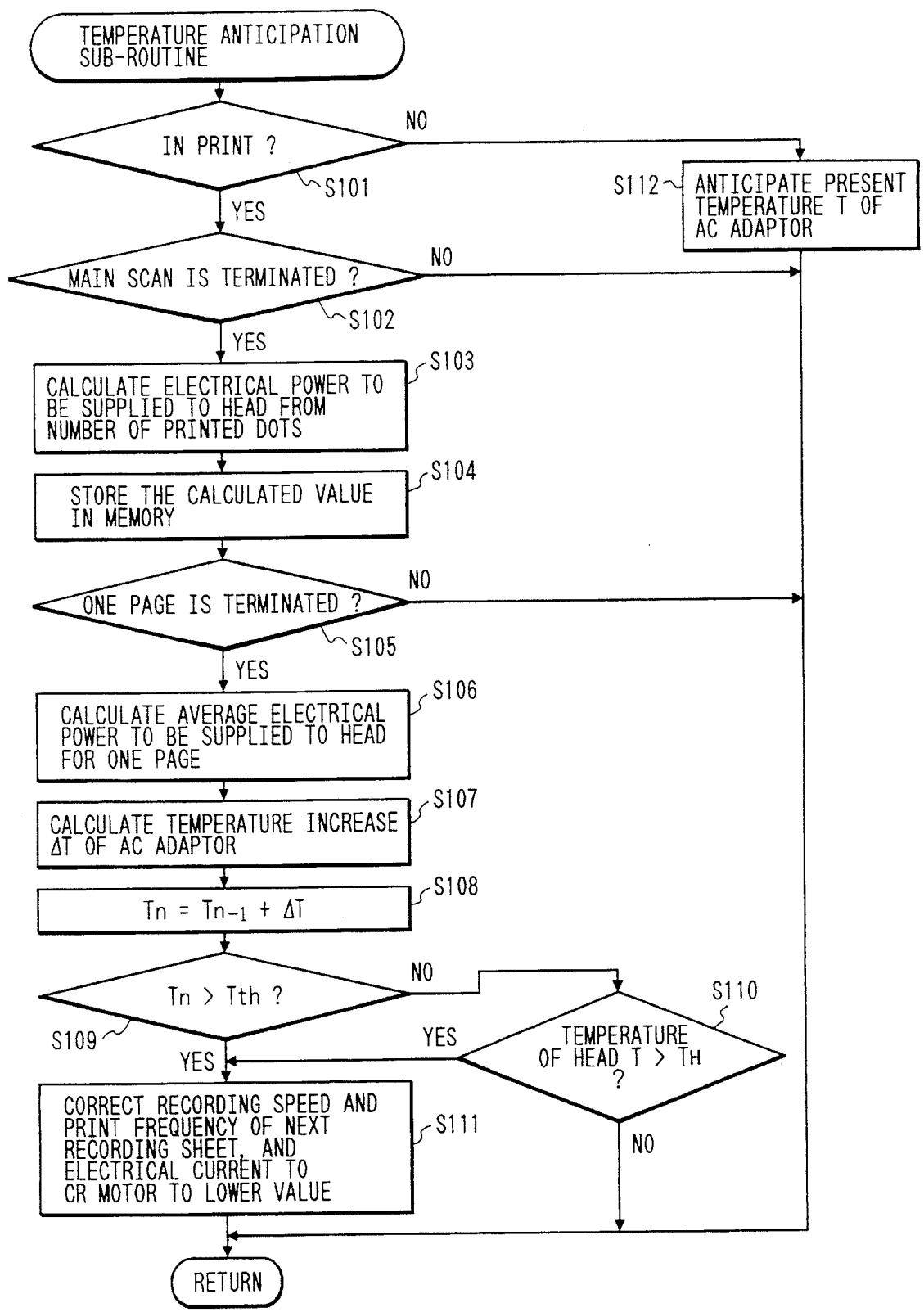
FIG. 48 is a flowchart showing the processes with which to change the printing speed by predicting the temperature of an AC adapter for a printer according to the present embodiment.

In general, not only for an AC adapter but also for the circuit components which constitute a power-supply for an equipment, the upper limit is set for its temperature rise according to the safety regulations in each nation or by the specifications of each manufacturer, and when designing such an equipment, it should be considered that the maximum power dissipation of the equipment will not exceed the regulated or specified upper limit. In a case of the printer apparatus, its power dissipation depends on the print ratio (the amount of dots to be printed in a given area), and the power dissipation is low when printing the data having a low print ratio such as text documents, but there are some cases where the print ratio becomes considerably high as in the case of printing the image data such as graphics or images. When the images having such a high print ratio are printed in a large quantity in continuation, the temperature of the power source unit such as an AC adapter as in the present embodiment is raised greatly. However, if a power source is designed in anticipation of printing the image data which may present such a high print ratio as above, the power source itself becomes bulky, resulting in the cost up of the apparatus as a whole. In recent years, there has been a tendency that an AC adapter of a switching type is used more than the conventional dropper type AC adapter in order to meet the demand on the smaller and lighter adapters. However, the AC adapter of a switching type costs almost double the dropper type adapter having the same power capacity. In the present embodiment, therefore, the temperature of the AC adapter is predicted on real time, and then, the printing speed is controlled so that the predicted value will not exceed a regulated value. FIG. 48 is a flowchart showing the control processes for a printer apparatus according to an embodiment of the present invention.

In accordance with the counted values obtained by the counter 418 and adder 419 which count the ink discharging numbers as described earlier, the power being supplied to the head 2 in printing is exactly monitored on real time per recording unit in the main scanning direction. By the time variation of the counted value of this counter 418, the average power dissipation is obtained per recording sheet 6 or per unit time, thus predicting the temperature rise of the AC adapter. When the predicted value thus obtained reaches a first given value or when the printing operation shifts from the current recording sheet 6 to the next recording sheet 6, the recording speed, that is, the traveling speed of the carriage 1 is lowered. In other words, the rotational speed of the CR motor 416 is reduced, and the driving frequency (printing frequency) for the head 2 is reduced to match the reduced motor speed.

Figure 47:
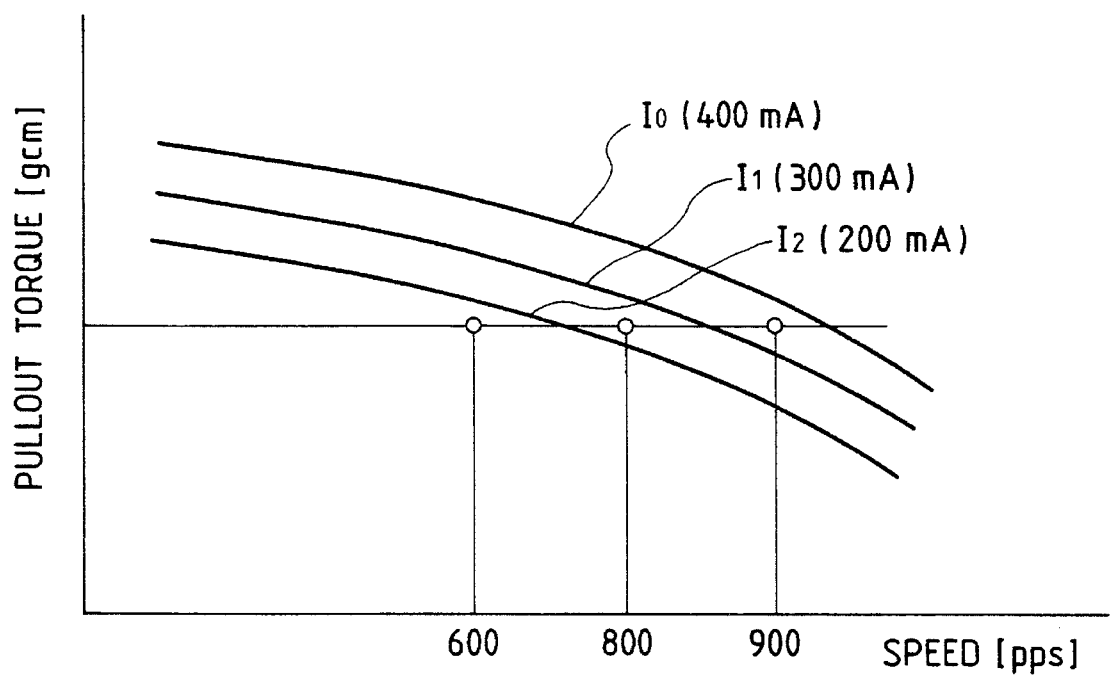
FIG. 47 is a view showing the relevance characteristics between the revolution of a stepping motor, the excited current and torque.

At this juncture, according to the present embodiment, the charging current to the CR motor 416 is reduced based upon the torque characteristics of a stepping motor (CR motor) as shown in FIG. 47. As a result, the power supplies both to the CR motor 416 and head 2 are reduced for lowering the power dissipation, thus suppressing the temperature rise by lightening the load to the AC adapter. Also, if this predicated value is less than the first given value, the temperature of the head 2 is further measured by the sensor 400 provided for the head 2. If such measured value exceeds the upper limit value $T_H$, the rotational speed of the CR motor 416 is reduced likewise as in the case described above. The printing frequency is also reduced to match it.

Now, the description will be made in accordance with the flowchart shown in FIG. 48. At first, in step S101, whether the apparatus is in printing operation or not is determined. If affirmative, the process will proceed to step S102 and determine whether the printing in the main scanning direction is completed or not. In the present embodiment, each time the printing in the main scanning direction is completed, the temperature of the AC adapter 212 is predicted. Therefore, when the printing in the main scanning direction is completed, the process will proceed to step S103 and calculate the power supplied to the head 2 on the basis of the number of the printed dots which is accumulated by the addition operated by the adder 419. Then, the calculated value is stored in the memory 421.

In step S105, whether the one-page printing is completed or not is determined. If affirmative, the process will proceed to step S106 to calculate the average power supply to the head 2 which is required to print such one page. In the next step S107, the predicted value of temperature rise $\Delta T$ is obtained for the AC adapter 212 in accordance with the average power supply thus calculated. This may be obtainable by use of the temperature predicting unit 420 shown in FIG. 41 or by use of a particular software. Then, in step S108, the currently predicted temperature $T_n$ of the AC adapter 212 is obtained from a formula of $T_n=T_{n-1}+\Delta T$. Here, the $T_{n-1}$ is the predicted value of last calculation. Then, proceeding to step S109, whether this predicted temperature value $T_n$ is higher than the given temperature value $T_{th}$ or not is determined. If higher than the given value $T_{th}$, the process will proceed to step S111 to reduce the printing frequency at which to print the next recording sheet 6. To match this, the charging current to the CR motor 416 is reduced accordingly.

Also, if the temperature value $T_n$ predicted in the step S109 is lower than the given temperature value $T_{th}$, the process will proceed to step S110, and examine whether the temperature of the head 2 is higher than a given temperature value $T_H$ or not on the basis of the temperature signal from the sensor 400. If higher, the process will proceed to step S111 and reduce the printing speed. If not, the process will be terminated as it is. In step S101, if the apparatus is not in printing operation, the process will proceed to step S112 and predict the current temperature of the AC adapter 212.

In this respect, according to this flowchart, the temperature rise of the AC adapter 212 is predicted when a one-page printing is completed. Then, the printing is prepared for the next recording sheet 6. However, it may be possible to predict the temperature per printing in the main scanning direction in order to prepare for the execution of the next printing in the main scanning direction, for example. In such a case, the process in the step S105 to determine whether or not the one-page printing is completed is omitted, and in the step S111, the speed of the CR motor 416 should only be determined for the next scanning. Also, as described above, in order to switch over the printing speeds when the predicted temperature of the AC adapter 212 exceeds the given value, the decision on the completion of the main scanning in the step S102 and the decision on the completion of the one-page printing in the step S105 are removed, and the process to reduce the printing speed should only be executed in the step S111.

Also, according to the present embodiment, each of the compared values of the temperatures of the AC adapter 212 and head 2 is defined as a $T_{th}$ and $T_H$, respectively, but it may be possible to prepare each of these values in plural so that the printing speed can be modified at plural stages- In this way, it is possible to implement a higher Printing speed overall in any printing states than the printing speed in the case represented in FIG. 48. Even after the printing speed is reduced in such a manner as this, the power supply to the head 2 is always monitored to obtain the time variation of the average power. Then, when it is predicted that the temperature of the AC adapter 212 has reached a second given value which is lower the aforesaid first given value, the printing speed may be restored to the initial value or it may be possible to do likewise at the time of the printing process for the next recording sheet.

In this respect, in the foregoing embodiment, as represented in the step S112, the current temperature of the AC adapter 212 is predicted by measuring the elapsed time since the completion of the latest printing even when the printer is on standby, that is, the printer is activated but not in printing.

Here, as a variation of this process represented in FIG. 48, the temperature $T_0$ the AC adapter 212 is predicted at the time of initiating the power supply to the AC adapter 212. To this end, even when the power-supply to the equipment is turned off, the clocking is executed by a timer which is driven by a battery provided for the equipment so that the elapsed time since the last printing can be monitored. On the basis of such an elapsed time, the temperature of the AC adapter 212 is predicted when the equipment is turned on. For the recording after that, the predicted temperature rise AT is calculated by the application of the same method as in the step S107 shown in FIG. 48. Thus, by obtaining $T_n=T_{n-1}+\Delta T$ on real time, the current temperature of the AC adapter 212 is predicted.

Figure 49:
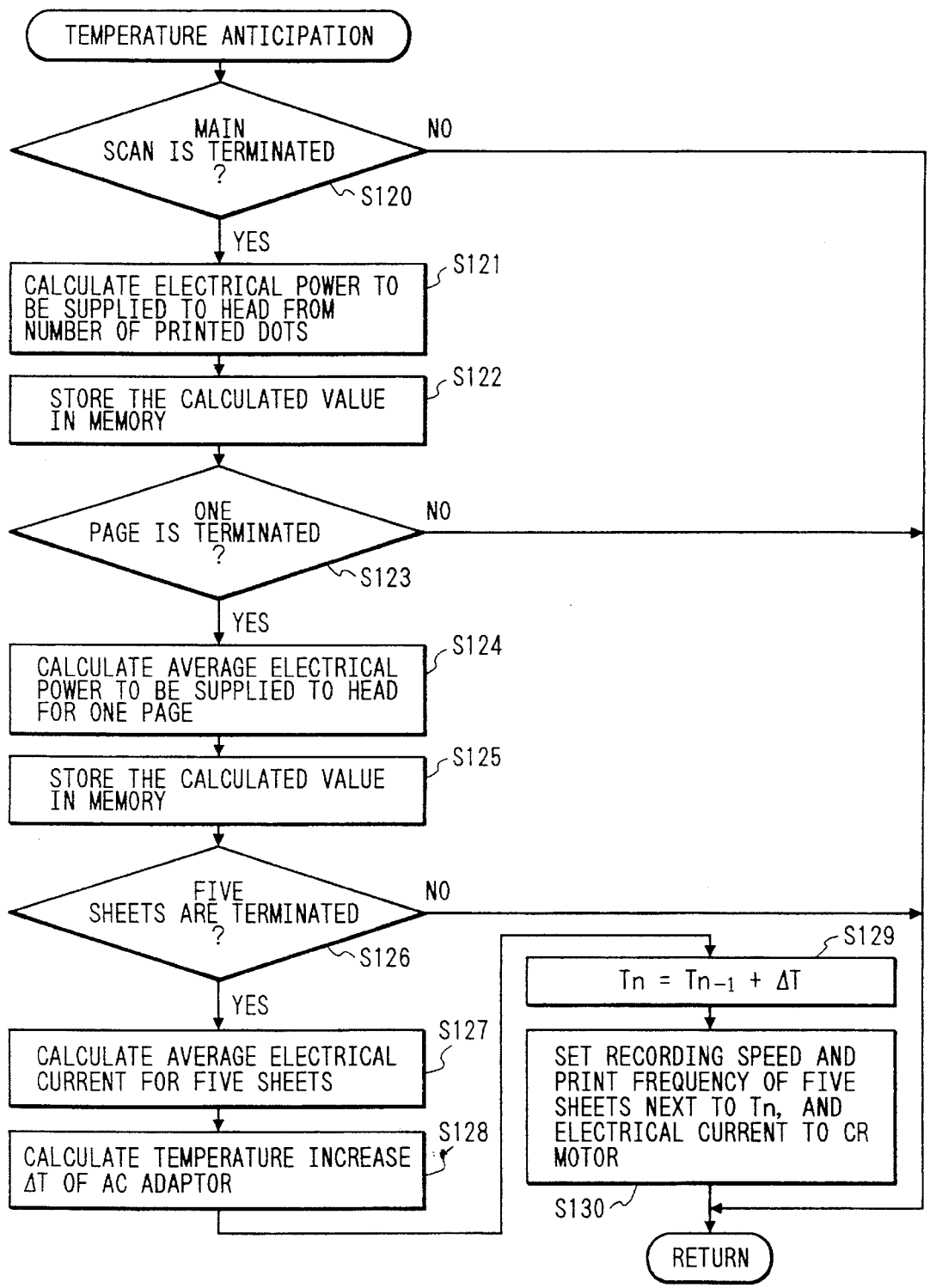
FIG. 49 is a flowchart showing the speed modification processes in accordance with the predicted temperature of an AC adapter according to an embodiment of the present invention.

FIG. 49 is a flowchart showing another control process for the printer according to an embodiment of the present invention. Here, when a printing is executed continuously on a plurality of recording sheets, the average power dissipation is obtained for a plurality of recording sheets, that is, per five recording sheets, for example. In accordance with such a value, the printing speed for the next five recording sheets is determined. In this case, therefore, the printing speed is prepared at plural stages, and then, the constant-current control value of the CR motor 416 is variably controlled in stages in accordance with the printing speeds selected and decided. Also, the printing frequency (driving frequency of the head 2) is controlled to the matching values. In this way, the power dissipation is controlled appropriately to suppress the temperature rise of the AC adapter 212.

To describe the flowchart shown in FIG. 49, at first in step S120, whether the printing process in the main scanning direction is completed or not is examined. If completed, the process will proceed to step S121 and calculate the power supplied to the head 2 on the basis of the dot numbers printed up to that time. Then, the calculated value is stored in the memory 421 (step S122). Proceeding to the next step S123, whether the one-page printing process is completed or not is examined. If completed, the process will proceed to step S124 and obtain the average power supply to the head 2 which is required to record on the one page. The value thus obtained is stored in the memory 421 (step S125).

Then, proceeding to step S126, whether the five recording sheets 6 are printed or not is examined. If affirmative, the total power supply for printing the portion of the five sheets 6 is obtained in step S127. On the basis of the value thus obtained, the temperature rise ΔT of the AC adapter 212 is predicted in step S128. Then, in step S129, the current value of the predicted temperature $T_n$ of the AC adapter 212 is obtained by the formula of $T_n = T_{n-1} + \Delta T$. Based on this predicted temperature value $T_n$, the printing speed and printing frequency for the next portion of the five recording sheets 6 are determined together with the rotational speed of the CR motor 416 based on them accordingly.

In this respect, according to the present embodiment, not only for the AC adapter 212, but also for the CR motor 416 and the LF motor 417, the temperature rise during the multi-sheet continuous printing is predicted. When these predicted temperature values are found to be higher than the given temperatures, the printing speed is reduced, hence making it possible to maintain the temperature rise of these motors at the level which is lower than the given temperatures. In other words, when the motors are driven at a constant current, it is possible to reduce its constant-current value $I_0$ to $I_1$ by reducing the rotational speed with the application of the revolution—torque characteristics shown in FIG. 47. In this way, the power supply to the motors can be reduced. As a result, it is possible to suppress the temperature rise of the motors.

In this respect, according to the above-mentioned embodiments, the description has been made of a printer for a portable type electronic equipment, but it is readily understandable to those skilled in the art that various modifications of the present embodiment regarding the control of the temperature rise of the power-supply are possible. Therefore, the present invention is to include all the variations such as these, and is not limited only to the embodiments set forth above.

As described above, according to the present invention, it is possible to effectively materialize the miniaturization of the power source unit while maintaining the high-speed printing function.

Also, according to the present invention, there is an effect that the heat generation of an apparatus can be suppressed.
(Other Embodiments)

In each of the foregoing embodiments, the description has been made of an ink jet recording technique which utilizes the film boiling which is created in ink. However, it is possible to apply to them an ink jet recording technique which utilizes the other piezoelectric type or the like.

The present invention produces an excellent effect on a recording apparatus using an ink jet recording method, particularly the one in which the flying droplets are formed by utilizing thermal energy for recording.

Regarding the typical structure and operational principle of such a method, it is preferable to adopt those which can be implemented using the fundamental principle disclosed in the specifications of U.S. Pat. Nos. 4,723,129 and 4,740,796. This method is applicable to the so-called on-demand type recording system and a continuous type recording system as well. Particularly, however, it is suitable for the on-demand type because the principle is such that at least one driving signal, which provides a rapid temperature rise beyond a departure from nucleation boiling point in response to recording information, is applicable to an electrothermal transducer disposed on a liquid (ink) retaining sheet or liquid passage whereby to cause the electrothermal transducer to generate thermal energy to produce film boiling on the thermoactive portion of the recording head; thus effectively leading to the resultant formation of a bubble in the recording liquid (ink) one to one for each of the driving signals. By the development and contraction of the bubble, the liquid (ink) is discharged through a discharging port to produce at least one droplet. The driving signal is more preferably in the form of pulses because the development and contraction of the bubble can be effectuated instantaneously, and, therefore, the liquid (ink) is discharged with quick response.

The driving signal in the form of pulses is preferably such as disclosed in the specifications of U.S. Pat. Nos. 4,463,359 and 4,345,262. In this respect, the temperature increasing rate of the heating surface is preferably such as disclosed in the specification of U.S. Pat. No. 4,313,124 for an excellent recording in a better condition.

The structure of the recording head may be as shown in each of the above-mentioned specifications wherein the structure is arranged to combine the discharging ports, liquid passages, and the electrothermal transducers as disclosed in the above-mentioned patents (linear type liquid passage or right angle liquid passage). Besides, the structure such as disclosed in the specifications of U.S. Pat. Nos. 4,558,333 and 4,459,600 wherein the thermal activation portions are arranged in a curved area is also included in the present invention.

In addition, the present invention is effectively applicable to the structure disclosed in Japanese Laid-Open Application No. 59-123670 wherein a common slit is used as the discharging ports for plural electrothermal transducers, and to the structure disclosed in Japanese Patent Laid-Open Application No. 59-138461 wherein an aperture for absorbing pressure waves of the thermal energy is formed corresponding to the discharging ports.

Furthermore, as the recording head for which the present invention is effectively utilized, there is a recording head of a full-line type having a length corresponding to the maximum width of a recording medium, which is recordable by a recording apparatus. This full-line head may be the one structured by combining a plurality of the recording heads disclosed in the above-mentioned specifications or a single full-line recording head which is integrally formed. In either case, the present invention is able to demonstrate the above-mentioned effects more effectively.

In addition, the present invention is effectively applicable to a replaceable chip type recording head which is electrically connected to the main apparatus and for which the ink is supplied when it is mounted in the main assembly; or to a cartridge type recording head having an ink tank integrally provided for the head itself.

Also, it is preferable to additionally provide the recording head recovery means and preliminarily auxiliary means as constituents of the recording apparatus according to the present invention because these additional means will contribute to enabling the effectiveness of the present invention to be more stabilized. To name them specifically, such constituents are capping means for the recording head, cleaning means, compression or suction means, preliminary heating means such as electrothermal transducers or heating elements other than such transducers or the combination of those types of elements. It is also contributable to executing a stabilized recording that the preliminary discharge mode is adopted aside from the regular discharging for recording.

Further, as the recording mode of the apparatus, the present invention is extremely effective in applying it not only to a recording mode in which only a main color such as black or the like is used, but also to an apparatus having at least one of a multi-color mode with ink of different colors, or a full-color mode using the mixture of the colors, irrespective of whether the recording heads are integrally structured or structured by a combination of plural recording heads.

Now, in the embodiments according to the present invention set forth above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable discharge in general, the ink may be such as to be liquefied when the applicable recording signals are given.

In addition, while positively preventing the temperature rise due to the thermal energy by the use of such energy as an energy consumed for changing states of ink from solid to liquid, or using the ink which will be solidified when left intact for the purpose of preventing the ink from being evaporated, it may be possible to adopt for the present invention the use of an ink having a nature of being liquefied only by the application of thermal energy, such as an ink capable of being discharged as ink liquid by enabling itself to be liquefied anyway when the thermal energy is given in accordance with recording signals, and an ink which will have already begun solidifying itself by the time it reaches a recording medium. In such a case, it may be possible to retain the ink in the form of liquid or solid in the recesses or through holes of a porous sheet such as disclosed in Japanese Patent Laid-Open application No. 54-56847 or 60-71260 in order to enable the ink to face the electrothermal transducers. In the present invention, the most effective method for the various kinds of ink mentioned above is the one capable of implementing the film boiling method as described above.

Further, as the mode of the recording apparatus according to the present invention, it may be possible to adopt a copying apparatus combined with a reader in addition to the image output terminal which is integrally or independently provided for a word processor, computer, or other information processing apparatus, and furthermore, it may be possible to adopt a mode of a facsimile apparatus having transmission and reception functions.

Figure 22:
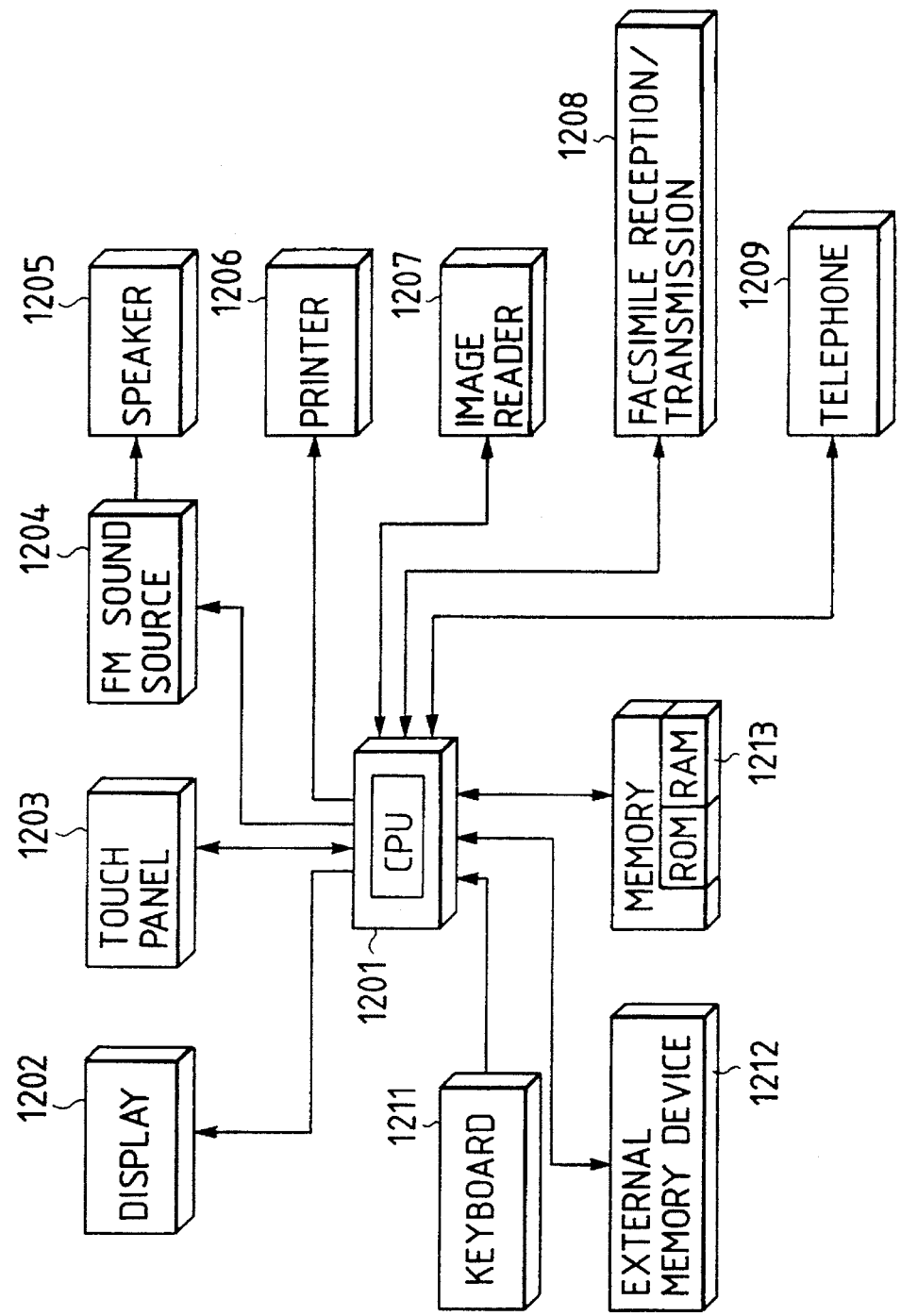
FIG. 22 is a block diagram schematically showing the structure of an ink jet recording apparatus according to the present invention when the apparatus is applied to an information processing apparatus.

FIG. 22 is a block diagram schematically showing the structure of a recording apparatus according to the present invention in which the apparatus is applicable to an information processing apparatus having functions as a word processor, a personal computer, a facsimile apparatus, and a copying apparatus. In FIG. 22, a reference numeral 1201 designates a control unit provided with a CPU such as a microprocessor, and various I/O ports to control the entire system of the apparatus by outputting control signals, data signals, and others to each unit and receiving control signals and data signals from each unit; 1202, a display unit on the screen of which various menus, documentary information, image data read by an image reader 1207, and others are displayed; and 1203, a pressure sensitive transparent touch panel arranged on the display unit 1202 which enables items, coordinate positions, and others indicated on the display unit 1202 to be inputted when its surface is depressed by a finger or the like as required.

A reference numeral 1204 designates an FM (Frequency Modulation) sound source which stores the music information created by a music editor or the like in a memory 1210 and/or an external memory device 1212 as digital data, and reads them from the memory and others to perform an FM modulation. The electrical signals from the FM sound source 1204 are transduced into the audible sounds by a speaker unit 1205. A printer unit 1206 is the apparatus to which the present invention is applicable as an output terminal for a word processor, personal computer, facsimile apparatus, and copying apparatus.

A reference numeral 1207 designates an image reader which is arranged on the feeding path of source documents in order to photoelectrically read the data on source documents for facsimile and copying operations in addition to reading various other source documents; 1208, a facsimile transmission and reception unit which performs the facsimile transmission of the data on the source document read by the image reader 1207, and receives the transmitted facsimile signals for demodulation, and which also has a function to interface with the external devices; 1209, a telephone unit which has various functions to serve as an ordinary telephone and as a device to automatically take and record messages among others; and 1210, a memory unit including the ROM which stores a system program, manager program, and other application programs as well as character fonts, dictionaries, and others, the RAM which stores the application program and text information loaded from the external memory device 1212, and a video RAM among others.

A reference numeral 1211 designates a keyboard unit which enables text information and various commands to be inputted; 1212, an external memory device using a floppy disk, hard disk, and the like as its storing medium, and in this external memory device 212, text information, music, or voice information, and user's application program and others are stored.

Figure 23:
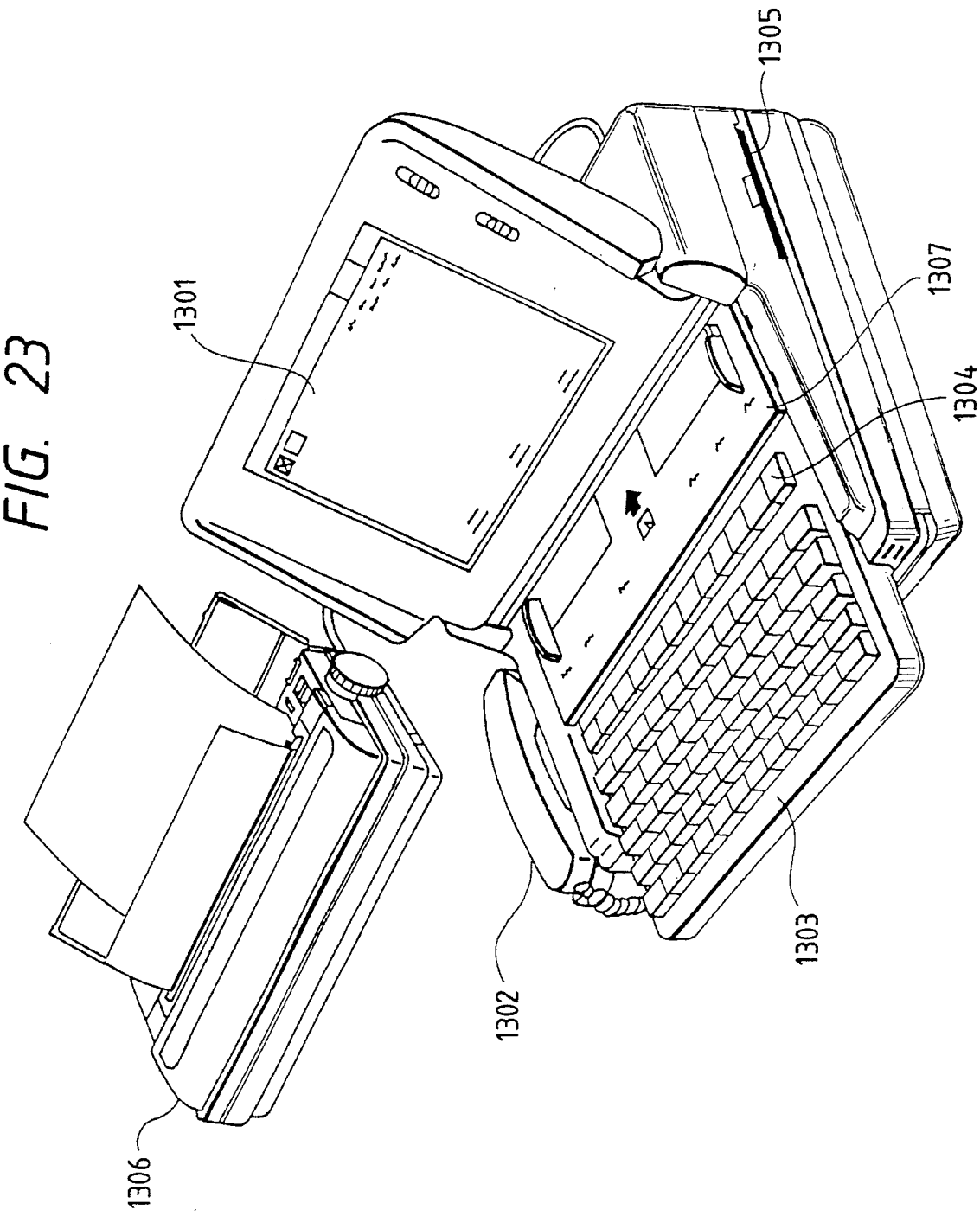
FIG. 23 is a view showing the external appearance of an information processing apparatus.

FIG. 23 is a view illustrating the external appearance of the information processing apparatus shown in FIG. 22. In FIG. 23, a reference numeral 1301 designates a flat panel display which utilizes liquid crystal and others to display various menus, graphic information, and text information, and enables the coordinates and specific items to be inputted by depressing the surface of the touch panel arranged on this display 1301 by a finger or the like as required; and 1302, a hand set which is used when the apparatus functions as a telephone unit.

The keyboard 1303 is detachably connected to the main body through a cord, through which various text information and various data can be inputted. Also, the keyboard 1303 is provided with various functional keys 1304 and others; and 1305, an insertion inlet for a floppy disk.

A reference numeral 1306 designates a sheet stacker in which the source or original documents are stacked for the image reader 1207 to read, and the source documents thus read are exhausted from the rear portion of the apparatus. Also, in a case of a facsimile reception, or the like, the recording is executed by an ink jet printer 1307.

In this respect, the above-mentioned display 1301 may be a CRT, but it is desirable to use a flat panel such as a liquid crystal display using a ferroelectric liquid crystal because with such a display, it is possible to implement the miniaturization of the apparatus and also make it lightweight. When the above-mentioned image processing apparatus functions as a personal computer or a word processor, the text information inputted through the keyboard unit 1211 in FIG. 22 is processed by the control unit 1201 in accordance with a given program, and is output to the printer unit 1206 as images. When the apparatus functions as a receiver of the facsimile apparatus, the facsimile information inputted from a facsimile transmission and reception unit 1208 is received by the control unit 1201 for processing in accordance with a given program and is output to the printer unit 1206 as reception images.

Figure 24:
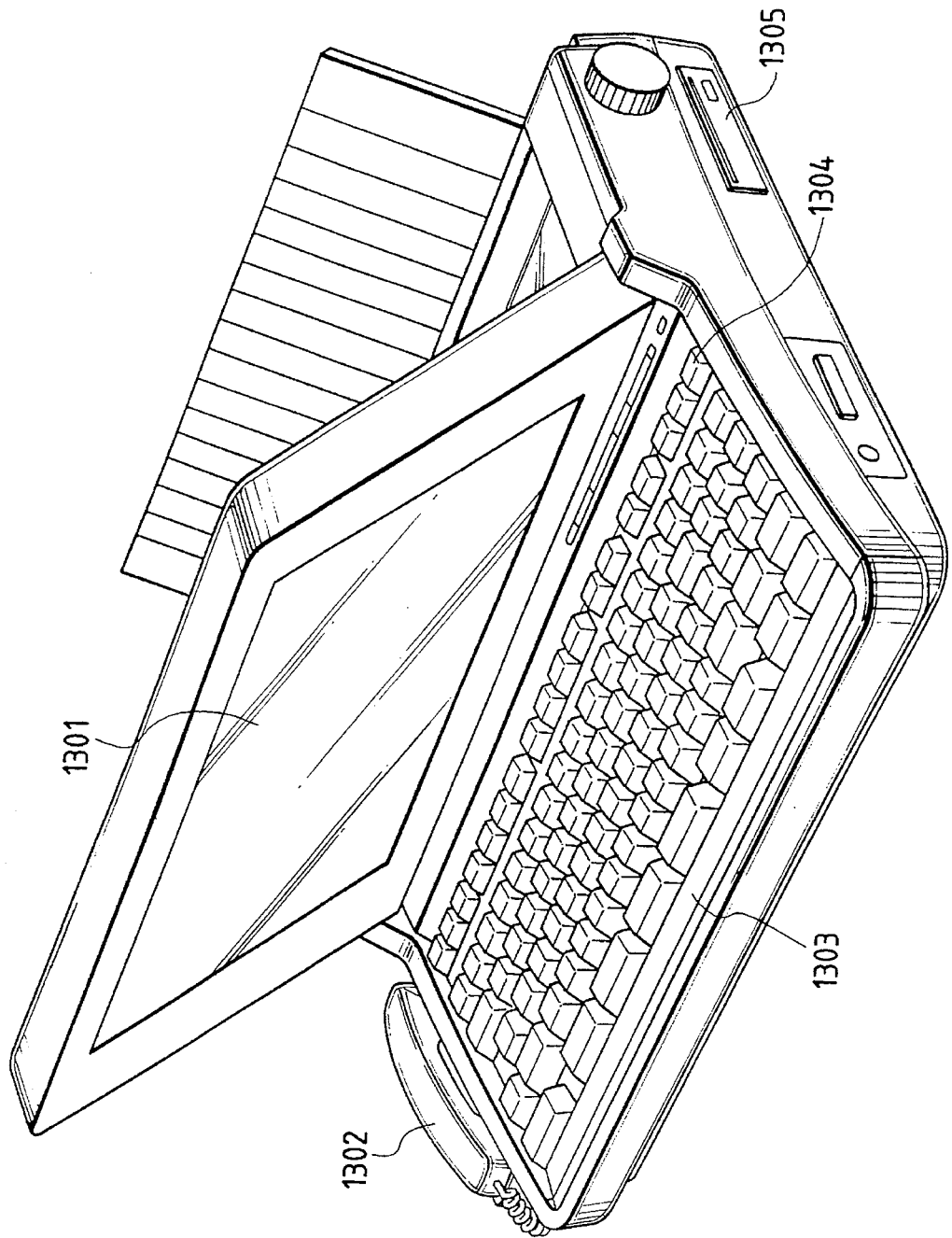
FIG. 24 is a view showing the external appearance of another example of the information processing apparatus.

Also, when the apparatus functions as a copying apparatus, a source document is read by the image reader 1207, and the data on the source document thus read are transferred to the printer unit 1206 through the control unit 1201 and are output as copied images. In this respect, when the apparatus functions as a transmitter of the facsimile apparatus, the data on the source documents read by the image reader 1207 are processed by the control unit 1201 for transmitting in accordance with a given program, and then, transmitted to the communication line through the facsimile transmitter 1208. Here, it may be possible to arrange the above-mentioned apparatus as an integrated type in which an ink jet printer is incorporated in the main body as shown in FIG. 24. In this case, the portability will be further enhanced. In FIG. 24, the constituents having the same functions as those shown in FIG. 23 are indicated by the corresponding reference marks.

Since a high-quality recording image is obtainable by applying a recording apparatus according to the present invention to the multi-functional information processing apparatus as described above, a further enhancement of the functions of the above-mentioned information processing apparatus is possible.

What is claimed is:

1. An ink jet recording apparatus for recording with an ink jet recording head by discharging ink onto a recording medium, said apparatus comprising:

a carriage having the ink jet recording head mounted thereon;

scanning means for causing said carriage to reciprocate relative to the recording medium;

recording control means for driving the ink jet recording head for reciprocal recording while said carriage is scanned by said scanning means;

first measuring means for measuring a backlash amount of a driving system of said carriage;

storage means for storing the backlash amount measured by said first measuring means as backlash correction data;

second measuring means for measuring weight changes of said carriage;

modification means for modifying the backlash correction data in accordance with the weight changes measured by said second measuring means; and means for adjusting a timing of the reciprocal recording of the recording head in accordance with the backlash correction data modified by said modification means.

2. An ink jet recording apparatus according to claim 1, wherein said second measuring means predicts the weight changes of an ink tank mounted on said carriage in accordance with a number of discharged ink droplets from the recording head.

3. An ink jet recording apparatus according to claim 1, further comprising suction means for effecting suction operations in which ink is suctioned from nozzles of the recording head for discharge recovery of the recording head, wherein said second measuring means predicts the weight changes of an ink tank mounted on said carriage in accordance with a number of discharged ink droplets from said recording head, and a number of suction operations by said suction means.

4. An ink jet recording apparatus according to claim 1, wherein the ink jet recording head comprises electrothermal transducing elements which generate thermal energy for creating film boiling in ink to discharge the ink.

5. An ink jet recording apparatus according to claim 1, further comprising instructing means for causing said first measuring means to measure the backlash amount.

6. An ink jet recording apparatus according to claim 1, further comprising an ink tank for containing ink to be supplied to the ink jet recording head, said ink tank being exchangeably mounted on said carriage.

7. An ink jet recording apparatus according to claim 6, further comprising control means for causing said first measuring means to measure the backlash amount when said ink tank is exchanged.

8. An ink jet recording apparatus having an ink jet recording head for discharging ink, an ink tank for containing ink to be supplied to the ink jet recording head, a carriage for mounting the ink jet recording head and the ink tank, and scan means for reciprocally scanning the carriage with respect to a recording medium, said apparatus forming an image on the recording medium by driving the ink jet recording head while reciprocally scanning the carriage with the scan means, said apparatus comprising:

control means for controlling a drive timing of the ink jet recording head in accordance with a difference of a recording position in a forward direction of the carriage and a recording position in a backward direction of the carriage scanned by the scan means;

determining means for determining a change in weight of the carriage; and adjusting means for adjusting the drive timing of the ink jet recording head controlled by said control means in accordance with the change in weight of the carriage determined by said determining means.

9. An apparatus according to claim 8, wherein said determining means comprises calculating means for calculating an amount of used ink, wherein said adjusting means adjusts the drive timing of the ink jet recording head in accordance with the change in weight of the carriage caused by the amount of used ink calculated by said calculating means.

10. An apparatus according to claim 9, wherein said calculating means calculates the amount of used ink in accordance with a number of ink droplets discharged from the ink jet recording head.

11. An apparatus according to claim 9, further comprising recovery means for discharging ink from the ink jet recording head to recover a discharge condition of the ink jet recording head, wherein said calculating means calculates the amount of used ink in accordance with a number of ink droplets discharged from the ink jet recording head and an amount of ink discharged by said recovery means.

12. An apparatus according to claim 8, wherein the ink jet recording head comprises electrothermal converting elements for generating thermal energy for creating film boiling in ink to discharge the ink.

13. An ink jet recording apparatus having an ink jet recording head for discharging ink, an ink tank for containing ink to be supplied to the ink jet recording head, a carriage for mounting the ink jet recording head and the ink tank, and scan means for reciprocally scanning the carriage with respect to a recording medium, said apparatus forming an image on the recording medium by driving the ink jet recording head while reciprocally scanning the carriage with the scan means, said apparatus comprising:

memory means for storing correction data based on a drive timing of the ink jet recording head in accordance with a difference of a recording position in a forward direction of the carriage and a recording position in a backward direction of the carriage scanned by the scan means;

determining means for determining a change in weight of the carriage;

adjusting means for adjusting the correction data in accordance with the change in weight of the carriage determined by said determining means; and record control means for controlling the drive timing of the ink jet recording head to record in accordance with the correction data adjusted by said adjusting means.

14. An apparatus according to claim 13, wherein said determining means comprises calculating means for calculating an amount of used ink, wherein said adjusting means adjusts the correction data in accordance with the change in weight of the carriage caused by the amount of used ink calculated by said calculating means.

15. An apparatus according to claim 14, wherein said calculating means calculates the amount of used ink in accordance with a number of ink droplets discharged from the ink jet recording head.

16. An apparatus according to claim 14, further comprising recovery means for discharging ink from the ink jet recording head to recover a discharge condition of the ink jet recording head, wherein said calculating means calculates the amount of used ink in accordance with a number of ink droplets discharged from the ink jet recording head and an amount of ink discharged by said recovery means.

17. An apparatus according to claim 13, wherein the ink jet recording head comprises electrothermal converting elements for generating thermal energy for creating film boiling in ink to discharge the ink.

18. A method of controlling a recording timing in an ink jet recording apparatus having an ink jet recording head for discharging ink, an ink tank for containing ink to be supplied to the ink jet recording head, a carriage for mounting the ink jet recording head and the ink tank, and scan means for reciprocally scanning the carriage with respect to a recording medium, the apparatus forming an image on the recording medium by driving the ink jet recording head while reciprocally scanning the carriage with the scan means, said method comprising the steps of:

controlling a drive timing of the ink jet recording head in accordance with a difference of a recording position in a forward direction of the carriage and a recording position in a backward direction of the carriage scanned by the scan means;

determining a change in weight of the carriage; and adjusting the drive timing of the ink jet recording head controlled in said control step in accordance with the change in weight of the carriage determined in said determining step.

19. A method according to claim 18, further comprising the step of recording in accordance with the drive timing of the ink jet recording head adjusted in said adjusting step.

20. A method according to claim 18, wherein said determining step comprises the step of calculating an amount of used ink, wherein in said adjusting step the drive timing of the ink jet recording head is adjusted in accordance with the change in weight of the carriage caused by the amount of used ink calculated in said calculating step.

21. A method according to claim 20, wherein in said calculating step the amount of used ink is calculated in accordance with a number of ink droplets discharged from the ink jet recording head.

22. A method according to claim 20, further comprising the step of discharging ink from the ink jet recording head to recover a discharge condition of the ink jet recording head, wherein in said calculating step the amount of used ink is calculated in accordance with a number of ink droplets discharged from the ink jet recording head and an amount of ink discharged in said recovery discharging step.

23. A method of controlling a recording timing in an ink jet recording apparatus having an ink jet recording head for discharging ink, an ink tank for containing ink to be supplied to the ink jet recording head, a carriage for mounting the ink jet recording head and the ink tank, and scan means for reciprocally scanning the carriage with respect to a recording medium, the apparatus forming an image on the recording medium by driving the ink jet recording head while reciprocally scanning the carriage with the scan means, said method comprising the steps of:

storing correction data based on a drive timing of the ink jet recording head in accordance with a difference of a recording position in a forward direction of the carriage and a recording position in a backward direction of the carriage scanned by the scan means;

determining a change in weight of the carriage;

adjusting the correction data in accordance with the change in weight of the carriage determined in said determining step; and controlling the drive timing of the ink jet recording head to record in accordance with the correction data adjusted in said adjusting step.

24. A method according to claim 23, wherein said determining step comprises the step of calculating an amount of used ink, wherein in said adjusting step the correction data is adjusted in accordance with the change in weight of the carriage caused by the amount of used ink calculated in said calculating step.

25. A method according to claim 24, wherein in said calculating step the amount of used ink is calculated in accordance with a number of ink droplets discharged from the ink jet recording head.

26. A method according to claim 24, further comprising the step of discharging ink from the ink jet recording head to recover a discharge condition of the ink jet recording head, wherein in said calculating step the amount of used ink is calculated in accordance with a number of ink droplets discharged from the ink jet recording head and an amount of ink discharged in said recovery discharging step.

* * * * *

UNITED STATES PATENT AND TRADEMARK OFFICE
CERTIFICATE OF CORRECTION

PATENT NO. : 5,617,122  Page 1 of 2
DATED : April 1, 1997
INVENTOR(S) : Yasuhiro NUMATA, et al.

It is certified that error appears in the above-indentified patent and that said Letters Patent is hereby corrected as shown below:

COLUMN 4:

Line 50, "let" should read --jet--.

COLUMN 11:

Line 10, "and" should read --or--.

COLUMN 12:

Line 32, "considered," should read --considered.--.

COLUMN 18:

Line 35, "a" should read --the--.

COLUMN 26:

Line 67, "Generating" should read --generating--.

UNITED STATES PATENT AND TRADEMARK OFFICE
CERTIFICATE OF CORRECTION

PATENT NO. : 5,617,122  
DATED : April 1, 1997  
INVENTOR(S) : Yasuhiro NUMATA, et al.

It is certified that error appears in the above-indentified patent and that said Letters Patent is hereby corrected as shown below:

COLUMN 30:

Line 10, "stages-" should read --stages.--;  
Line 11, "Printing" should read --printing--;  
Line 18, "lower" should read --lower than--;  
Line 37, "AT" should read --$\Delta$T--

Signed and Sealed this

Twenty-first Day of October 1997

*Attest:*

BRUCE LEHMAN

*Attesting Officer*  *Commissioner of Patents and Trademarks*